US012541557B1

(12) United States Patent
Aulie

(10) Patent No.: US 12,541,557 B1
(45) Date of Patent: Feb. 3, 2026

(54) PERSONA BASED MODELING SYSTEM

(71) Applicant: Block, Inc., San Francisco, CA (US)

(72) Inventor: Simen Smith Aulie, Oslo (NO)

(73) Assignee: Block, Inc., Oakland, CA (US)

( * ) Notice: Subject to any disclaimer, the term of this patent is extended or adjusted under 35 U.S.C. 154(b) by 77 days.

(21) Appl. No.: 18/333,788

(22) Filed: Jun. 13, 2023

(51) Int. Cl.
*G06F 16/9035* (2019.01)
*G06F 3/04817* (2022.01)

(52) U.S. Cl.
CPC ...... *G06F 16/9035* (2019.01); *G06F 3/04817* (2013.01)

(58) Field of Classification Search
None
See application file for complete search history.

(56) References Cited

U.S. PATENT DOCUMENTS

| 10,157,351 | B1* | 12/2018 | Rastogi | G06F 16/957 |
| 2016/0112362 | A1* | 4/2016 | Perazzo | G06Q 10/063114 455/466 |
| 2017/0193537 | A1* | 7/2017 | Gruen | G06Q 30/0204 |
| 2019/0266185 | A1* | 8/2019 | Rao | H04N 21/4758 |
| 2019/0354594 | A1* | 11/2019 | Foster | G06N 3/044 |
| 2019/0373297 | A1* | 12/2019 | Sarkhel | H04N 21/25841 |
| 2021/0350202 | A1* | 11/2021 | Zachariah | G06Q 30/02 |
| 2022/0253554 | A1* | 8/2022 | Goldsteen | G06F 21/6254 |
| 2022/0284340 | A1* | 9/2022 | Choudhary | G06N 20/10 |

FOREIGN PATENT DOCUMENTS

WO    WO-2016063092 A1 *   4/2016   ............ G06F 21/62

OTHER PUBLICATIONS

Jung SG, An J, Kwak H, Ahmad M, Nielsen L, Jansen BJ. Persona generation from aggregated social media data. In Proceedings of the 2017 CHI conference extended abstracts on human factors in computing systems May 6, 2017 (pp. 1748-1755). (Year: 2017).*
J. An, H. Kwak, S. Jung, J. Salminen, M. Admad, and B. Jansen. 2018. Imaginary People Representing Real Nos. Generating Personas from Online Social Media Data. ACM Trans. Web 12, 4, Article 27 (Oct. 2018), 26 pages. https://doi.org/10.1145/ 3265986 (Year: 2018).*
D Kim, J Lee, D Choi, J Choi, and J Kang. 2018. Learning User Preferences and Understanding Calendar Contexts for Event Scheduling. In The 27th ACM International Conference on Information and Knowledge Management (CIKM '18), Oct. 22-26, 2018, Torino, Italy. ACM, New York, NY, USA, 10 pages. (Year: 2018).*

(Continued)

*Primary Examiner* — Uyen T Le
(74) *Attorney, Agent, or Firm* — IP Spring

(57) ABSTRACT

Persona based modeling systems and techniques are described. In one or more examples, a user interface is displayed having a plurality of representations of a plurality of personas, each persona of the plurality of personas modeling one or more user characteristics. An input is received via the user interface as selecting a first persona and in response digital content is output via the user interface. The digital content is selected from a plurality of digital content based on the first persona. An input is then received selecting an option via the user interface to add the first persona to a second persona. A combined persona is generated based on the first persona and the second persona.

20 Claims, 28 Drawing Sheets

(56) References Cited

OTHER PUBLICATIONS

Negru, Stefan, and Sabin Buraga. "Persona Modeling Process." (2012). 9 pages (Year: 2012).*
Coorevits L, Schuurman D, Oelbrandt K, Logghe S. Bringing personas to life: user experience design through interactive coupled open innovation. Persona Studies. May 2016;2(1):97-114. (Year: 2016).*
Guo, Ao, and Jianhua Ma. "Archetype-based modeling of persona for comprehensive personality computing from personal big data." Sensors 18, No. 3 (2018): 684. (Year: 2018).*
Zelenik, Dusan, and Maria Bielikova. "Reducing the sparsity of contextual information for recommender systems." In Proceedings of the sixth ACM conference on Recommender systems, pp. 341-344. 2012 (Year: 2012).*

* cited by examiner

PERSONA BASED MODELING SYSTEM

TECHNICAL FIELD

Search techniques are used to support a variety of functionalities, examples of which are commonly involved in locating particular items as part of search functionality from potentially hundreds of thousands and even millions of items of digital content. However, conventional search techniques suffer from numerous technical challenges that limit accuracy, reduce operational efficiency of computing devices that implement these techniques, and increase power consumption.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
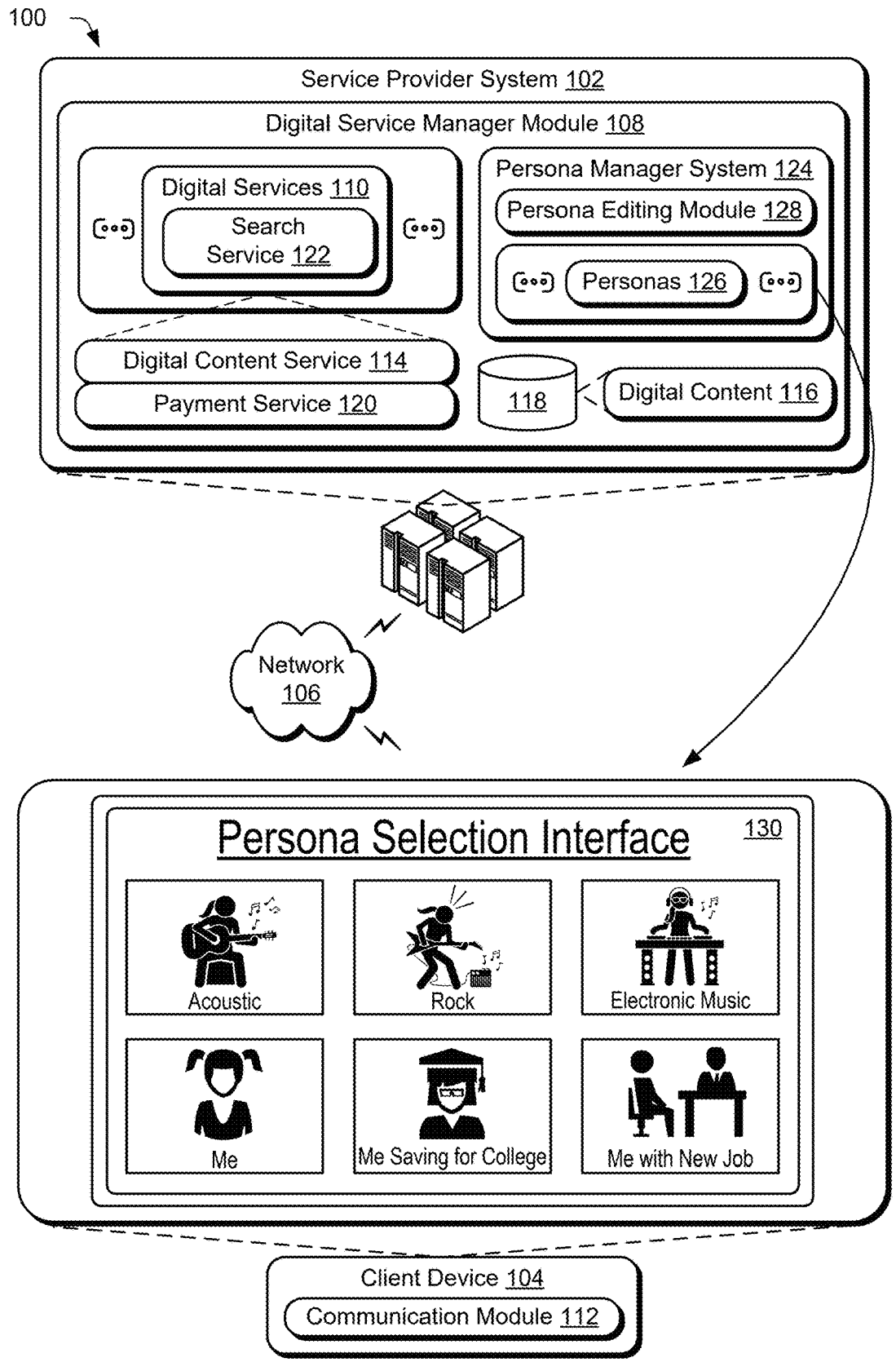
FIG. 1 is a block diagram depicting a non-limiting example system of digital services configurable to implement persona based modeling techniques as described herein according to an implementation of the present subject matter.

A variety of types of digital services, provided by service provider systems, rely on an ability implemented as part of a search to accurately determine the wants and desires of a user. Accuracy in this determination is usable to control what digital content is provided to a user (e.g., digital music, digital videos, etc.), a configuration of the digital services, as well as to control operation of supporting computing and network resources. The service provider system, for instance, relies on an accuracy in this determination as a basis of a search to provide relevant digital content to the user (e.g., as recommendations, targeted advertisements) and provision computational resources to provide the relevant digital content to the user.

The ability to accurately determine the wants and desires of a user, at its core, involves "stepping into the user's shoes." However, conventional search techniques do not provide insight into "how" the determination is made nor what characteristics are used as a basis for the determination. Consequently, conventional techniques that rely on this determination may lack accuracy in real world scenarios due to this lack of insight.

To address these technical challenges, persona based recommendation and modeling techniques are described. A persona is configured to model characteristics of an entity (e.g., using input training data) as seed information, e.g., demographic characteristics, financial information, an environment in which a user is disposed, and so on. The model is then usable as part of search functionality to generate recommendations (e.g., for music streaming), to model and predict future occurrences (e.g., for financial planning by a user, computational resource consumption, power consumption), and so forth.

A user interface, for instance, is configurable to output representations of a variety of different personas, each of which correspond to a defined set of user characteristics that are modeled using the persona. In digital music streaming examples, a plurality of different personas is usable to model different user characteristics as a fictional character or real-life individual. The personas are then selectable via the user interface to "step into someone else's shoes" based on the modeled characteristics, such as to experience an electronic music scene as a young adult in Paris. Other examples are also contemplated, such as to determine financial ramifications for actions undertaken by individuals, e.g., as having one or more dependents, retiring at a particular age, moving to a different geographic location, taking a new job, net worth, medical care, healthcare costs, insurance costs, and so forth. For merchants, examples include inventory costs, shipping fees, equipment costs, insurance costs, and so forth.

A variety of techniques may be used to create a persona, e.g., rule based, statistic based, machine-learning based, and so forth. In an implementation, anonymized data is collected and used as a basis to address a cold start problem and increase accuracy in generating a persona. The anonymized data, for instance, is obtained from users that correspond to the characteristics that are to be modeled by the persona. The data is then usable to form the persona as a model of these characteristics that is then used as a basis to generate recommendations or use by other techniques usable to control digital content output which is trained and retrained to learn preferences of a particular user over time. Personas and characteristics of the personas are editable, e.g., characteristics are divisible into separate personas and/or aggregated to form a combined persona.

Accordingly, the personas are configurable to function as atomic units as modeling respective characteristics. As such, personas are also usable to model different collections of characteristics for a same individual user, e.g., to model different likes and dislikes and thus avoid inaccuracies encountered in conventional recommendation techniques. Conventional recommendation techniques, for instance, typically rely on a single model per user as a basis to form recommendations. Consequently, conventional recommendation techniques are not adaptable to changing likes and dislikes of a user over time.

In the techniques described herein, however, separate personas are configurable of a same individual as "siloed" for different collections of user characteristics. A user, for instance, may initiate generation of a persona for different types of music and thus avoid a "bleed over" as experienced as a part of conventional recommendation techniques that, over time, result in an undesired convergence of recommendations. In this way, the personas support an ability to "test out" different types of digital content, effects of actions, and so forth without adverse consequences as involved in conventional techniques, e.g., unreversible changes to a particular persona.

In one or more examples, personas are usable to gain insight into other user views. Inputs received specifying a "20 year old living in LA, likes basketball" are usable, for instance, to obtain relevant data from users having or approximating those criteria. This data is then usable to form the persona as a model (e.g., as a machine-learning model, statistical techniques such as logistic regression, rules-based techniques, and so on) to control output of digital content, e.g., recommendations, personalize a webpage, and so forth. Continuing with the above example in a music streaming scenario, the model is usable to expose a homepage configured as to what it would be like to be a particular person through use of images based on geographic location, weather, music recommendations, and so forth. In this example, the user is provided insight as to "what it would be like for me to live at a particular location and having these qualities." The personas are also adjustable e.g., for age, interests, gender, financial resources, and so forth. Exploration/reward aspects are also usable to transition between personas, e.g., to control an ability find new music (i.e., explore) versus giving the user what they are known to like, i.e., reward.

Data describing current events is also usable in configuration of the persona. A persona manager system for instance, accesses a news application programming interface (API) in a local area when generating a persona and uses data obtained from the API to model and guide the persona for generating future recommendations. Personas are also configurable to leverage natural language understanding and text analysis to derive user characteristics being modeled, e.g., emotions, topics, and so forth. Consider an example in which a sporting event is going to be held at a geographic location at a particular point in time. Data describing user characteristics involved with this sporting event are extracted, expanded using generative artificial intelligence techniques, and then modeled by a persona. The persona is then used to control digital content output, e.g., streaming of music involving teams participating in the event, local influences based on the geographic location, and so forth.

In a city mix scenario, data is collected for a particular geographic location, such as to describe "what is popular in the geographic region" which is then modeled to form the persona. In order to promote discovery in an exploration/reward balancing implementation, recommendations are filtered that do not exhibit an influence based on the modeled user characteristics but rather are exhibited across user segments, e.g., to remove an influence of "generally popular" artists. The data may be further segmented for different personas. Filtering of artists based on geographic regions, for instance, is usable to obtain regional specific examples, e.g., through adjusting weights used by a recommendation engine as part of search functionality of a search service.

In a live event scenario, data is obtained that describes live events associated with a particular geographic region. The persona, for instance, is leveraged to help "transport a user mentally" beyond just playlists by creating a look and feel within an application or web page. For a live aspect, for instance, live playlists that will be featured at the local area are utilized as a basis to generate the persona and guide a subsequent search, e.g., to recommend digital content. Subsequent adjustments may then be made to further tailor the persona as desired. A user interface, for instance, includes an option to "include live events," which is then used to auto populate events, can then select events interested in as encouraging recommendations along those lines. In this way, a user is exposed to music that is to be made available at the live event and then may determine whether to participate at the event, with ticketing information provided via the user interface.

Control of digital content based on the personas is usable to generate recommendations as well as alter a look and feel of a homepage of the digital service, e.g., can reflect temperature and weather at that location for further immersions, cultural events, and so forth. The user interface is also configurable to support an ability to further explore the persona and user characteristics that form a basis of "what" is modeled by the persona and thus support insight that is not possible in conventional techniques. A persona involving an electronic music scene, for instance, is changeable for different geographic locations to access different viewpoints by consumers at those geographic locations.

A variety of additional usage scenarios are also supported through use of personas. In a calendar integration example, a persona is created to leverage information obtained from a calendar digital service indicating upcoming travel to a geographic location, e.g., to control digital content output to the user such as to stream music associated with the geographic location. A persona manager system is then configured to adjust weights for recommendations attributed to the persona based on the geographic location over time. The weights, for instance, may be increased over time by a persona manager system as progressing towards the travel date to increase a likelihood of recommendations that are based on the geographic location and decreased over time after the travel date. The persona, in one or more instances, may be stored separately from a main user profile and is made accessible after the event (e.g., to "relive" the experience) as indicated using a notification to revisit the trip persona profile at a later point in time, e.g., at the anniversary of the trip.

In another calendar digital service example, a calendar indicates an upcoming visitor. In response, the persona manager system outputs an option to generate a "visiting user persona." The visiting user persona, for instance, is configurable to leverage common likes and dislikes, gain insight into desires of the visitor (e.g., listen before the other users arrive as a basis for future discussion with the other users), and so forth.

The personas are also usable to model live events. Digital content streamed as part of a live DJ session, for instance, is usable as a basis to generate a persona that models that digital content. Additionally, other user characteristics associated with the live event are also usable as a basis to generate the persona, e.g., based on user demographics of the DJ and/or consumers of the live DJ session, geographic location at which the live DJ session is based, and so forth. As before, this persona may then be emphasized through use of weights to control digital content output.

Personas are configurable to function as atomic units as modeling respective characteristics. As such, personas are also usable to model different collections of characteristics for a same or different entities. By functioning as atomic units of collections of characteristics, personas also support functionality to form combinations of personas based on corresponding combinations of characteristics used to form the personas. The combinations are generated in a variety of ways. In one or more examples, source data that is used as a basis to form the personas individually is collected and modeled as a single combined persona. Other examples are also contemplated in which models that are used to implement the personas are combined, themselves, e.g., through use of concatenation, model-fusion, as an ensemble model, and so forth.

The underlying idea of "put me in your shoes" as described above is also configurable to provide user insight into future changes and financial scenarios that may be encountered by the user. The personas are usable, for instance, to determine "what would a user's financial decision making look like if I was in that person's shoes?" In some examples, personas can represent a group of users and, in some examples, personas can be represented by labels, objects, images, combinations of the foregoing or the like. For instance, a persona can correspond to a horoscope, a user type, or the like.

Techniques described above are leveraged to specify a baseline persona. In this instance, information of the user acts as a baseline for the persona. Changes are then made, e.g., five years from now, two kids, and so forth. Data is collected regarding the baseline persona along with the changes, which is then used to generate an updated persona to model those changes. As a result, the updated persona is usable to provide insight resulting from the changes, e.g., "if I had two kids, what would my investment recommendations look like?"

In this way, the persona acts to provide insight into "what would my financial decision making look like if I were in that person's shoes?" or "what actions should I take now to reach a goal later?" A user interface and corresponding personas, for instance, are usable to define scenarios in which the user has another dependent, the user's financial situation at a different age, an effect of moving to a different city, and so forth. For example, in a "what would it cost me to move to a particular city?" scenario, the persona is usable to provide cost of living insights, e.g., higher food costs, lower housing costs. In another example, insights are provided to the effect of adding dependents, single versus partnership versus married, residency at different locations, when nearing retirement, transitioning between different jobs, and so forth. Prompts are supported for actionable items as part of generating the persona, e.g., using generative artificial intelligence. The personas, as a predictor of future ramifications of actions undertaken by the user, are thus usable to provide insight to a user as far as "what can I do now to set myself up for achieving a desired outcome."

In the above examples, the personas are based on other people in a similar situation, and as such, has increased accuracy over "best guesses" made in conventional techniques. The personas are also usable to model characteristics of other entities (e.g., business entities) and as such act as a predictor of ramifications of actions undertaken by those entities. The personas are also usable over time to support additional insights, such as to surface notifications of changes to the assumptions later.

In a merchant scenario, for instance, transaction data is used to form personas to gain insights regarding an effect of adding a new franchise (including in a different city or state, how this addition would impact taxes, benefits, etc.), adding a new employee, addition of new services, and so forth. In a payment hardware scenario, the persona is usable to model a ramification of a change in hardware based on how that change has affected others that are modeled based on the persona, such as a change from a card reader to a tap device. Personas are also configurable to support marketing insights into competitor behavior. For example, a persona May be generated as modeling other merchants to indicate the effect advertising, different website configurations, and so forth have had on the other merchants.

In an implementation, a merchant system surfaces an option to provide financing in support of the action, e.g., a capital loan to purchase an item of equipment. Capital loans, for instance, may be provided as an option as part of a persona experience to help the merchant to perform a currently modeled action and achieve the predicted ramification. When modeling an effect of purchasing a new piece of equipment, for instance, an option is provided in the user interface that is user selectable to model use of a capital loan and how this capital loan would affect a corresponding business. An additional option may then be provided to formally request the capital loan. If the piece of equipment is moved from a predictive persona to a "main" persona of the merchant, for instance, an "official" offer for the capital loan is presented via the user interface.

Transaction data and merchant information (e.g., payroll, taxes, and so forth) may be anonymized and aggregated from multiple merchants by a merchant system to provide improved recommendations to merchants of different types in different scenarios. In some cases, data from different business types may be used to provide informed recommendations. Machine-learning techniques, for instance, may be used to identify outlook categories where business type does affect an outlook (e.g., adding a new product for sale and thus limiting to similar business types is appropriate) versus outlook categories where business type does not affect an outlook, e.g., cost of real estate as an expense and thus can analyze data from vastly different business types. Machine learning techniques are usable to identify which categories are business-dependent and provide recommendations accordingly. A variety of other examples are also contemplated, further discussion of which is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Persona Based Modeling Environment

FIG. 1 is a block diagram depicting a non-limiting example system 100 of digital services configurable to implement persona based modeling techniques as described herein according to an implementation of the present subject matter. This example system 100 includes a service provider system 102 and a client device 104 that are communicatively coupled, one to another, via a network 106.

Computing devices that implement the system 100 are configurable in a variety of ways. A computing device, for instance, is configurable as a server, a desktop computer, a laptop computer, a mobile device (e.g., assuming a handheld configuration such as a tablet or mobile phone), an IoT device, a wearable device (e.g., a smart watch), an AR/VR device, and so forth. Thus, a computing device ranges from full resource devices with substantial memory and processor resources to low-resource devices with limited memory and/or processing resources. Although in instances in the following discussion reference is made to a computing device in the singular, a computing device may also represent any number of different computing devices, such as multiple servers of a server farm utilized to perform operations "over the cloud" as further described below.

The service provider system 102 includes a digital service manager module 108 that represents functionality usable to implement and manage operation of digital services 110. Digital services 110 are accessible remotely over the network 106 in the illustrated example by the client device 104 using a communication module 112, e.g., a network-enabled application, plug-in module, browser, and so forth. The service provider system 102, as implementing a network platform, implements the digital services 110 through execution of software by respective servers or other hardware devices.

Digital services 110 are configurable to support a wide variety of functionalities. Digital services 110, for instance, support a digital content service 114 that is used to manage and control output of digital content 116 from a storage device 118. Examples of digital content 116 include digital images, webpages, digital music, digital videos, social media posts, and so forth. The digital services 110 are also configurable to implement a payment service 120 and the digital content 116 involves transaction data utilized as part of the payment service 120. The payment service 120, for instance, supports person-to-person transactions and payment processing.

An additional example of a digital service 110 (and functionality included as part of implementing the digital services) includes a search service 122. In one or more examples, the search service 122 is usable to locate particular items of digital content 116 based on a search query. The search service 122, for instance, is configurable to support functionality to directly locate items of digital content 116. The search service 122 is also configurable in support of other digital services. A recommendation engine, for instance, is implemented by the search service 122 to generate a search result as content-based recommendations of items of digital content 116, e.g., based on a user's past behavior and exhibited preferences, use of collaborative filtering, implemented to hybrid recommendations, and so forth.

As previously described, digital services 110 often rely on an ability to accurately determine the wants and desires of a user, e.g., to form recommendations, locate digital content 116 of interest, and so on. Conventional techniques, however, provide limited insight into how this determination is made, which has a direct effect on accuracy of techniques that rely on this determination.

Accordingly, the digital service manager module 108 in the illustrated example includes a persona manager system 124. The persona manager system 124 is representative of functionality to generate and maintain personas 126 as a model of a defined set of characteristics associated with an entity. A persona editing module 128 is representative of functionality to edit personas, e.g., to divide a persona into multiple personas, combine personas, update personas, and so forth.

The personas 126 are configurable to represent different sets of characteristics of a particular entity, represent other entities, and so forth. In this way, the personas 126 support an ability to address how supporting functionality that relies on the personas 126, such as a search service 122 as part of the digital services 110, arrives at a desired output.

In the illustrated example, a persona selection interface 130 is output by a client device 104. The persona selection interface 130 includes representations of personas 126 that are usable as part of interaction with a variety of digital services 110. The persona selection interface 130, for instance, includes representations of personas that are user selectable as part of a digital content service 114 to stream digital content 116, e.g., digital music.

A user input, for instance, is received via the persona selection interface 130 to select from an acoustic persona representation, rock persona representation, or electronic music persona representation. In response, a corresponding persona 126 is obtained by the persona manager system 124. The corresponding persona 126 is executed as part of the digital content service 114 and search service 122 to locate items of digital content 116 (e.g., digital music) as recommended to be streamed to the client device 104 via the network 106. The corresponding personas 126, for instance, are configurable to model different characteristics of a same user, represent musical tastes of different users, and so forth.

In another example, the representations of the personas are predicative to represent a user and potential ramifications of actions undertaken by the user. In the illustrated example, the persona selection interface 130 also includes a baseline persona representation, a saving-for-college persona representation, and a new job person representation. These representations are user selectable as leveraging a payment service 120 to determine financial ramifications of actions taken by the user, e.g., to save for college, an effect of a new job, and so forth.

A "saving-for-college" persona representation, for instance, is user selectable to cause the persona manager system 124 to obtain a baseline persona associated with the user and collect data describing a corresponding action as experienced by other users. The collected data is used to update the baseline persona in order to generate an updated persona by the persona editing module 128 that is usable to model financial ramifications of the effect of the action (e.g., saving for college) on the user. As a result, the persona acts as a guide regarding an effect of actions taken with increased accuracy as a model of an effect of those actions as experienced by other users. In this say, the persona provides increased accuracy over conventional "best guess" techniques as a model of actual user experiences regarding the action. A variety of other examples are also contemplated as further described in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Persona Based Modeling System

Figure 2:
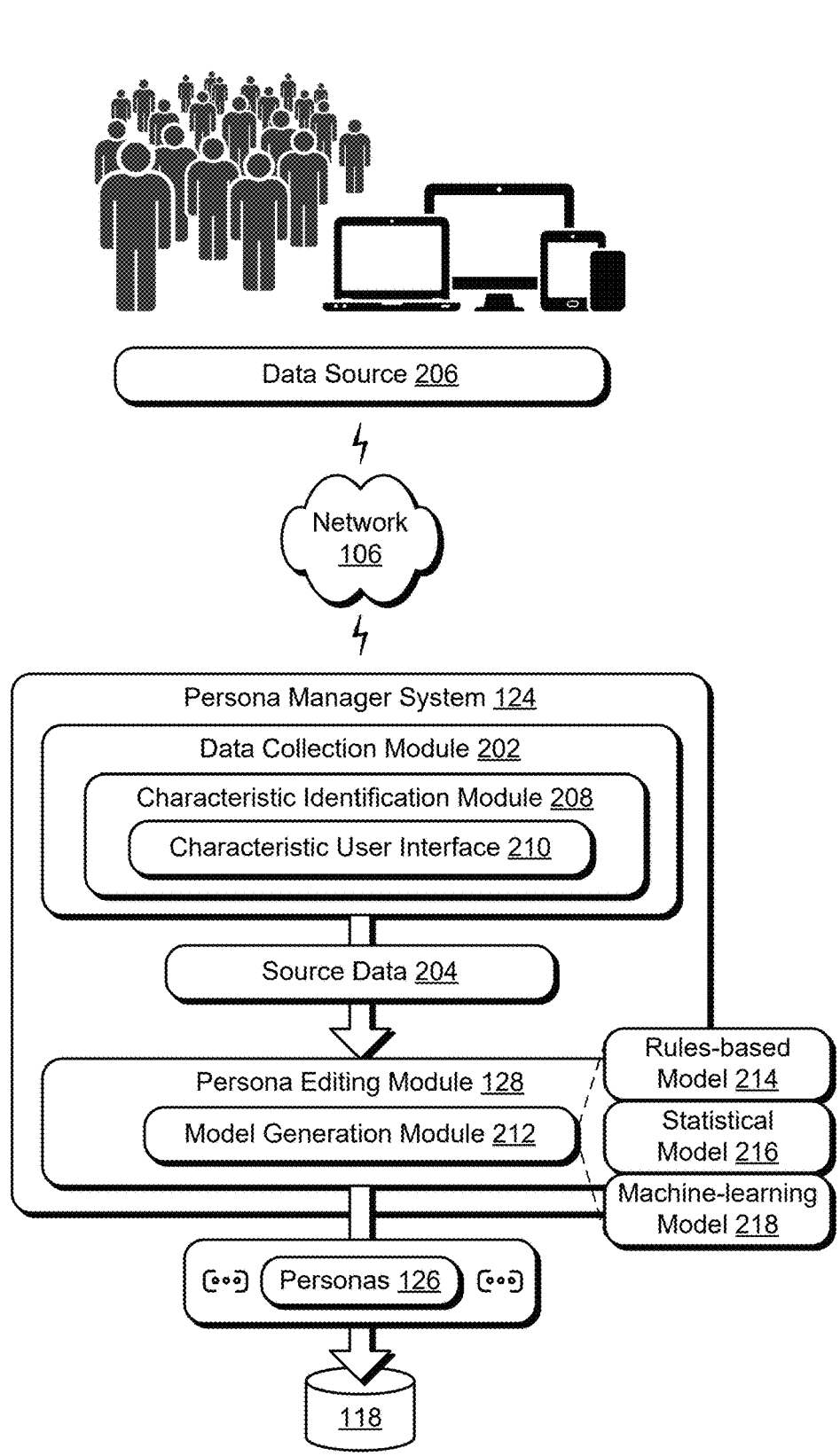
FIG. 2 is a block diagram depicting a non-limiting example system of operation of a persona manager system of FIG. 1 to implement persona based modeling techniques to generate personas as described herein according to an implementation of the present subject matter.

FIG. 2 is a block diagram depicting a non-limiting example system 200 of operation of a persona manager system of FIG. 1 to implement persona based modeling techniques to generate personas as described herein according to an implementation of the present subject matter. The persona manager system 124 includes a person editing module 128 that is used to generate personas 126 as modeling collections of characteristics of an entity, e.g., user characteristics of a user, financial characteristics of a merchant, and so forth. The personas 126 also function as a model of ramifications of actions undertaken by entities having those characteristics, which may serve as a basis to generate recommendations, predict future financial outcomes, and so forth.

To do so, a data collection module 202 is employed to collect source data 204 from a data source 206. The source data 204 describes the characteristics to be modeled by the personas 126. A characteristic identification module 208, for instance, outputs a characteristic user interface 210, via which, inputs are received to identify the characteristics to be modeled, e.g., demographics, business aspects, and so forth. The characteristic user interface 210 supports text inputs, spoken utterances, gestures, and so forth to specify the characteristics.

The characteristic user interface 210 is also configurable to populate options in the user interface as a prompt for specifying the characteristics, e.g., using drop-down menus. In one or more implementations, generative artificial intelligence (AI) techniques are used as a prompt for inputs and is also usable to refine data being provided as an input. The characteristic identification module 208, for instance, may generate a prompt for data describing the characteristics which may be refined using generative AI as inputs are received for further information, e.g., to define a sequence of follow-up questions. In order to generate a persona for a specify type of music, for instance, the characteristic identification module 208 may employ generative AI to first request an input defining a genre and then leverage generative AI to further refine characteristics based on subsequent responses received via the characteristic user interface 210.

As a result, the generative AI may dynamically adapt to ever changing characteristics that may be used as a basis to generate a persona.

A wide variety of characteristics may serve as a basis to form a persona 126 by the persona manager system 124, examples of which include demographic information, financial information, actions and corresponding ramifications of those actions, and so forth. Likewise, a wide variety of data sources 206 may serve as a basis to obtain the source data 204 that describes these characteristics, examples of which include social media services, transaction services, digital content sources, and so on as further described in relation to FIG. 3.

The source data 204 is passed as an input from the data collection module 202 to the persona editing module 128. The persona editing module 128 includes a model generation module 212 that is representative of functionality to generate the personas 126 as models of the source data 204. A variety of types of models may be generated by the model generation module 212, examples of which include a rules-based model 214, a statistical model 216, and a machine-learning model 218.

In order to generate the rules-based model 214, the characteristic identification module 208 identifies relevant characteristics that influence a behavior being modeled. Examples of the characteristics include demographic information, preferences, past behavior, and context in which actions are undertaken and the ramifications of those actions. The model generation module 212 then generates rules as logical expressions that model the characteristics, actions, and resulting ramifications, e.g., outcomes.

The rules-based model 214 in a recommendation scenario, for instance, is usable to generate recommendations as part of a search based on modeled user behavior as implemented by the logical expressions. The rules-based model 214 also serves as a basis to analyze the ramifications as potential consequences of actions undertaken by entities having the corresponding characteristics, e.g., as a predictor of potential financial ramifications of corresponding actions as described above. Validation and refinement functionality may also be employed by the persona editing module 128 to validate effectiveness and refine the rules over time thereby increasing accuracy of the rules-based model 214.

The statistical model 216 is configured to employ logic to mathematically model patterns and relationship between variables. Similar to a rules-based approach, the characteristics are identified that influence "what" is being modeled, but in this instance are configured as variables. The data collection module 202 then collects source data 204 from the data source 206 based on these variables. The model generation module 212, upon receipt of the source data 204, utilizes one or more statistical techniques to model relationships between the variables, examples of which include regression analysis, clustering techniques, classification techniques, and so forth. The statistical model 216, once generated, is usable as part of search techniques to generate recommendations, model ramifications of actions, and so forth as previously described. Validation and refinement functionality is also employable in this scenario to improve accuracy of the statistical model 216 over time by the model generation module 212.

The machine-learning model 218 is also trained using the source data 204 to implement the personas 126. A machine-learning model refers to a computer representation that can be tuned (e.g., trained and retrained) based on inputs (i.e., the source data 204) to approximate unknown functions. In particular, the term machine-learning model 218 can include a model that utilizes algorithms to learn from, and make predictions on, known data by analyzing the source data 204 to learn and relearn to generate outputs that reflect patterns and attributes of the source data 204, i.e., as training data. Examples of machine-learning models 218 include neural networks, convolutional neural networks (CNNs), long short-term memory (LSTM) neural networks, decision trees, and so forth.

Figure 3:
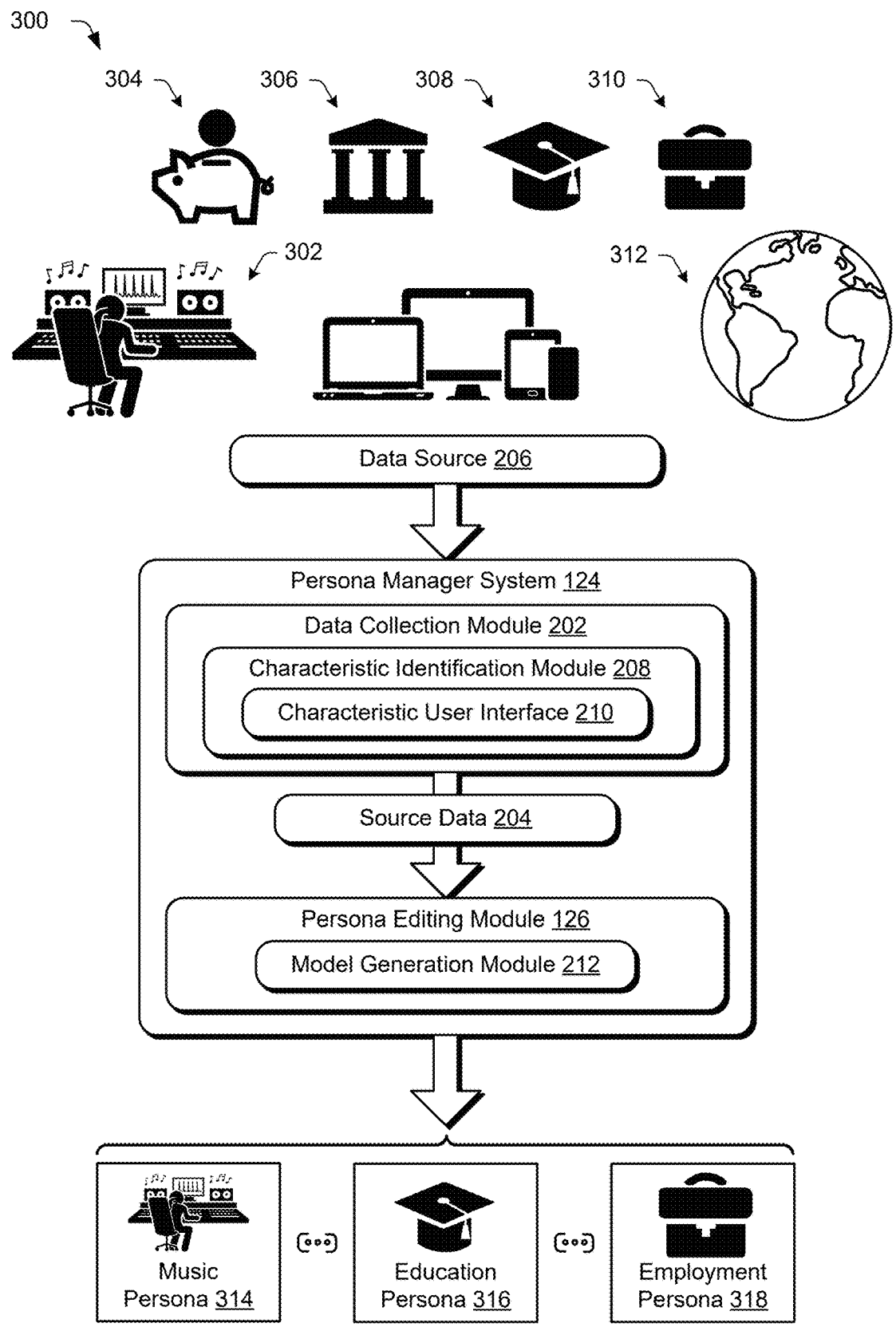
FIG. 3 is a block diagram depicting a non-limiting example system of operation of a persona manager system of FIG. 2 as obtaining source data from a variety of different sources as described herein according to an implementation of the present subject matter.

FIG. 3 is a block diagram depicting a non-limiting example system 300 of operation of a persona manager system of FIG. 2 as obtaining source data from a variety of different sources as described herein according to an implementation of the present subject matter. In an implementation in which the source data 204 is used to address a "cold start" problem by leveraging data from other users, the source data 204 is anonymized by removing personally identifiable information.

The anonymized data, for instance, is obtained from users that correspond to characteristics that are to be used for modeling by a respective persona.

A variety of different characteristics may be modeled by the model generation module 212 from source data 204. Likewise, the source data 204 may be obtained from a variety of data sources 206 in order to describe the characteristics being modeled. In a music data source 302 example, the source data 204 is configured to include demographic data including information describing a user's age, gender, location, language, or other characteristics. The source data 204 is also configurable to describe a music listening history about the user's past behavior, user feedback and preferences, as well as social network data describing reviews and comments. The source data 204 is also configurable to include contextual characteristics such as a time of day, location, weather, and other characteristics affecting music preferences.

In a retirement savings source 304 example, the source data 204 is also configurable to include demographic and contextual characteristics. The source data 204 is further configurable to describe characteristics such as a planned retirement age, types of retirement savings, account balances, life expectancy data, and so forth.

In a payment source 306 example, the source data 204 is configurable to describe account balances, such as an amount of money available via checking, savings, and investment accounts. The source data 204 is also configurable to describe a transaction history of past transactions including deposits, withdrawals, transfers as well as a date, time and/or location of the transactions. Budgeting data is also included as part of the source data 204 to describe a user's budget with respect to an income, expenses, and savings goals. A credit score and credit history are also includable as part of the source data 204 from the payment source 306.

In an education source 308 example, the source data 204 describes classes and grades received, schools attended, geographic locations of the schools, acceptance rates, and course syllabi associated with an entity, e.g., the user and/or the educational institution. The source data 204 is also configurable to describe costs associated with obtaining an education, such as tuition costs, housing costs, meal costs, transportation costs, and so on.

For an employment source 310 example, the source data 204 describes characteristics associated with employment of the user and/or employment at a particular entity, e.g., merchant. As such, the source data 204 is configurable to describe characteristics associated with user employment, including wages, hours worked, word schedule, work title, job description, geographic location, wage history, job history, and so forth. From a business entity perspective, the source data 204 is configurable to describe a number of employees, wages, work hours, geographic location, equipment, equipment costs, rent, facility costs, employment taxes, business taxes, utility costs, and so forth.

In a geographic source 312 example, the source data 204 describes characteristics associated with corresponding geographic locations. Examples of these characteristics include cost of living, housing costs, commute times, education costs, median home price, median wages, quality of living score, local activities and events, and so forth. A variety of other examples are also contemplated.

The model generation module 212 as described in relation to FIG. 2 above, is then usable to generate the profile for the different types of source data 204. Illustrated examples of personas include a music persona 314, an education persona 316, and an employment persona 318 generated for source data 204 from the music data source 302, the education source 308, and the employment source 310, respectively. Multiple personas may also be generated from a single data source 206, such as to express different combinations of characteristics to be used in conjunction with that source, an example of which is described as follows.

Figure 4:
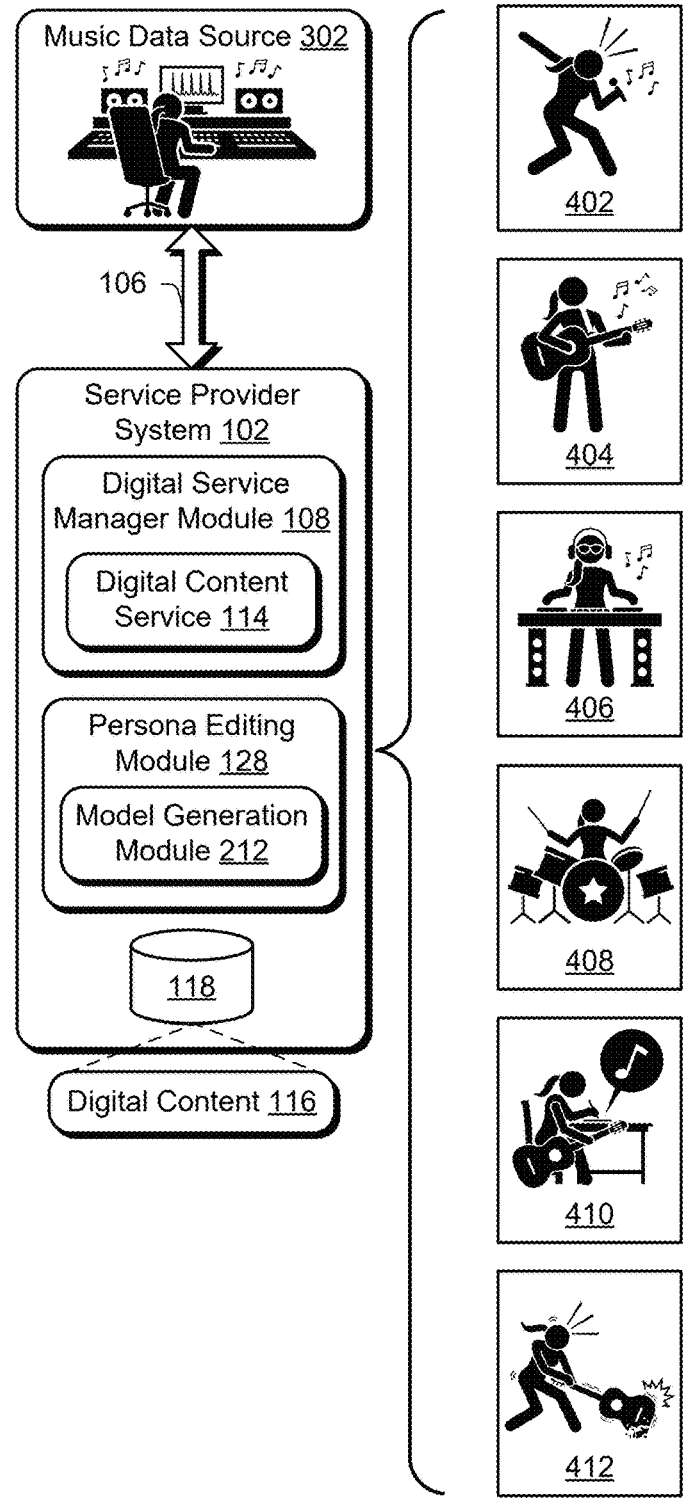
FIG. 4 is a block diagram depicting a non-limiting example system of operation of a persona manager system of FIG. 2 as generating a plurality of personas for use with a single digital service as described herein according to an implementation of the present subject matter.

FIG. 4 is a block diagram depicting a non-limiting example system 400 of operation of a persona manager system of FIG. 2 as generating a plurality of personas for use with a single digital service as described herein according to an implementation of the present subject matter. In the previous examples, personas 126 are generated for respective digital services 110. Additional examples are also contemplated in which a plurality of personas is generated for use with a single digital service 110. The personas 126 are configurable in a variety of ways as modeling different collections of user characteristics.

In one or more examples, the personas 126 are generated by the model generation module 212 as preconfigured from source data 204 associated with different users. The personas 126, for instance, are configured to address different segments of a user population, e.g., teenagers, at different geographic locations, job types, and so forth.

In one or more additional examples, the personas 126 are generated as mimicking behavior of real-world individuals (e.g., celebrities, artists) and therefore are usable to control digital content output as would be desired by a particular individual. A persona for a musical artist, for instance, is generated based on digital music consumed by that artist, created by that artist, and so forth which is then offered in a user interface for use by other users. Representations, for instance, are output in a user interface as representing characteristics of a particular artist in order to control digital content output in a manner that would be desirable by that artist.

In one or more further examples, the personas 126 are used to represent different collections of characteristics associated with a same individual. In the illustrated example, for instance, personas are used to represent different musical tastes associated with an individual, including a singer persona 402, acoustic persona 404, electronic music persona 406, arena rock persona 408, songwriter persona 410, and grunge persona 412. Each of these personas are selectable by a user to utilize modeled characteristics as a basis to recommend items of digital content (e.g., digital music) from a music data source 302 in the illustrated example.

In this way, each of the personas is based on a defined set of characteristics that helps prevent "bleed over" of conventional recommendation techniques. For example, some conventional techniques rely on user feedback provided with respect to individual items of digital content 116, e.g., as "likes" or "thumbs up." However, this technique in real-world scenarios often results in inclusion of digital content from different genres that may not be compatible with each other.

In the techniques described herein, on the other hand, the characteristics are "siloed" with respect to each other, thereby supporting a degree of user control that is not possible in conventional techniques. The personas, for instance, support an ability of the user to "test out" different characteristics using different personas, which may then be added to form a combined persona when desired as further described below with respect to FIGS. 7-9.

Figure 5:
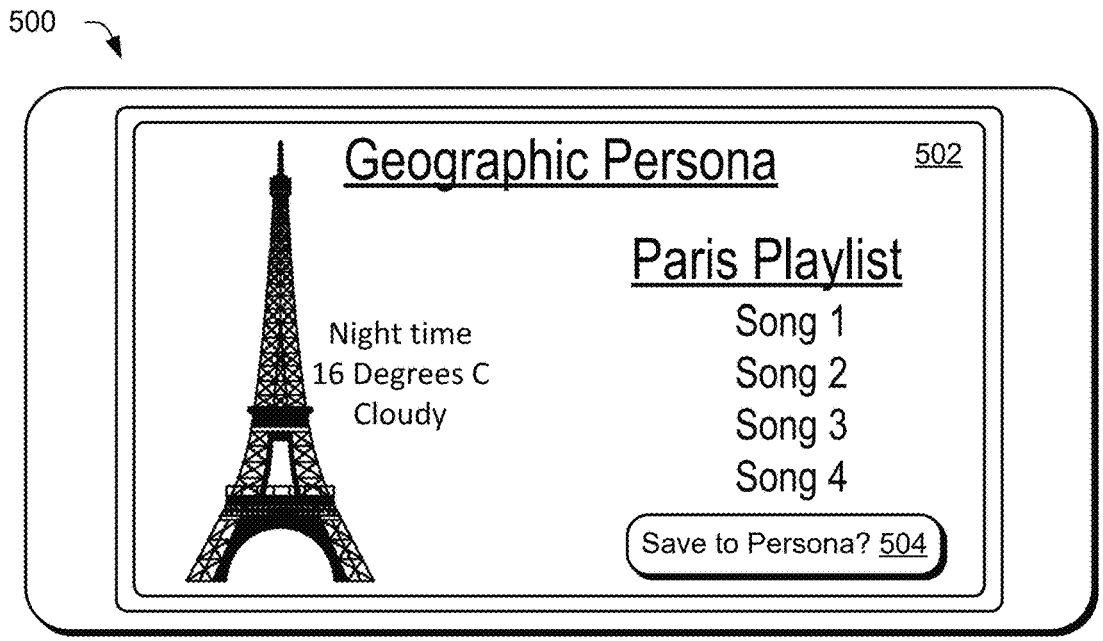
FIG. 5 is a block diagram depicting a non-limiting example system of control of digital content output based on a geographic persona as described herein according to an implementation of the present subject matter.

FIG. 5 is a block diagram depicting a non-limiting example system 500 of control of digital content output based on a geographic persona as described herein according to an implementation of the present subject matter. Personas are also configurable to "step into someone else's shoes" based on the modeled characteristics, such as to experience an electronic music scene as a young adult in Paris in the illustrated example. To do so, inputs are received via a characteristic user interface 210 that specify characteristics to be used as a basis to generate the persona, e.g., "Paris," "electronic music," and "young adult." The model generation module 212 then generates the persona 126 as modeling these characteristics.

The persona 126 is then used by a music data source 302 to control output of digital content 116 to a respective user as well as configure a user interface 502. The user interface 502 as illustrated in FIG. 5, for instance, includes representations of weather conditions at a specified geographic location as well as a background digital image as representative of the geographic location, e.g., the Eiffel Tower as representative of Paris. The user interface 502 (e.g., as a homepage) also includes representations of the digital content that are recommended based on the persona, e.g., Song 1, Song 2, Song 3, and Song 4. An option 504 is also included to save the persona, such as the recommended digital content to a particular persona, combine the geographic persona with another person, and so on.

In this way, personas 126 are usable to gain insight into other user views. Inputs received specifying a "20 year old living in LA, likes basketball" is usable, for instance, to obtain relevant data from users having or approximating those criteria. This data is then usable to form the persona as a model that is usable to control output of digital content, e.g., recommendations, personalize a webpage, and so forth. The geographic persona, for instance, is usable to expose a homepage configured to indicate what it would be like to be a particular person through use of images based on geographic location, weather, music recommendations, and so forth. In this example, the user is provided insight as to "what it would be like for me to live at a particular location and have these qualities." The personas are also adjustable e.g., for age, interests, financial resources, geographic locations, and so forth.

Figure 6:
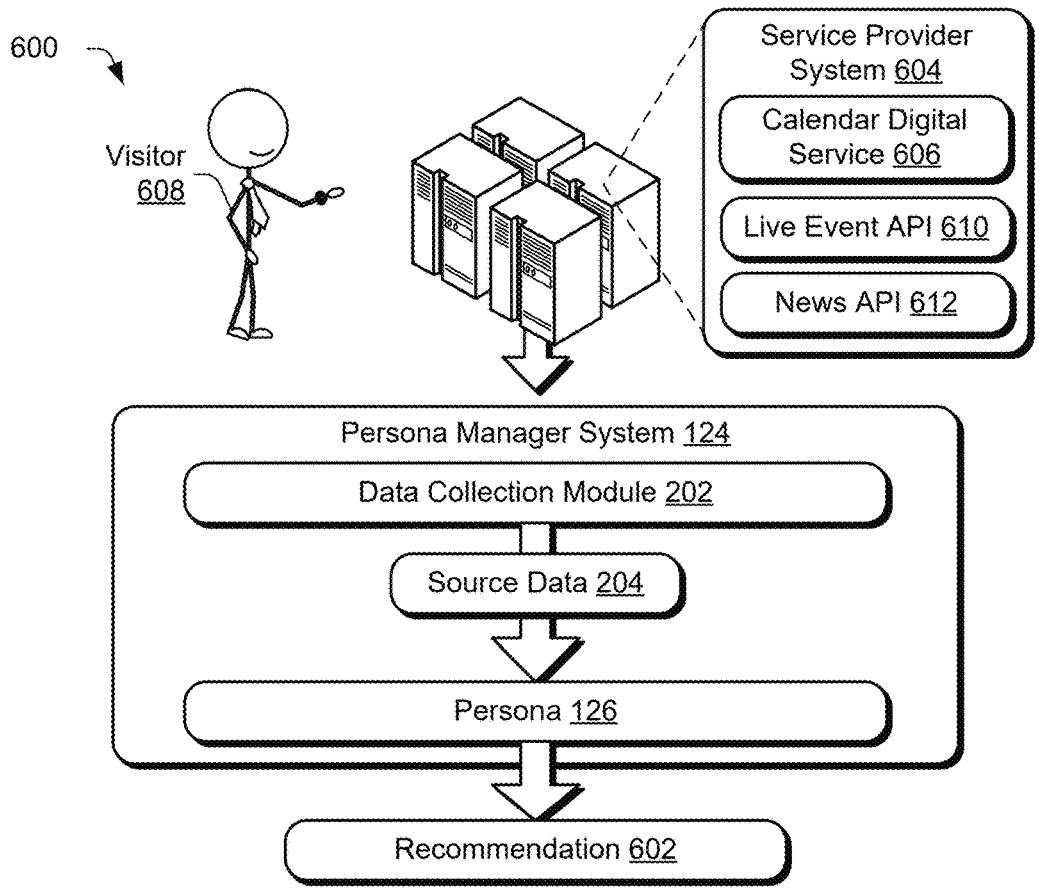
FIG. 6 is a block diagram depicting a non-limiting example system of recommendation generation based on a persona as described herein according to an implementation of the present subject matter.

FIG. 6 is a block diagram depicting a non-limiting example system 600 of recommendation generation based on a persona as described herein according to an implementation of the present subject matter. As previously described, the persona manager system 124 includes a data collection module 202 that is configured to collect source data 204 from a variety of data sources 206. The source data 204 is then used to generate a persona 126 that serves as a basis to form a recommendation 602 as part of search service 122 to locate digital content 116 of interest. The recommendation 602 supports a variety of usage scenarios.

A service provider system 604, for instance, includes a calendar digital service 606. A persona 126 created to leverage the calendar digital service 606 is utilized to identify events from calendar data in order to control digital content output. Continuing the pervious example of FIG. 5, for instance, the calendar digital service 606 may indicate upcoming travel to a geographic location, e.g., Paris. In response, the data collection module 202 obtains source data 204 that is used to generate the geographic persona, such as to stream music associated with the geographic location.

The persona manager system 124 may also adjust weights for recommendations 602 attributed to the persona 126 based on the geographic location over time. The weights, for instance, may be increased over time by a persona manager system 124 as progressing towards the travel date as indicated by the calendar data to increase a likelihood of recommendations that are based on the geographic location and decreased over time after the travel date. The persona, in one or more instances, may be stored separately from a main user profile and is made accessible after the event (e.g., to "relive" the experience) as indicated using a notification to revisit the trip persona profile at a later point in time, e.g., at the anniversary of the trip.

In another calendar digital service 606 example, an event in the calendar data indicates an upcoming visit from other users, illustrated as visitor 608. In response, the persona manager system 124 generates the persona 126 as a "visiting user persona." The visiting user persona, for instance, is configurable to leverage common likes and dislikes, gain insight into desires of the visitor 608 (e.g., listen before the visitor 608 arrives as a basis for future discussion), and so forth.

The personas are also usable to model live events using source data 204 obtained from a live event application programming interface, which is illustrated as a live event API 610. Digital content streamed as part of a live DJ session, for instance, is usable as a basis to generate a persona 126 that models that digital content 116, e.g., digital music, supporting visuals, and so forth.

Additionally, other characteristics associated with the live event are also usable as a basis to generate the persona, e.g., based on user demographics of the DJ and/or consumers of the live DJ session, geographic location at which the live DJ session is based in a similar manner to the geographic persona of FIG. 5, and so forth. As before, this persona may then be emphasized through use of weighting techniques to control digital content output as the live event nears and/or performance of the live event has passed.

Data describing current events is also usable in configuration of the persona. The persona manager system 124, for instance, accesses a news API 612 in a local area when generating a persona 126. Source data 204 obtained from the news API 612 to model the persona as a guide for generating future recommendations. The news API 612, for instance, may indicate an upcoming event similar to the examples for the calendar digital service 606 and the live event API 610, the persona 126 is generated and used to generate a recommendation 602 that takes into account an upcoming occurrence of the event, such as to stream digital music corresponding to the teams, geographic location at which the event is to occur, and so forth.

In order to promote discovery in an exploration/reward balancing implementation, recommendations are filtered by the persona manager system 124 that do not exhibit an influence based on the modeled user characteristics but rather are exhibited across user segments, e.g., to remove an influence of "generally popular" artists. Filtering of artists based on geographic regions, for instance, is usable to obtain region specific examples, e.g., through adjusting weights used by a recommendation engine. In a music centric geographic location such as Nashville, for instance, preferences are reflected in the data itself which is then usable to control subsequent data output by the persona 126 as defined for that location. Having described a variety of examples of persona generation and use, the following section includes examples of combining personas.

Persona Combination Techniques

The following discussion describes persona combination techniques that are implementable utilizing the previously described systems and devices. Aspects of the procedure are implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 7-12 in parallel with an example procedure 1300 of generating a combined persona of FIG. 13.

Figure 7:
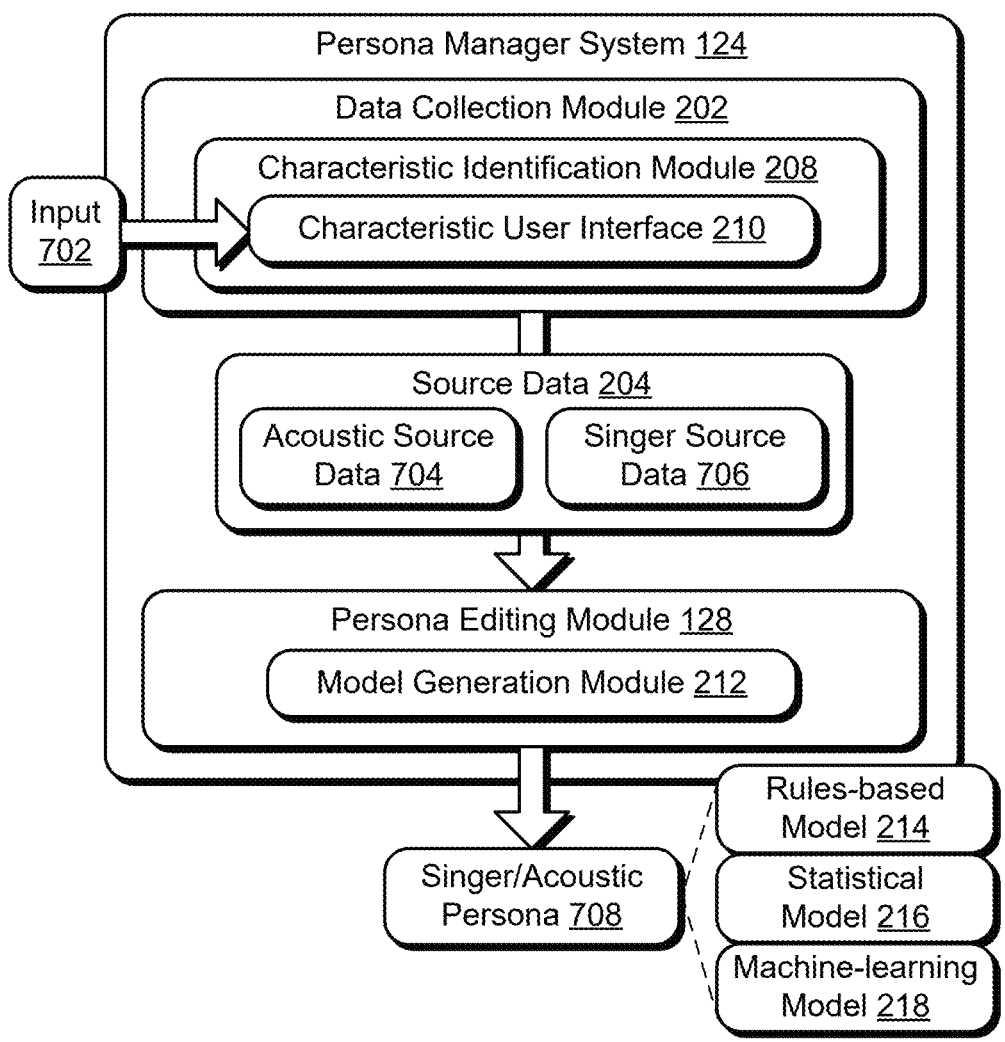
FIG. 7 is a block diagram depicting a non-limiting example system of generation of a combined persona based on source data as described herein according to an implementation of the present subject matter.

FIG. 7 is a block diagram depicting a non-limiting example system 700 of generation of a combined persona based on source data as described herein according to an implementation of the present subject matter. The persona manager system 124 as previously described includes a data collection module 202 that is configured to collect source data 204 based on an input 702 received via a characteristic user interface 210. The input 702, for instance, identifies characteristics that are to be modeled by a model generation module 212 as part of forming a persona 126.

Personas 126 are configurable to function as atomic units as modeling respective characteristics. As such, personas 126 are also usable to model different collections of characteristics for a same or different entities as described above. By functioning as atomic units of collections of characteristics, the personas 126 also support functionality via the persona manager system 124 to form combinations of personas 126 based on corresponding combinations of characteristics used to form the personas 126. The combined personas are generated in a variety of ways.

In one or more examples, source data 204 that is used as a basis to form the personas individually is collected and modeled as a single combined persona. Consider an example in which a user is exposed to digital content generated using an acoustic persona and an input 702 is received indicating the user wishes to combine the acoustic persona with another persona of interest, e.g., a singer persona. Source data 204 is collected that includes acoustic source data 704 and singer source data 706 which is then used by a model generation module 212 to generate a combined singer/acoustic persona 708. The combined singer/acoustic persona 708, for instance, is configurable as a rules-based model 214, statistical model 216, and/or machine-learning model 218 as previously described in relation to FIG. 2. Thus, in this example the model generation module 212 generates the combined persona based on source data 204 associated with characteristics used to generate the acoustic persona and the single persona, individually. Other examples are also contemplated in which models that are used to implement the personas are combined, themselves.

Figure 8:
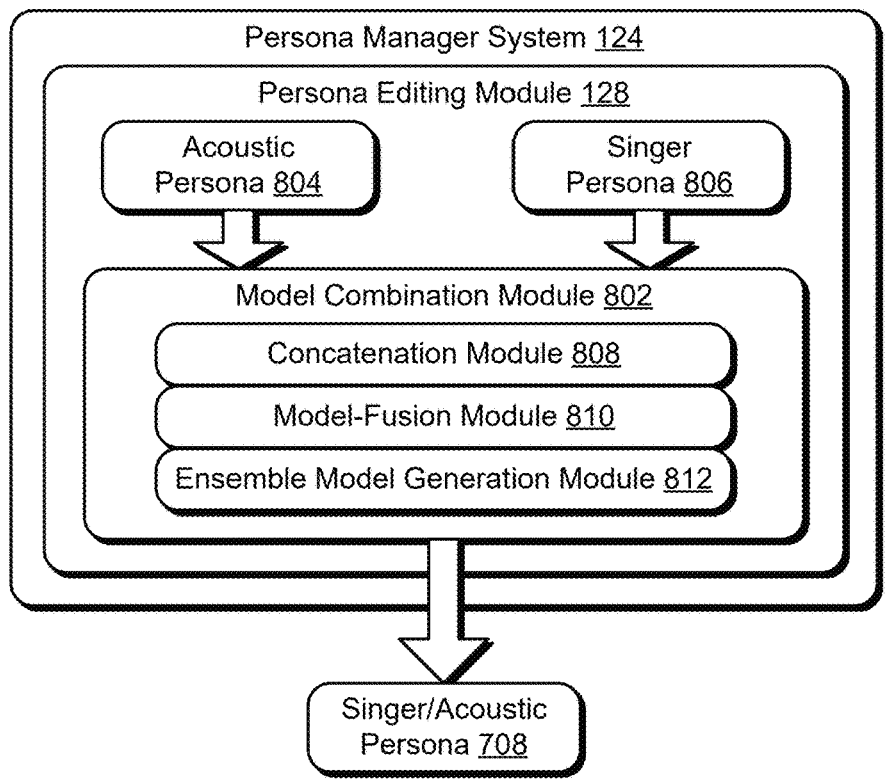
FIG. 8 is a block diagram depicting a non-limiting example system of generation of a combined persona from individual personas and underlying models as described herein according to an implementation of the present subject matter.

FIG. 8 is a block diagram depicting a non-limiting example system 800 of generation of a combined persona from individual personas and underlying models as described herein according to an implementation of the present subject matter. In this example, the persona editing module 128 employs a model combination module 802 to generate a combined persona, an example of which is illustrated as singer-acoustic persona 708, based on underlying models of the acoustic persona 804 and singer persona 806.

In a rules-based scenario, for instance, underlying logic used to form the respective models is combined into a single unified logical representation, e.g., of logical operators, if/then statements, and so forth. In a statistical example, mathematical techniques are used to combine the statistical mathematical representations formed using regression analysis, clustering techniques, and so forth.

In the illustrated machine-learning scenario, the model combination module 802 includes modules representative of techniques usable to combine functionality of two or more machine learning models. In one or more examples, a concatenation module 808 is utilized to concatenate first and second machine-learning models together to form the combined persona. To do so, an output of a first machine-learning model is provided as an input to a second machine-learning model. This combination is formable using a variety of types of machine-learning models, examples of which include deep learning models such as neural networks. The combined model, for instance, is configurable as a single end-to-end model having multiple interconnected layers formed from the machine-learning model implementing the acoustic persona 804 and the machine-learning model implementing the singer persona 806.

In one or more additional examples, a model-fusion module 810 is utilized to generate a combined persona using model level fusion, e.g., feature-level fusion or decision-level fusion for first and second machine-learning models. Feature-level fusion involves a technique in which features extracted by both models are combined into a single feature set, which is then used as input to an additional machine-learning model. This technique has exhibited increased utility in instances in which both machine-learning models have been trained on different feature sets or modalities, and the combined feature set is leveraged for improved performance. Decision-level fusion involves combining the outputs of the first and second machine-learning models, e.g., using averaging, voting, or stacking.

The ensemble model generation module 812 is configured to generate the combined persona as an ensemble model, which like the decision-level fusion combines outputs of the model combination module 802 and the singer persona 806. An example of configuration of a combined singer/acoustic persona 708 as an ensemble model is further described in the following discussion and shown in a corresponding figure.

Figure 9:
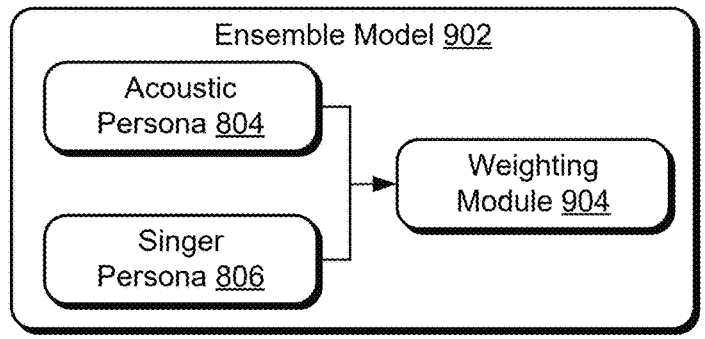
FIG. 9 is a block diagram depicting a non-limiting example system of generation of a combined persona as an ensemble model 902 as described herein according to an implementation of the present subject matter.

FIG. 9 is a block diagram depicting a non-limiting example system 900 of generation of a combined persona as an ensemble model 902 as described herein according to an implementation of the present subject matter. The ensemble model 902 in this example includes machine-learning models used to implement the acoustic persona 804 and the singer persona 806.

The ensemble model 902 also includes a weighting module 904 that is configured to apply weights to outputs of the respective machine-learning models to achieve an overall result. The weighting module 904, for instance, is configurable as another machine-learning model to implement a second-level learner (also referred to as a "meta-model") that is trained and retrained over time to learn how best to combine the outputs of the acoustic persona 804 and the singer persona 806 to achieve greater accuracy, e.g., based on monitored feedback. A variety of other combined persona configurations are also contemplated. Regardless of how generated, the formation of the combined persona supports a variety of usage scenarios, an example of which is described as follows and is shown in a corresponding figure.

Figure 10:
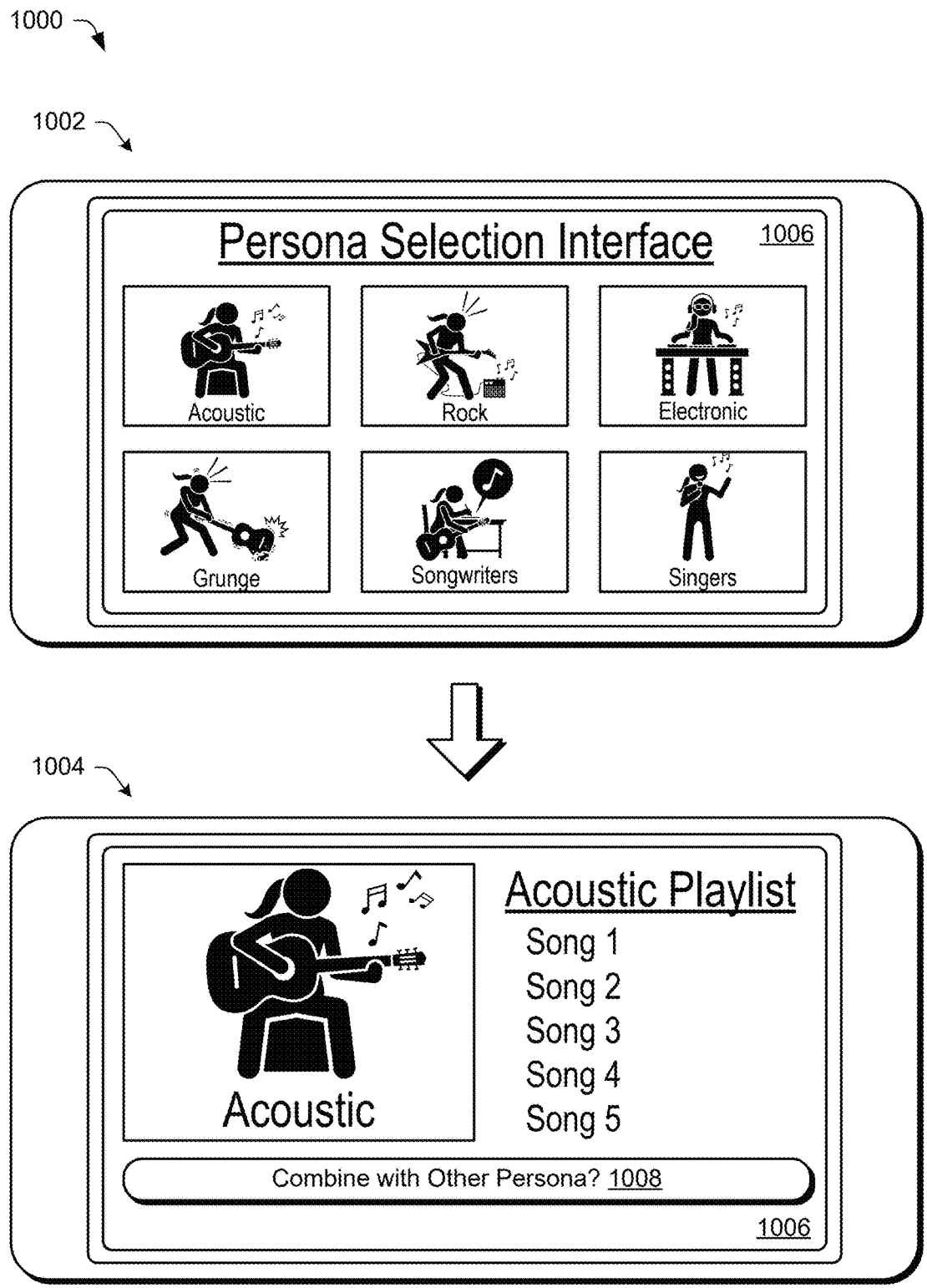
FIG. 10 is a block diagram depicting a non-limiting example of display of representations of personas and use of a selected persona to control digital content output as described herein according to an implementation of the present subject matter.

FIG. 10 is a block diagram depicting a non-limiting example 1000 of display of representations of personas and use of a selected persona to control digital content output as described herein according to an implementation of the present subject matter. This example is illustrated using a first stage 1002 and a second stage 1004.

At the first stage 1002, a user interface 1006 is displayed that has a plurality of representations of a plurality of personas (block 1302). Illustrated examples of the representations include thumbnail images for an acoustic persona, rock persona, electronic music persona, grunge persona, songwriters persona, and singers persona.

An input is then received via the user interface 1006 as selecting a first persona (block 1304), e.g., a representation of the acoustic persona. A determination is then made as to whether digital content 116 is available based on the first persona (decision block 1306). A search service 122, for instance, performs a search of digital content 116 based on the selected persona. If digital content 116 is not available ("no" from decision block 1306), the procedure 1300 returns to a display of the plurality of representations (block 1302 and the first stage 1002), e.g., with a notification in the user interface 1006 that digital content 116 is not available for that persona.

If digital content is available based on the first persona ("yes" from decision block 1306), the digital content is output via the user interface 1006 as shown at the second stage 1004 (block 1308). The user interface 1006, for instance, is used to "play" the digital content selected from the plurality of digital content based on the first persona. The user interface 1006 also includes representations of the digital content that are found via the search. The digital content is selected from a plurality of digital content based on the first persona.

An input is then received as selecting an option 1008 via the user interface 1006 to add the first persona to a second persona (block 1310). The option 1008, for instance, requests whether a user wishes to "combine with other personas?" If the option 1008 is selected, one or more other personas are located that are to be combined with the first persona (block 1312).

Figure 11:
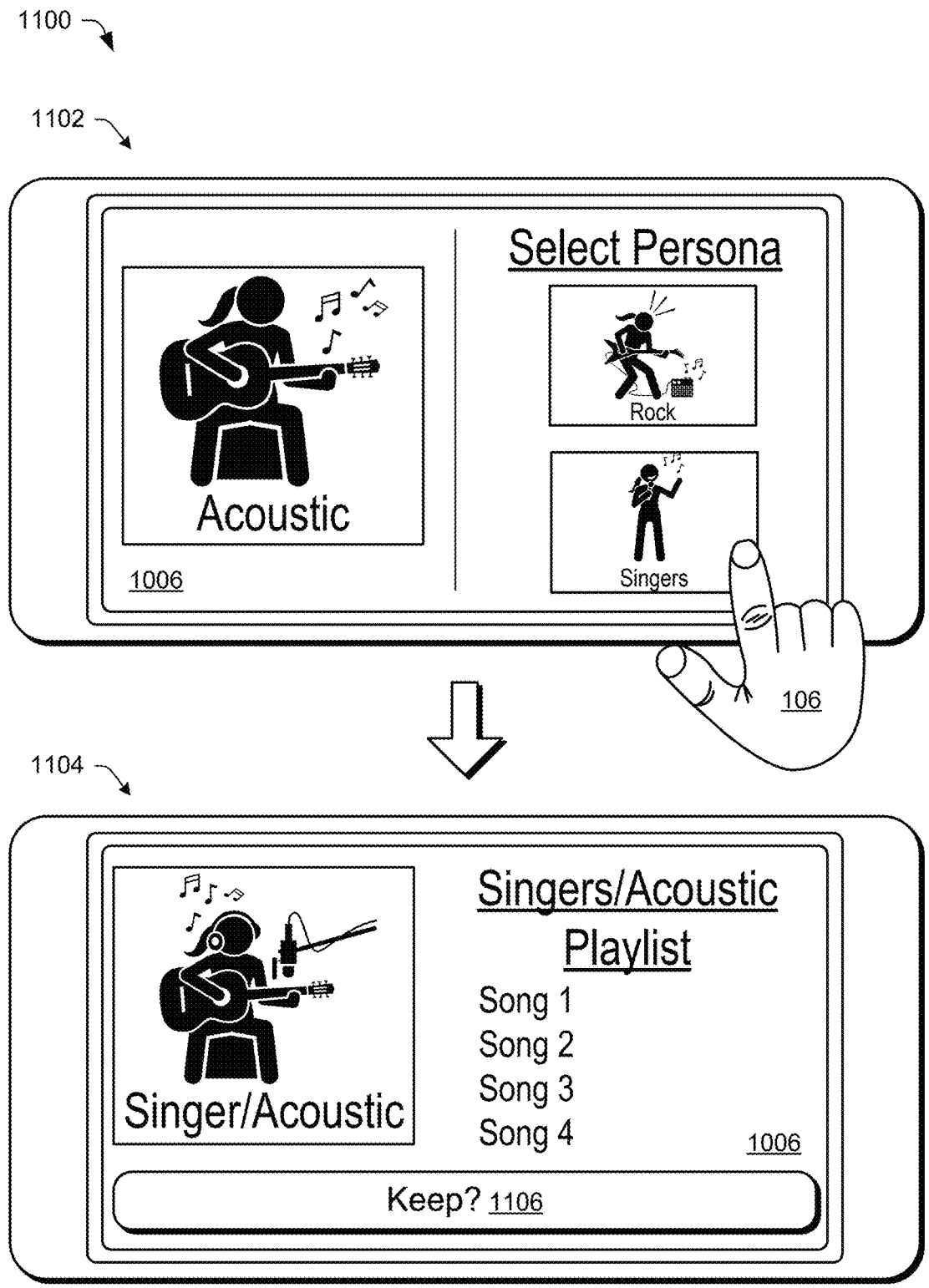
FIG. 11 is a block diagram depicting a non-limiting example of selection of a second persona that is combined with a first persona of FIG. 10 as described herein according to an implementation of the present subject matter.
Figure 12:
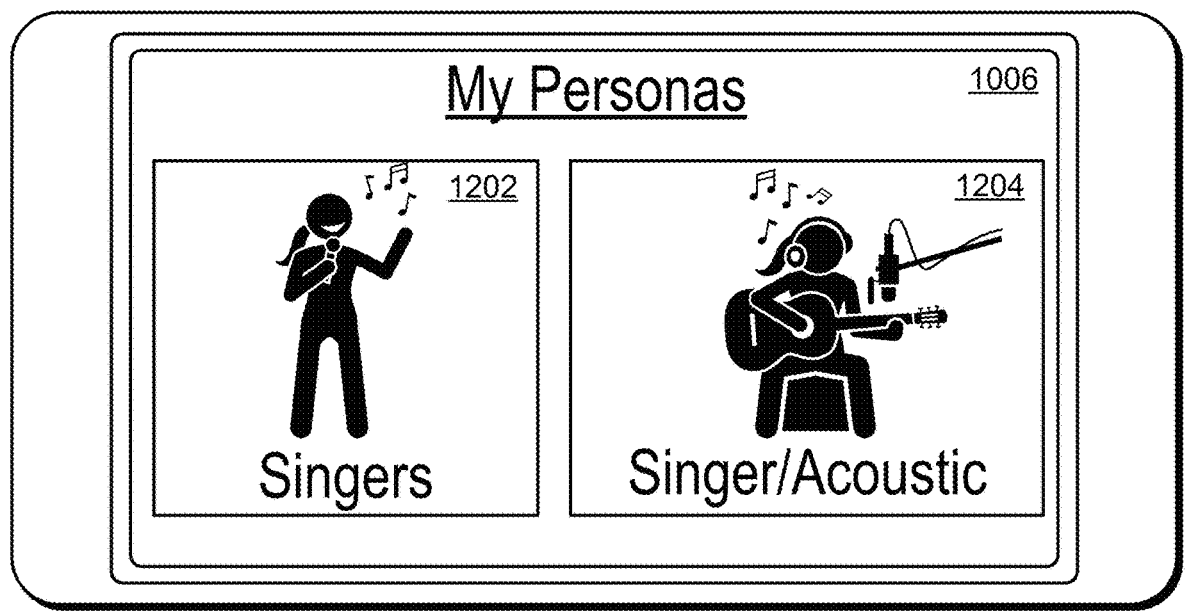
FIG. 12 is a block diagram depicting a non-limiting example of maintenance of a combined persona as generated in FIG. 11 as described herein according to an implementation of the present subject matter.
Figure 13:
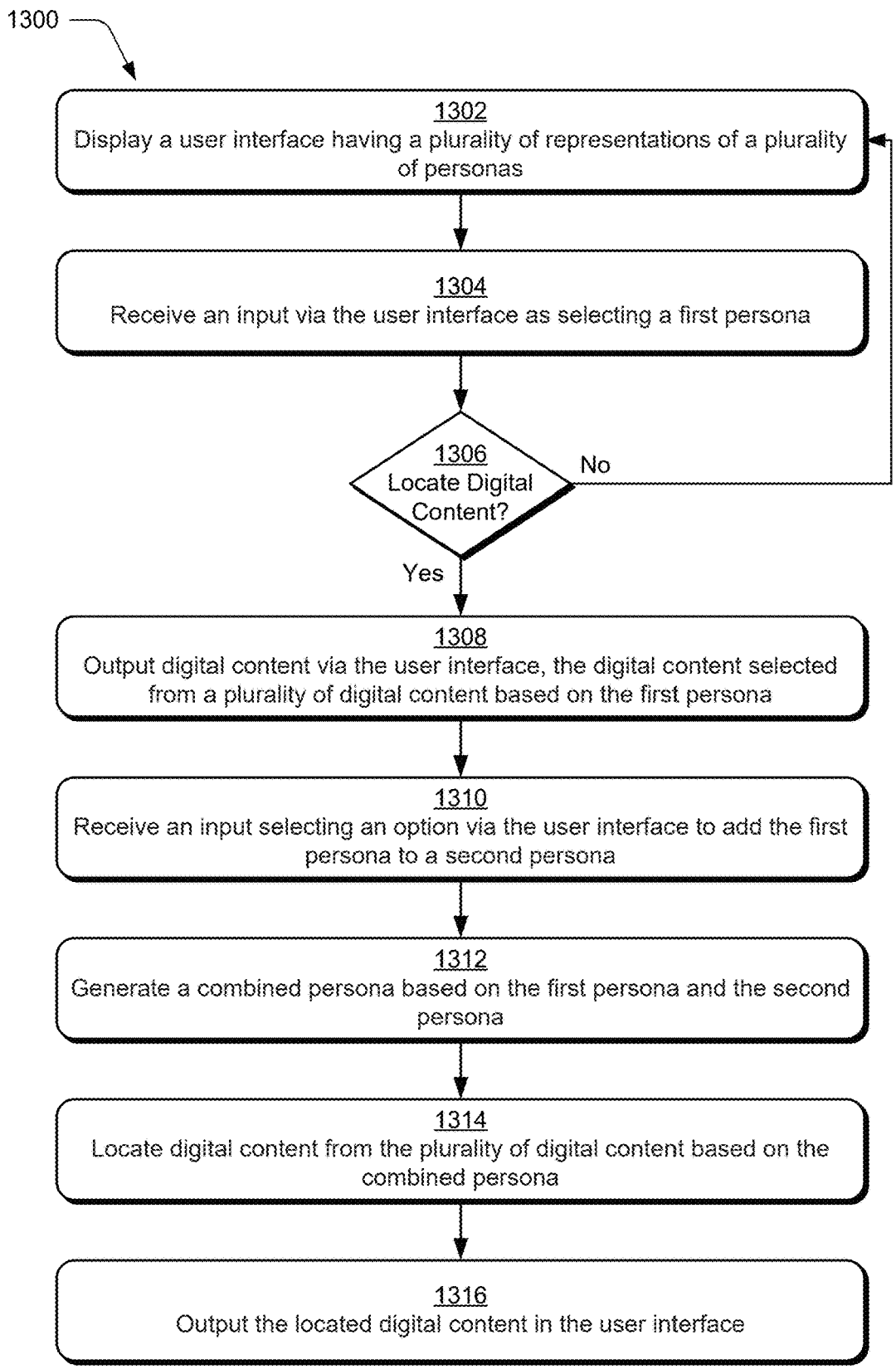
FIG. 13 depicts a non-limiting example of a flow diagram of combined persona generation as described herein according to an implementation of the present subject matter.

FIG. 11 is a block diagram depicting a non-limiting example 1100 of selection of a second persona that is combined with a first persona of FIG. 10 as described herein according to an implementation of the present subject matter. This example is illustrated using a first stage 1102 and a second stage 1104. FIG. 12 is a block diagram depicting a non-limiting example 1200 of maintenance of a combined persona as generated in FIG. 11 as described herein according to an implementation of the present subject matter.

At the first stage 1102, a representation of the first persona is displayed, e.g., "acoustic" persona. Representations of other personas are also displayed that are scrollable and user selectable via the user interface 1006. User inputs, for instance, are detected as scrolling through other representations followed by a "tap" gesture to select a particular representation and corresponding persona as the second persona that is to be combined with the first persona, e.g., the acoustic persona. In the illustrated example, a representation of a singers persona is selected as the second persona that is to be combined with the first persona, e.g., the acoustic persona.

In response, the model combination module 802 generates a combined singer/acoustic persona 708. Generation of the combined persona also includes generation of a representation to reflect characteristics used to form the combined persona. The model combination module 802, for instance, is configured to employ generative artificial intelligence (AI) techniques to generate a thumbnail image (e.g., raster-based digital image as a bitmap) based on representations associated with the personas being combined, an example of which is illustrated as a singer playing an acoustic guitar.

Digital content is located from the plurality of digital content based on the combined persona (block 1314) and output in the user interface (block 1316). The combined persona of singer/acoustic, for instance, is then used to control output of digital content, an example of which is illustrated as a singers/acoustic playlist having a plurality of songs. The user interface 1006 then supports output of the digital content located based on the combined option. An option 1106 is included to support an ability to store the combined persona, i.e., to "keep" it in a storage device 118.

Selection of the option 1106 causes the representation to be made available for use at a later point in time as shown in FIG. 12. In the illustrated example, the user interface 1006 includes a representation 1202 of the singers persona that is maintained separately from a representation 1204 of the combined singer/acoustic persona. In this way, characteristics used to control digital content output are "siloed" and "sandboxed" from each other.

The underlying idea of "put me in your shoes" as described above is also configurable to provide user insight into future changes and financial scenarios that may be encountered by the user. The personas are usable, for instance, to determine "what would a user's financial decision making look like if I was in that person's shoes," examples of which are described in the following section and shown in corresponding figures.

Predictive Persona Techniques

The following discussion describes predictive persona techniques that leverage baseline personas and update data to predict ramifications of actions undertaken by an entity, e.g., a user, business entity, merchant, and so forth. Aspects of the procedure are implemented in hardware, firmware, software, or a combination thereof. The procedure is shown as a set of blocks that specify operations performed by one or more devices and are not necessarily limited to the orders shown for performing the operations by the respective blocks.

Figure 14:
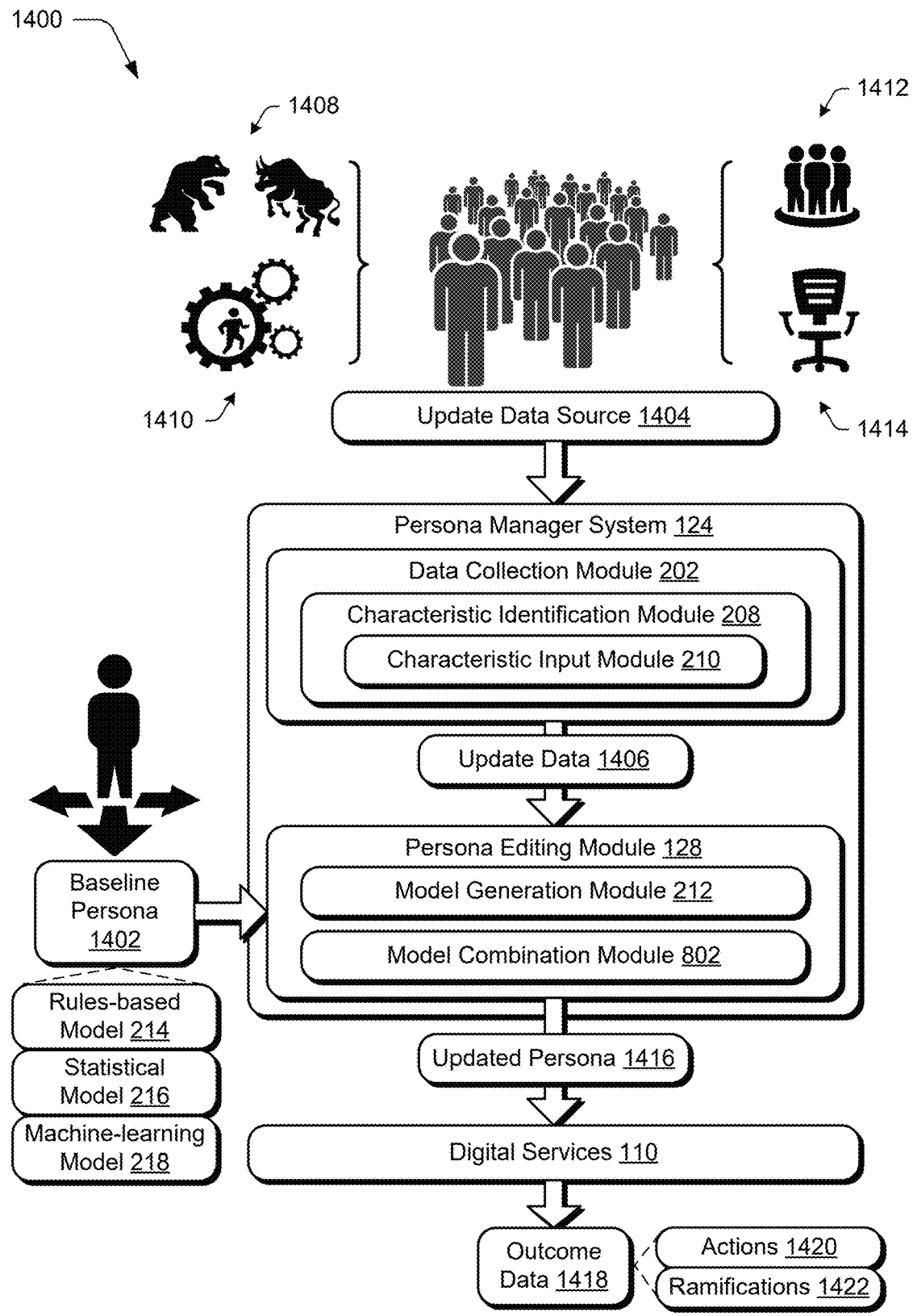
FIG. 14 is a block diagram depicting a non-limiting example of operation of the persona manager system of FIG. 2 as generating an updated persona from a combination of a baseline persona and update data as described herein according to an implementation of the present subject matter.

FIG. 14 is a block diagram depicting a non-limiting example 1400 of operation of the persona manager system of FIG. 2 as generating an updated persona from a combination of a baseline persona and update data as described herein according to an implementation of the present subject matter. The underlying idea of "put me in your shoes" as described above is also configurable to provide user insight into future changes and financial scenarios that may be encountered by the user. The personas are usable, for instance, to determine "what would a user's financial decision making look like if I was in that person's shoes?" As a result, the personas provide insight in ramifications of actions undertaken by a user or other entity (e.g., a merchant) with increased accuracy over conventional "best guess" techniques.

To do so, techniques described above are leveraged to specify a baseline persona 1402. The model generation module 212, for instance, generates the baseline persona 1402 to describe a current state of an entity, e.g., user, merchant, and so forth. The current state, for instance, is modeled by the model generation module 212 based on corresponding characteristics of the user, e.g., demographics, financial, and so forth. The persona is formable in a variety of ways by the model generation module 212, examples of which include a rules-based model 214, a statistical model 216, and/or a machine-learning model 218 as described in relation to FIG. 2.

The characteristic identification module 208 receives an input defining an action that is to occur, which may indicate corresponding characteristics directly or indirectly. An input identifying "my age at 57," for instance, directly identifies a corresponding user characteristic of "age" which is identifiable by the characteristic identification module 208. In an indirect example, an input specifying "a job opportunity at a different geographic location" directly identifies the geographic location and is usable by the characteristic identification module 208 to indirectly infer characteristics associated with the job opportunity.

In some examples, the characteristic identification module 208 can prompt the user with one or more questions to ascertain goals of the user and/or determine a user type of the user. In some examples, a user type can correspond to a horoscope or some other type of classification or identification. In any event, the user type can correspond to a particular persona.

In one or more implementations, the characteristic identification module 208 employs generative artificial intelligence (AI) techniques along with natural language understanding to identify these characteristics. The job opportunity, for instance, is processed to derive characteristics involving financial effects, effects on retirement, costs of living, and so forth as identified using natural language understanding and generative AI. As part of this, prompts are supported for input of actionable items as part of generating the persona, e.g., using generative artificial intelligence to provide queries and follow-up questions to support input of the characteristics.

Once the characteristics are identified, the characteristic identification module 208 is then tasked with identifying an update data source 1404, via which, update data 1406 is obtainable to describe these characteristics. The characteristic identification module 208, for instance, may include a lookup table that maps characteristics to corresponding data sources, illustrated examples of which include an investment data source 1408, an equipment data source 1410, a family data source 1412, a work data source 1414, and so on. Update data 1406 from the update data source 1404 is then provided as an input to a persona editing module 128 to generate an updated persona 1416.

The persona editing module 128 is configurable to generate the updated persona 1416 in a variety of ways. In one or more examples, the update data 1406 is used along with source data 204 obtained based on characteristics used to generate the baseline persona 1402 by a model generation module 212. The model generation module 212, for instance, uses this data to generate the updated persona 1416, e.g., "from scratch." In another example, the update data 1406 is used to generate an update model which is then combined by the model combination module 802 with an underlying model of the baseline persona 1402. The combination is performable in a variety of ways as previously described by the model combination module 802 with respect to FIG. 8, such as through combinations of rules, combination of underlying statistical operations, combination of machine-learning models (e.g., concatenation, model fusion, ensemble model generation), and so forth. A variety of other examples are also contemplated.

The updated persona 1416 is then passed as an input to digital services 110 to generate output data 1418 describing actions and ramifications 1422 of the actions 1420 based on the digital services 110. In some examples, the outcome data 1418 can include actionable recommendations that enable the user to perform an action, configure a new service, modify an existing service, or the like in an effort to obtain a desired outcome. The update data 1406 thus describes changes in characteristics that are usable along with the baseline persona 1402 to determine ramifications 1422 of those changes.

The personas, as a predictor of future ramifications of actions undertaken by the user, are thus usable to provide insight to a user as far as "what can I do now to set myself up for achieving a desired outcome." In the above examples, the updated persona 1416 is based, through use of the update data 1406, on other users in a similar situation, and as such, has increased accuracy over "best guesses" made in conventional techniques. The updated persona 1416 is also usable to model characteristics of other entities (e.g., business entities) and as such act as a predictor of ramifications of actions undertaken by those entities.

The personas are also usable over time to support additional insights, such as to surface notifications of changes to the assumptions made to the characteristics later. The characteristic identification module 208, for instance, monitors underlying characteristics used to form an underlying model of the updated persona 1610 and addresses changes made to those characteristics either associated with the user and/or a change to the update data source 1404. Changes, for instance, may be identified to a number of dependents, geographic location, amount of equipment, rent, inflationary pressures, and so forth. Once changes are detected by the characteristic identification module 208, update data 1406 is obtained automatically and without user intervention to further update the updated persona 1416 based on those changes.

Figure 15:
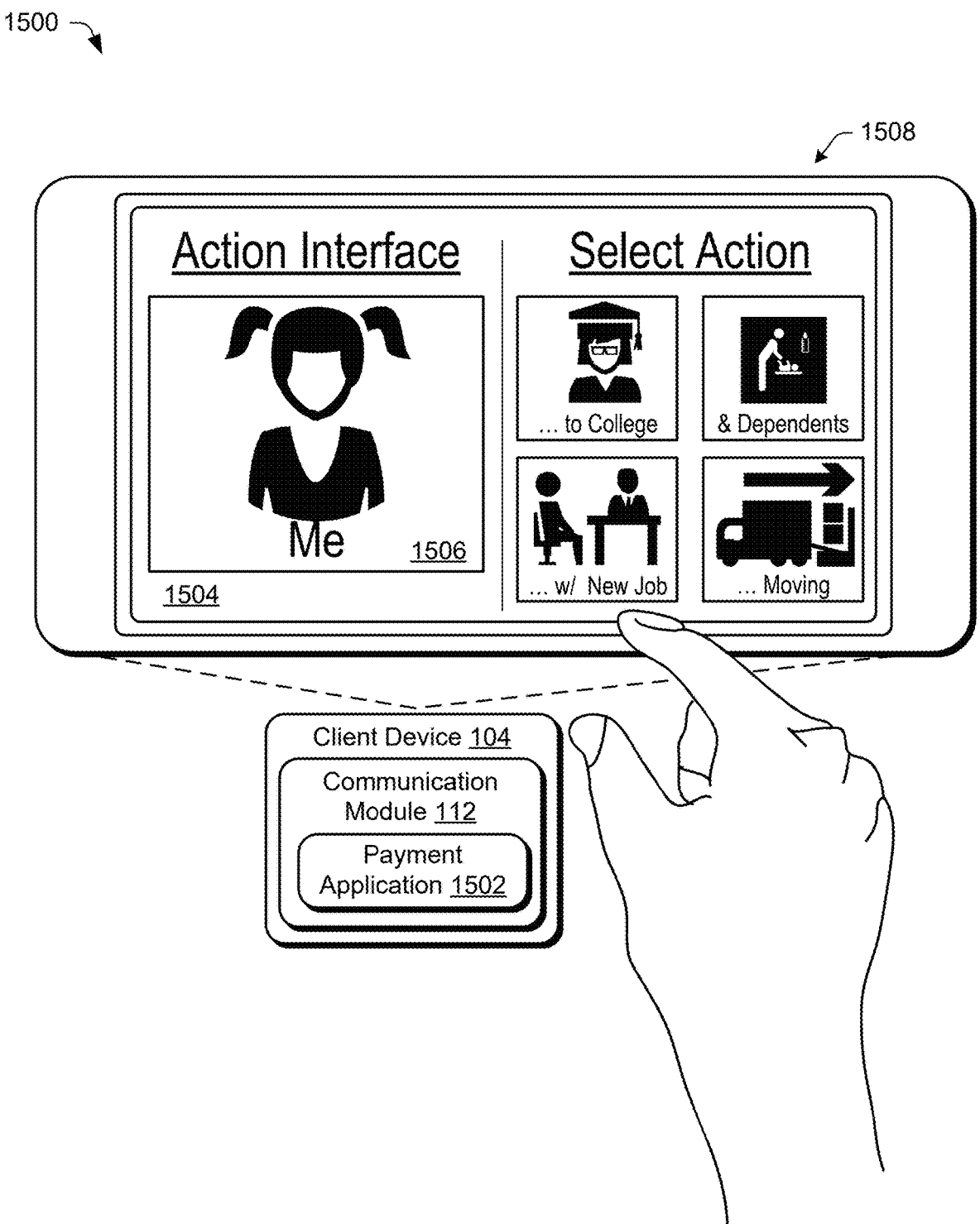
FIG. 15 is a block diagram depicting a non-limiting example of display of representations of personas usable to predict ramifications of future actions as undertaken by an entity as described herein according to an implementation of the present subject matter.
Figure 16:
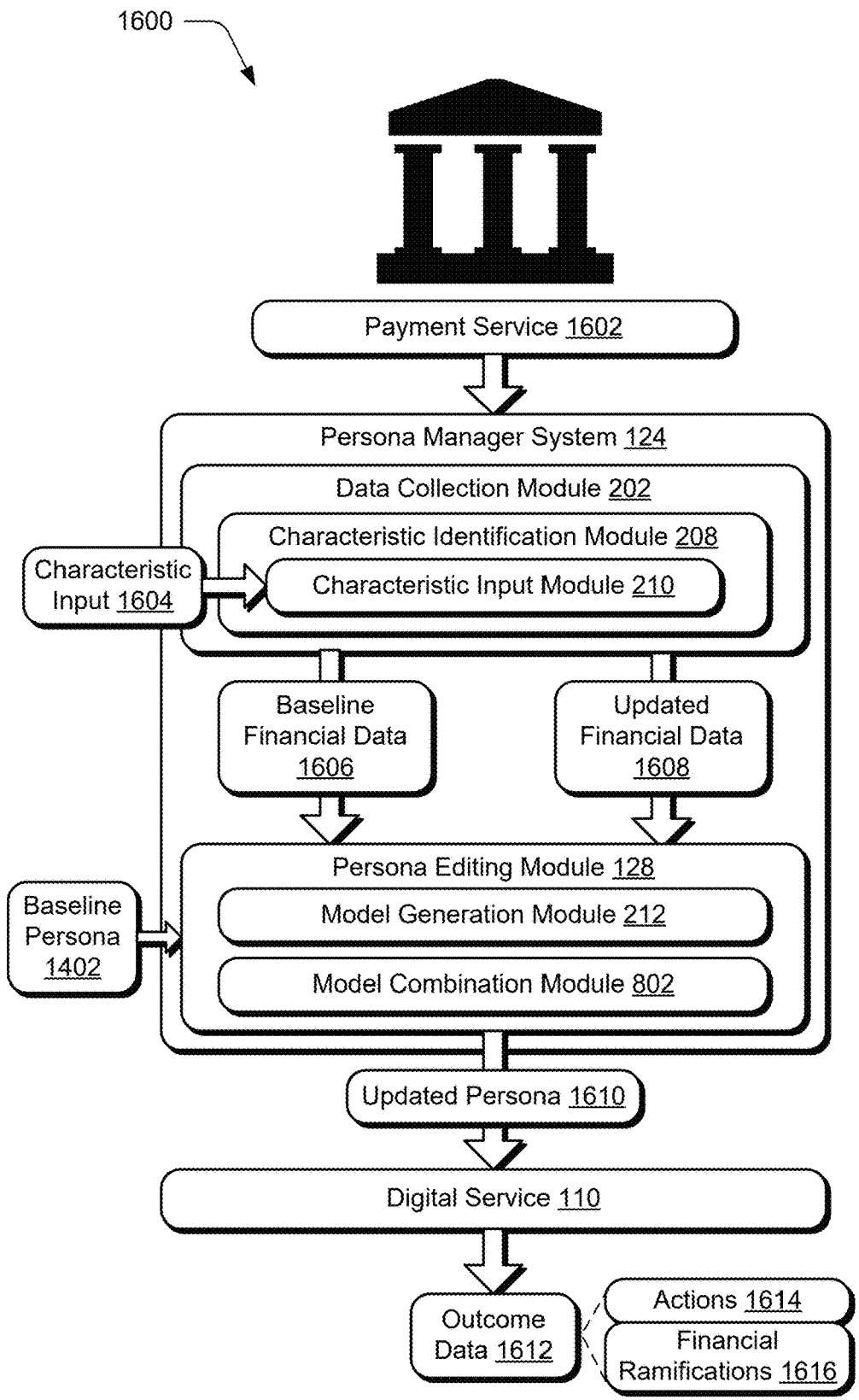
FIG. 16 is a block diagram depicting a non-limiting example of a system to generate a baseline persona, collect update data, and generate an updated persona based on the baseline person and the update data as described herein according to an implementation of the present subject matter.
Figure 19:
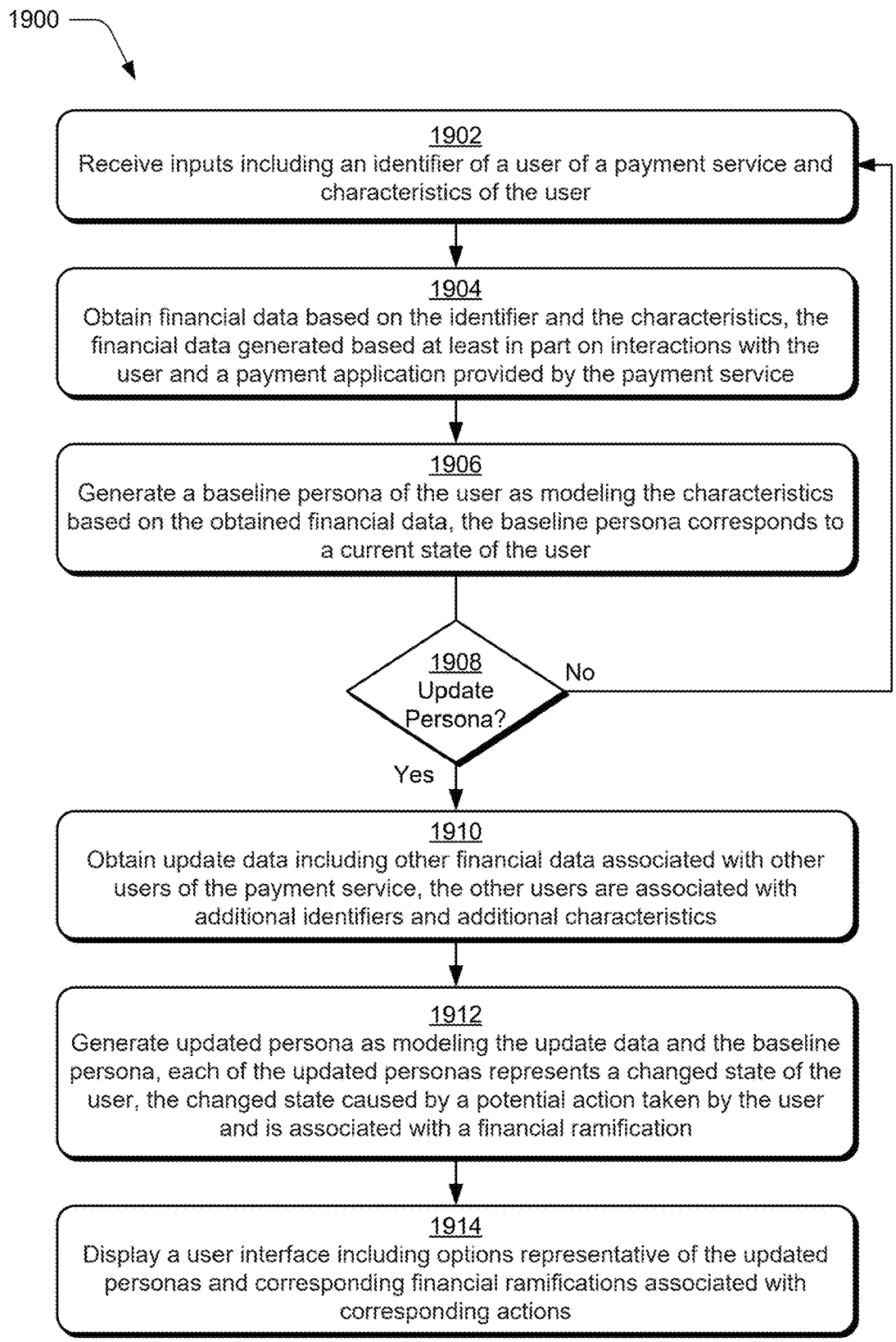
FIG. 19 depicts a non-limiting example of a flow diagram of updated persona generation as described herein according to an implementation of the present subject matter.

FIG. 15 is a block diagram depicting a non-limiting example 1500 of display of representations of personas usable to predict ramifications of future actions as undertaken by an entity as described herein according to an implementation of the present subject matter. FIG. 16 is a block diagram depicting a non-limiting example 1600 of a system to generate a baseline persona, collect update data, and generate an updated persona based on the baseline person and the update data as described herein according to an implementation of the present subject matter. FIG. 19 depicts a non-limiting example of a flow diagram of updated persona generation as described herein according to an implementation of the present subject matter.

The updated persona 1416 as described above is configurable to provide insight into a variety of actions and corresponding ramifications of "what would my financial decision making look like if I was in that person's shoes?" In the illustrated example of FIG. 15, a payment application 1502 is executed by a client device 104. The payment application 1502 is usable to implement person-to-person transactions to implement resource transfers, e.g., as payment for goods or services, as a repayment mechanism, as a gift, etc. via a payment service 1602.

A user interface 1504 is output through execution of the payment application 1502. The user interface 1504 includes representations of personas that are usable to define collections of characteristics to predict outcomes of future scenarios. In the illustrated example, a representation of a baseline persona 1506 is displayed that is user selectable to indicate a subject of the action of corresponding ramifications being modeled.

The user interface 1504 also includes a plurality of representations 1508 of corresponding actions that are to be modeled, examples of which include "to college," "& dependents," "w/ new job," and "... moving." For example, in a "what would it cost me to move to a particular city?" scenario, the persona is usable to provide cost of living insights, e.g., higher food costs, lower housing costs, etc. In another example, insights are provided to describe the effect of adding dependents, single versus partnership versus married, residency at different locations, when nearing retirement, transitioning between different jobs, and so forth.

Accordingly, in this example inputs are received including an identifier of a user of a payment service 1602 and characteristics of the user (block 1902) as received via a characteristic input 1604, e.g., through selection of the representation of the baseline persona 1506. The characteristics, for instance, are identified as described above by the characteristic identification module 208, e.g., based on user inputs, further refined using generative AI techniques, and so forth.

In this example, baseline financial data 1606 is obtained based on the identifier and the characteristics. The baseline financial data 1606 is generated based at least in part on interactions with the user and the payment application 1502 provided by the payment service 1602 (block 1904). The baseline financial data 1606, for instance, describes user demographics, payment history, account balances, credit scores, payment timeliness, identifies other participants in a transaction with the user, and so forth. A baseline persona 1402 is then generated by the model generation module 212 of the user as modeling the characteristics based on the obtained financial data 1606. The baseline persona 1402 in this example corresponds to a current state of the user (block 1906), e.g., at that point in time in the generation of the baseline persona 1402 from user states described in the baseline financial data 1606.

A determination is then made as to whether an input is received to update the baseline persona 1402 (decision block 1908). Returning again to FIG. 15, the input includes selecting representations of personas corresponding to actions to be modeled, e.g., the "to college," "& dependents," "w/ new job," and "... moving." If an input is not received ("no" from decision block 1908), the procedure 1900 returns to block 1902.

If an input is received to update the persona ("yes" from decision block 1908), update data is obtained including other financial data associated with other users of the payment service (block 1910). The update data is illustrated in FIG. 16 as updated financial data 1608 obtained from the payment service 1602 via the data collection module 202.

The data collection module 202, for instance, identifies other users having characteristics that correspond to the action being modeled, e.g., moving to a different geographic location, new job, change in a number of dependents, and so forth. The other users are associated with additional identifiers and additional characteristics, which are used by the data collection module 202 to obtain corresponding updated financial data 1608 from the payment service 1602.

An updated persona 1610 is then generated as modeling the update data (e.g., the updated financial data 1608) and the baseline persona 1402. The updated persona 1416 represents a changed state of the user (block 1912) caused by a potential action taken by the user and is associated with a financial ramification. The updated persona 1610 is utilized as part of a digital service 110 to generate outcome data 1612 describing actions 1614 and financial ramifications 1616 of the action. The output data 1612 is then displayed in a user interface, via the payment application 1502, as including options representative of the updated persona and corresponding financial ramifications 1616 associated with corresponding actions 1614 (block 1914). In some examples, the outcome data 1612 can include actionable recommendations that enable the user to perform an action, configure a new service, modify an existing service, or the like in an effort to obtain a desired outcome.

Figure 17:
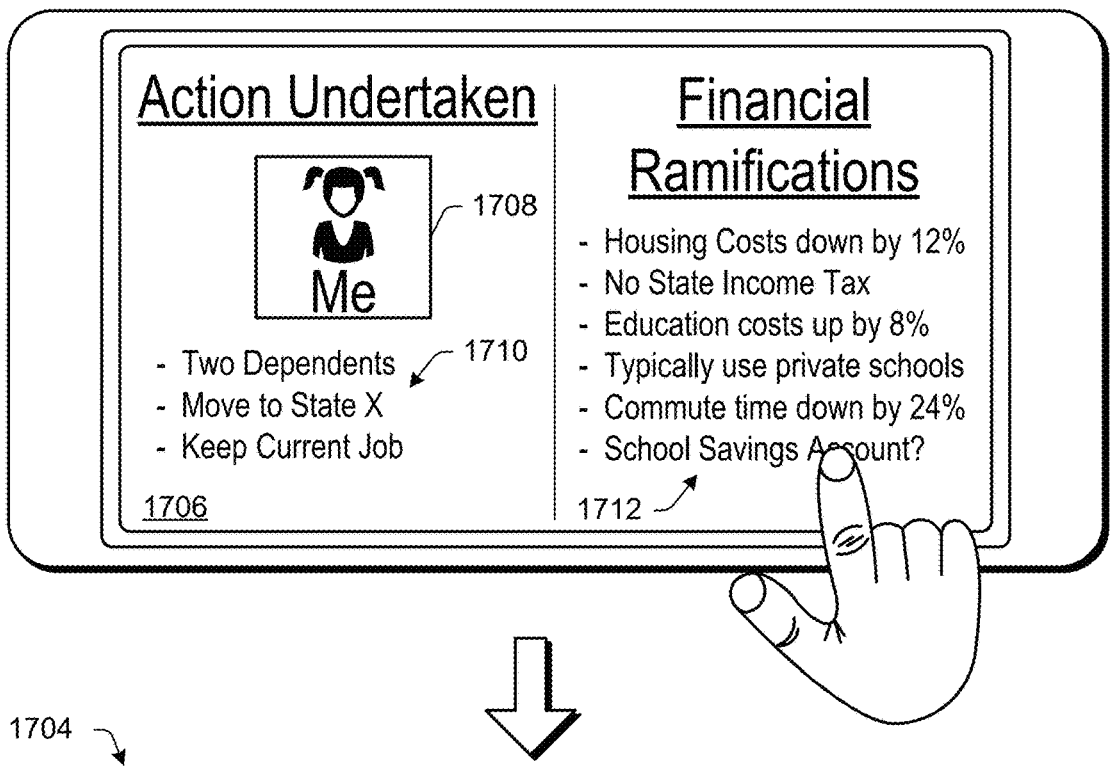
FIG. 17 depicts a non-limiting example of display of a user interface including options representative of an updated persona and corresponding financial ramifications associated with corresponding actions as described herein according to an implementation of the present subject matter.
Figure 17:
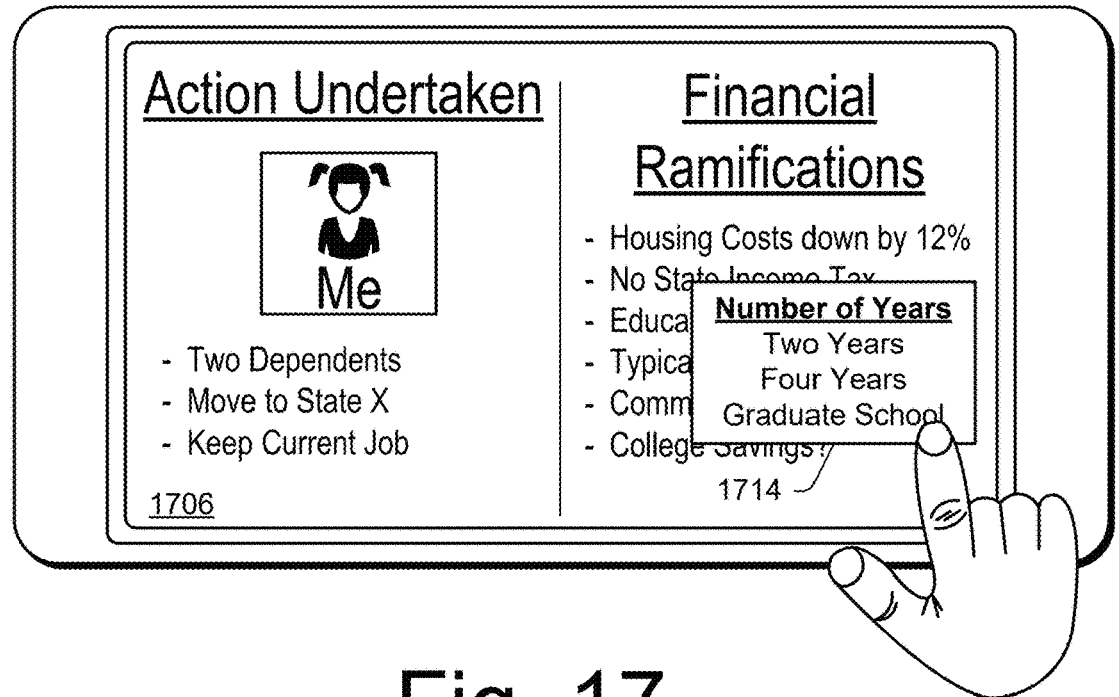

FIG. 17 depicts a non-limiting example 1700 of display of a user interface including options representative of an updated persona and corresponding financial ramifications associated with corresponding actions as described herein according to an implementation of the present subject matter. This example is illustrated using a first stage 1702 and a second stage 1704 showing output and refinement of ramifications of actions.

At the first stage 1702, a user interface 1706 includes representations of an action undertaken, including a representation 1708 of a baseline persona and representations 1710 of actions being modeled. Examples of the actions include "two dependents," "move to state X," and "keep current job." Financial ramifications 1712 are also output in the user interface 1706 which describe an effect of the actions on the user, financially.

The user interface 1706 also includes an option to further refine the financial ramifications. The persona manager system 124, for instance, identifies that adding two dependents may also involve educational considerations, e.g., through use of generative AI techniques. Therefore, an option is provided for a "school savings account." Selection of the option as shown at the second stage 1704 causes output of a menu 1714 (e.g., non-modally) to provide additional information that may be modeled for use in generating accurate financial ramifications of likely actions. Although financial ramifications are described for actions undertaken by a user, these techniques also support insight for a variety of other entity types as further described below and shown in a corresponding figure.

Figure 18:
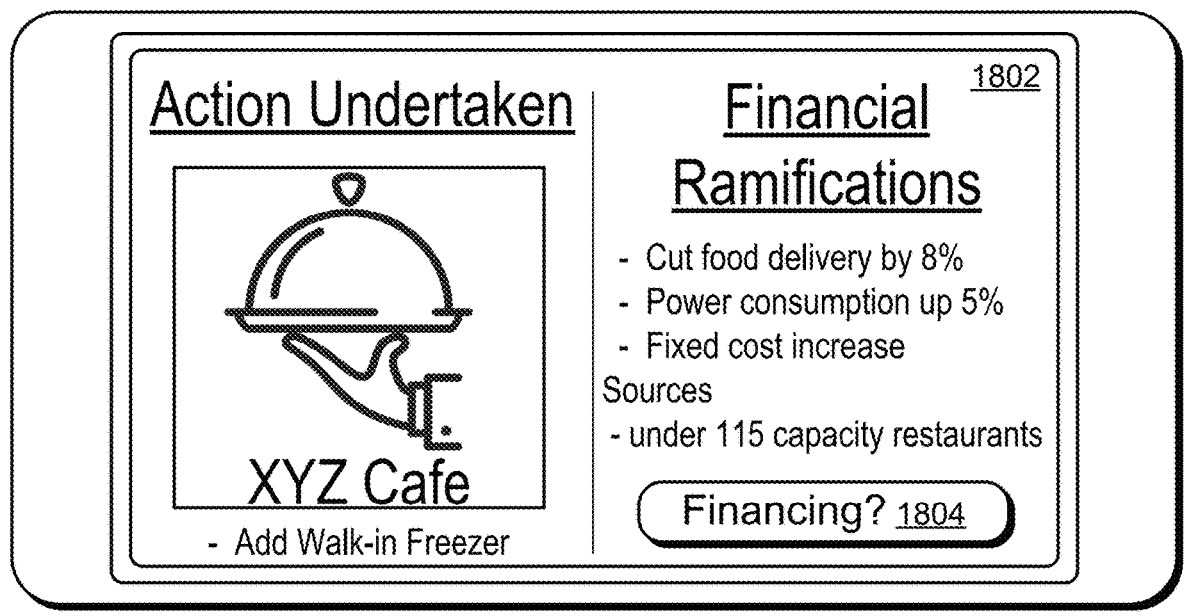
FIG. 18 depicts a non-limiting example of display of a user interface including options representative of an updated persona and corresponding financial ramifications associated with actions undertaken by a merchant as described herein according to an implementation of the present subject matter.

FIG. 18 depicts a non-limiting example 1800 of display of a user interface including options representative of an updated persona and corresponding financial ramifications associated with actions undertaken by a merchant as described herein according to an implementation of the present subject matter. In a merchant scenario, for instance, transaction data is used to form personas to gain insights regarding an effect of actions affecting a merchant.

In the illustrated user interface 1802, an entity "XYZ Café" is modeled as a baseline persona and the actions include "add a walk in freezer." As before, update data 1406 is obtained from the payment service 1602, but in this instance involves other merchants that have performed a similar action and have similar characteristics, e.g., seating, revenue, number of employees, and so on. The financial ramifications are then output as showing an effect of the addition of this new equipment, e.g., a decrease in food delivery, increase in power consumption, and a fixed cost increase. The illustrated user interface 1802 also includes data indicating a source of the financial ramification calculation, e.g., "under 115 capacity restaurants."

Examples of other actions include adding a new franchise (including in a different city or state, how this addition would impact taxes, benefits, etc.), adding a new employee, addition of new services, and so forth. In a payment hardware scenario, the persona is usable to model a ramification of a change in hardware based on how that change has affected others that are modeled based on the persona, such as a change from a card reader to a tap device. Personas are also configurable to support marketing insights into competitor behavior. For example, a persona may be generated as modeling other merchants to indicate the effect advertising, different website configurations, and so forth have had on the other merchants.

In an implementation, the user interface 1802 surfaces an actionable recommendation, such as option 1804, to provide financing in support of the action, e.g., a capital loan to purchase an item of equipment. Capital loans, for instance, may be provided as an option as part of a persona experience to help the merchant to perform a currently modeled action and achieve the predicted ramification. When modeling an effect of purchasing a new piece of equipment such as the walk-in freezer of FIG. 18, for instance, the option 1804 is user selectable to model use of a capital loan and how this capital loan would affect a corresponding business. An additional option may then be provided to formally request the capital loan. If the piece of equipment is moved from a predictive persona to a "main" persona of the merchant as a combination persona as described above, for instance, an "official" offer for the capital loan is presented via the user interface.

Transaction data and merchant information (e.g., payroll, taxes, and so forth) may be anonymized and aggregated from multiple merchants by a merchant system to provide improved recommendations to merchants of different types in different scenarios. In some cases, data from different business types may be used to provide informed recommendations. Machine-learning techniques, for instance, may be used to identify outlook categories where business type does affect an outlook (e.g., adding a new product for sale and thus limiting to similar business types is appropriate) versus outlook categories where business type does not affect an outlook, e.g., cost of real estate as an expense and thus can analyze data from vastly different business types. Machine learning techniques are usable to identify which categories are business-dependent and provide recommendations accordingly.

Accordingly, persona based recommendation and modeling techniques are described. The persona is configured to model characteristics of an entity (e.g., using input training data) as seed information, e.g., demographic characteristics, financial information, and so on. The model is then usable as a basis as a part of search functionality to generate recommendations (e.g., for music streaming), to model and predict future occurrences (e.g., for financial planning by a user, computational resource consumption, power consumption), and so forth. The personas are also usable as predictors of future ramifications of actions using "real world" data, which is not possible using conventional techniques.

Additional Personas Use Cases

In order to educate users with respect to a particular topic, the education is generally successful when contextual, relevant, and personalized. Conventional techniques, however, are not able to gain this insight. Accordingly, techniques are described herein in which a question-and-answer session is implemented by the persona manager system 124 as a series of one or more questions to learn habits, goals, and reactions. The series of one or more questions for instance, may be configured to determine:

"How do they feel about their money?"
"What are their spending and budgeting patterns?"
"How do they deal with unexpected outcomes?"
"What are their feelings around goals?"

A persona 126 can then be selected based on answers to the series of one or more questions by the persona manager system 124 to manage user interaction to achieve a desired goal. In some examples, the personal 126 can correspond to a user type or a horoscope.

Figure 20:
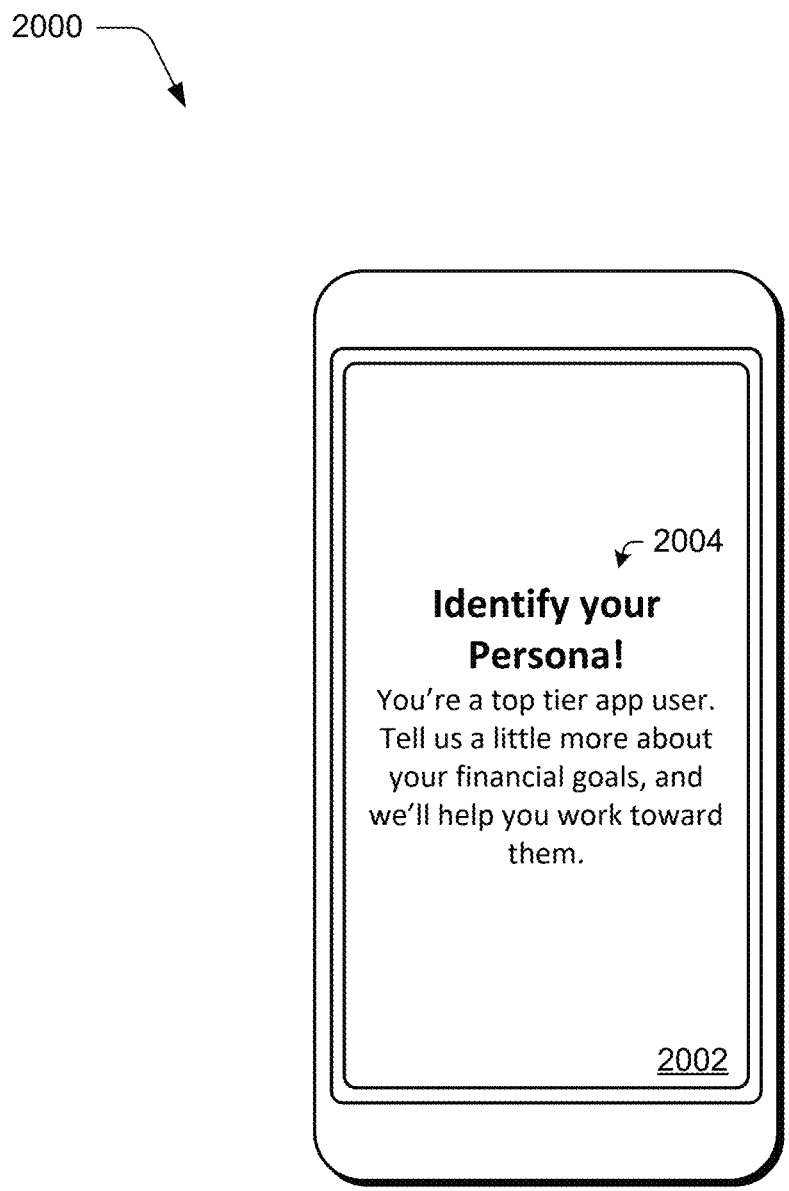
FIG. 20 depicts a non-limiting example of display of a user interface including options to input financial goals that are used as a bases to select a persona as described herein according to an implementation of the present subject matter.

FIG. 20 depicts a non-limiting example 2000 of display of a user interface 2002 including options to input financial goals that are used as a basis to select a persona as described herein according to an implementation of the present subject matter. The financial goals, for instance, may be input via a user interface 2002 through selection of options to identify a persona. The inputs may also be refined through generative artificial intelligence techniques to both expand on the inputs as well as configure follow-up queries.

Figure 21:
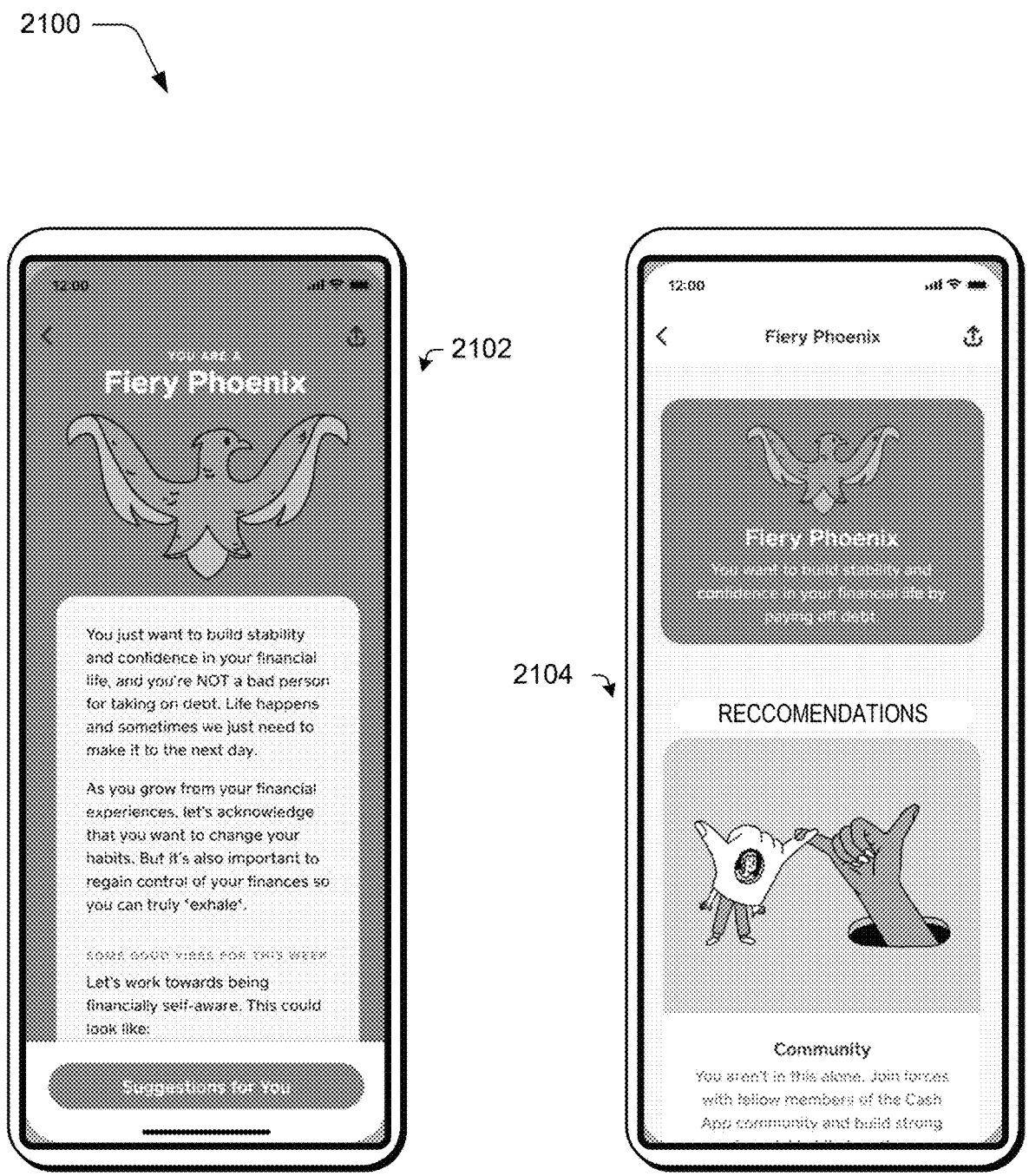
FIG. 21 depicts a non-limiting example of display of a user interface including a persona for a financial goal to pay off debt as described herein according to an implementation of the present subject matter.

FIG. 21 depicts a non-limiting example 2100 of display of a user interface including a persona for a financial goal to pay off debt as described herein according to an implementation of the present subject matter. In some examples, this can be a characteristic (become debt free), as described above. In this non-limiting example, a "fiery phoenix" is used to represent a persona 2102 to pay off debt. This persona is modeled to build stability and confidence in the user's financial life and promote change in a user's habits. As part of this, the user interface can present an actionable recommendation, such as option 2104, to engage with a community for support. In some examples, joining a community or group of other users can unlock particular benefits for members of the community or group that are not available to non-members.

Figure 22:
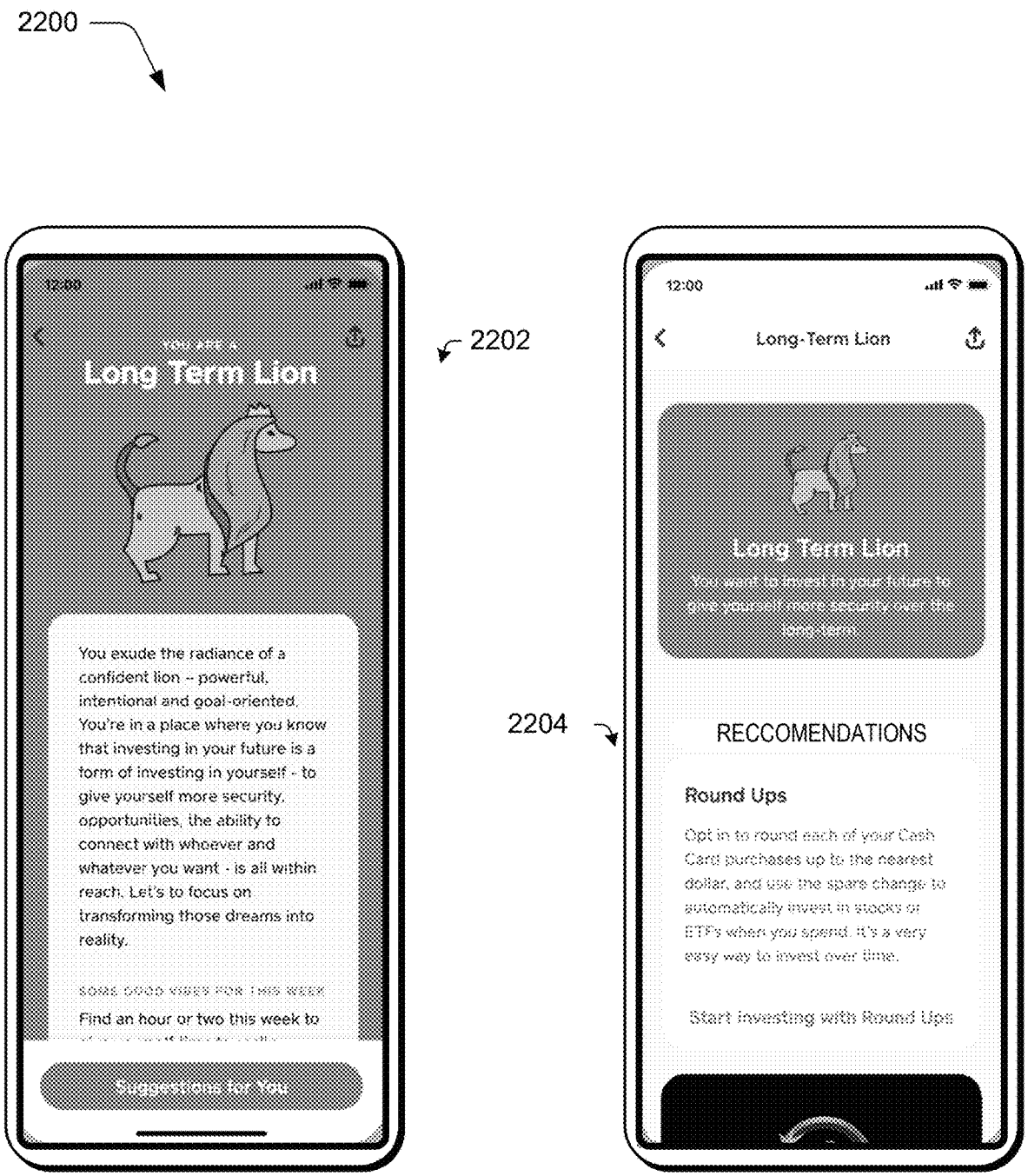
FIG. 22 depicts a non-limiting example of display of a user interface including a persona for a financial goal to build long term wealth as described herein according to an implementation of the present subject matter.

FIG. 22 depicts a non-limiting example 2200 of display of a user interface including a persona for a financial goal to build long term wealth as described herein according to an implementation of the present subject matter. In this non-limiting example, a "long term lion" is used as a persona 2202 to build long term wealth. This persona 2202 acknowledges a goal of investing in the future and, accordingly, the user interface includes an actionable recommendation, such as option 2204, to support additional techniques to achieve that goal, e.g., to "round up" purchases towards savings, investments, and so forth. By interacting with the option 2204, the user can configure round up functionality in association with their account.

Figure 23:
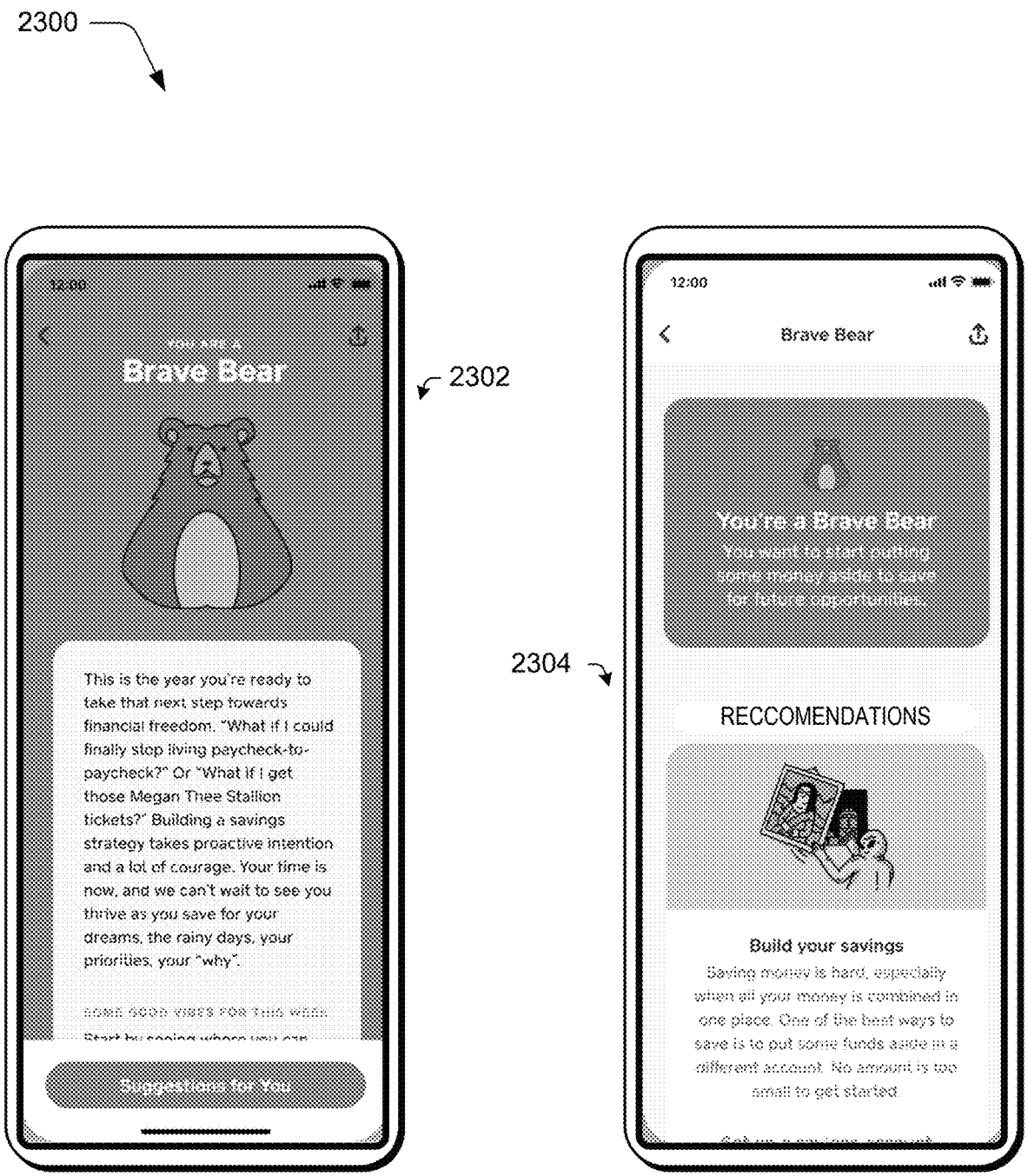
FIG. 23 depicts a non-limiting example of display of a user interface including a persona for a financial goal to save funds as described herein according to an implementation of the present subject matter.

FIG. 23 depicts a non-limiting example 2300 of display of a user interface including a persona for a financial goal to save funds as described herein according to an implementation of the present subject matter. In this non-limiting example, a "brave bear" is used as a persona 2302 to encourage savings. The persona 2302 is configured to support encouragement towards financial freedom through proactive intention. This persona 2302 is associated with an actionable recommendation, such as option 2304, to build savings through use of an additional account. By interacting with the option 2304, the user can set up a savings account or sub-account in association with their account.

Figure 24:
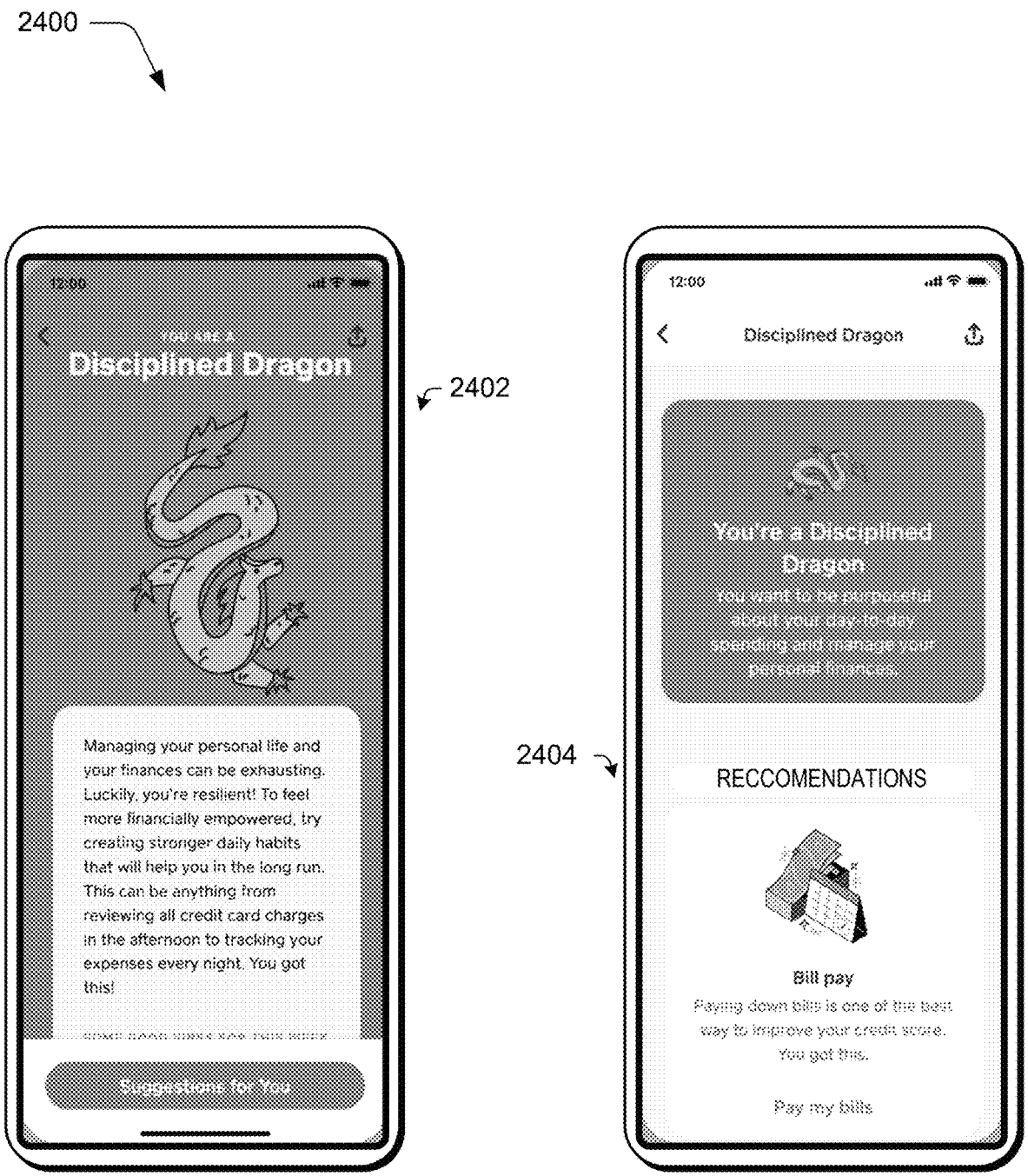
FIG. 24 depicts a non-limiting example of display of a user interface including a persona for a financial goal to manage day-to-day spending as described herein according to an implementation of the present subject matter.

FIG. 24 depicts a non-limiting example 2400 of display of a user interface including a persona for a financial goal to manage day-to-day spending as described herein according to an implementation of the present subject matter. In this non-limiting example, a "disciplined dragon" persona 2402 is used to represent functionality to aid in bill payment, expense tracking, and so forth. Accordingly, an actionable recommendation, such as an option 2404 to enable bill pay functionality can be presented to the user. By interacting with the option 2404, the user can configure the bill pay functionality in association with their account.

Figure 25:
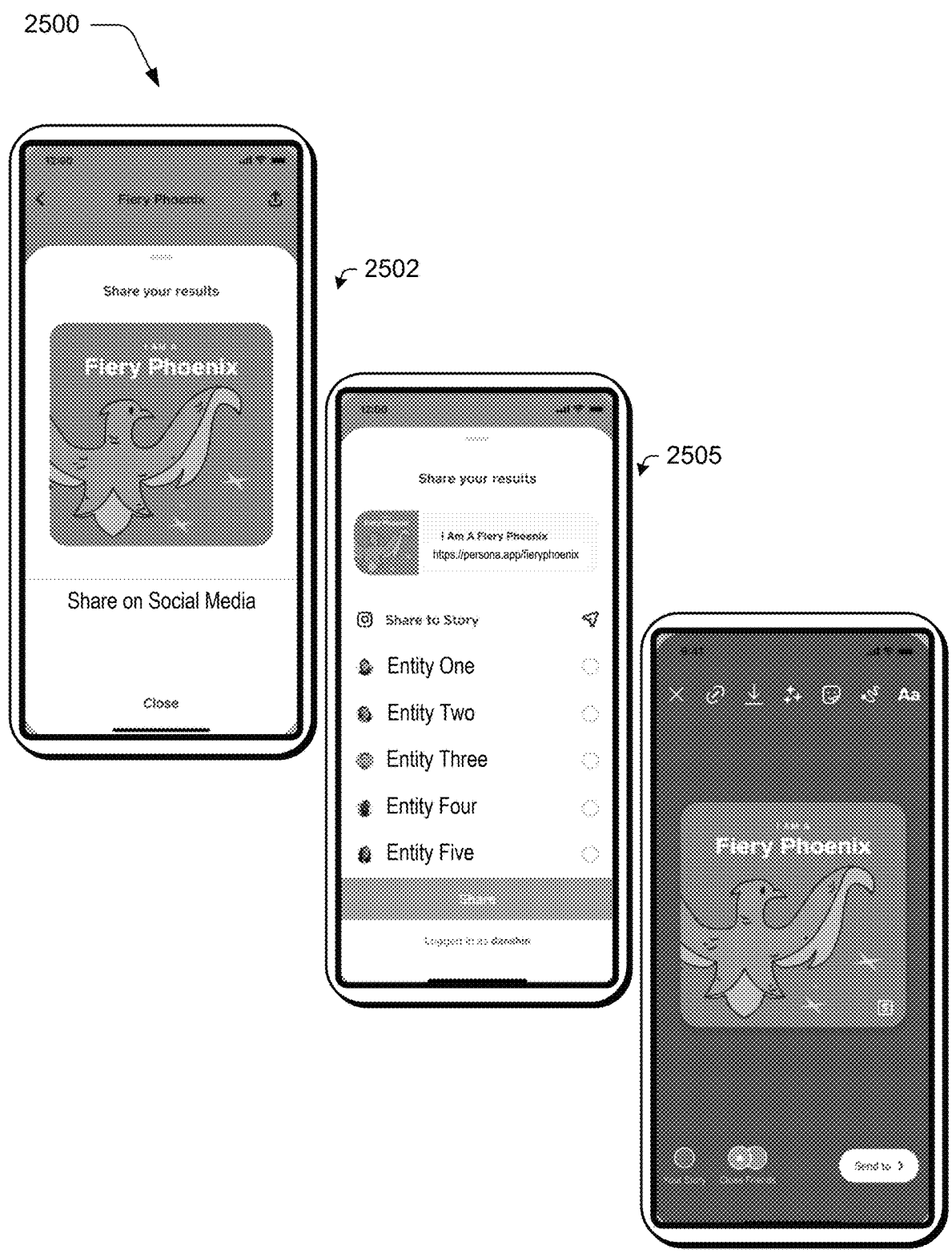
FIG. 25 depicts a non-limiting example of display of a user interface including a persona for a financial goal to share results via social media as described herein according to an implementation of the present subject matter.

FIG. 25 depicts a non-limiting example 2500 of display of a user interface including a persona 2502 for a financial goal to share results via one or more channels, such as forums, social networks, via text messages, or the like as described herein according to an implementation of the present subject matter. In this example, the user interface is configured to surface options 2504, via which, the persona 2502 is shared with other users via social media. The persona 2502, for instance, may include results of a quiz undertaken that is used to select the persona 2502 by the persona manager system 124.

The personas are also configurable to support surfacing of notifications in support of the goals associated with the personas. The notifications, for instance, may indicate a mortgage payment is due, include a congratulatory message when a portfolio reaches a threshold amount of growth, notification of a placement in an overall community that shares a same goal, is made aware of a discount plan, and so forth.

Thus, over time the goals are achieved over time. Transitions may then be made to other personas as the goals are achieved, which may be performed automatically and without user intervention by the persona manager system 124 through monitored user interaction. The persona manager system 124, for instance, may detect occurrence of an event and select a persona based on the event, e.g., upcoming wedding, a dependent going to gradual school, and so forth.

In some examples, representations of personas (e.g., Fiery Phoenix, Disciplined Dragon, Brave Bear, Long Term Lion) can be personalized and/or customized for individual users. In some examples, such representations can be associated with user profiles, user payment instruments (e.g., on one or more surfaces of a payment card), in association with application design or checkout flows, etc.

Example System and Device

Figure 26:
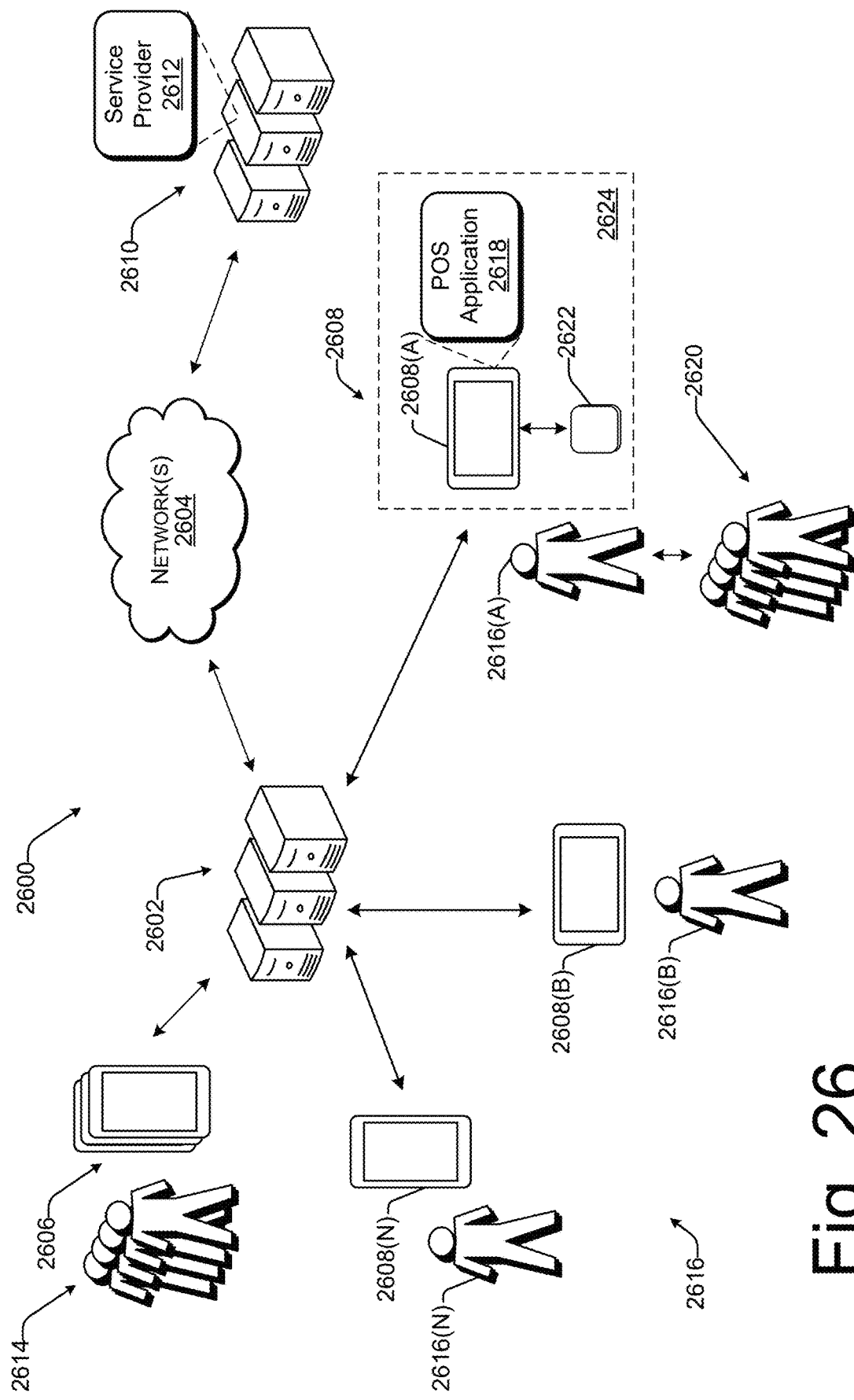
FIG. 26 is an example environment with which techniques described herein can be implemented, according to an embodiment described herein.

FIG. 26 illustrates an example environment 2600. The environment 2600 includes server(s) 2602 that can communicate over a network 2604 with user devices 2606 (which, in some examples can be merchant devices 2608 (individually, 2608(A)-2608(N))) and/or server(s) 2610 associated with third-party service provider(s). The servers 2602, for instance, are configurable to implement the service provider system 102 and the user devices are configurable to implement the client device 104. The server(s) 2602 can be associated with a service provider 2612 that can provide one or more services for the benefit of users 2614, as described below. Actions attributed to the service provider 2612 can be performed by the server(s) 2602. Examples of which include actions by the service provider system 102 and digital service manager module 108, persona manager system 124, and the digital services 110.

The environment 2600 can include a plurality of user devices 2606, as described above for the client device 104. Each one of the plurality of user devices 2606 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 2614. The users 2614 can be referred to as customers, buyers, merchants, sellers, borrowers, employees, employers, payors, payees, couriers and so on. The users 2614 can interact with the user devices 2606 via user interfaces presented via the user devices 2606. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 2606 can have an instance or versioned instance of an application, which can be downloaded from an application store, for example, which can present the user interface(s) described herein. In at least one example, a user 2614 can interact with the user interface via touch input, spoken input, or any other type of input.

As described above, in at least one example, the users 2614 can include merchants 2616 (individually, 2616(A)-2616(N)). In an example, the merchants 2616 can operate respective merchant devices 2608, which can be user devices 2606 configured for use by merchants 2616. For the purpose of this discussion, a "merchant" can be any entity that offers items (e.g., goods or services) for purchase or other means of acquisition (e.g., rent, borrow, barter, etc.). The merchants 2616 can offer items for purchase or other means of acquisition via brick-and-mortar stores, mobile stores (e.g., pop-up shops, food trucks, etc.), online stores, combinations of the foregoing, and so forth. In some examples, at least some of the merchants 2616 can be associated with a same entity but can have different merchant locations and/or can have franchise/franchisee relationships. In additional or alternative examples, the merchants 2616 can be different merchants. That is, in at least one example, the merchant 2616(A) is a different merchant than the merchant 2616(B) and/or the merchant 2616(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN) s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 2608 can have an instance of a POS application 2618 stored thereon. The POS application 2618 can configure the merchant device 2608 as a POS terminal, which enables the merchant 2616(A) to interact with one or more customers 2620. As described above, the users 2614 can include customers, such as the customers 2620 shown as interacting with the merchant 2616(A). For the purpose of this discussion, a "customer" can be any entity that acquires items from merchants. While only two customers 2620 are illustrated in FIG. 26, any number of customers 2620 can interact with the merchants 2616. Further, while FIG. 26 illustrates the customers 2620 interacting with the merchant 2616(A), the customers 2620 can interact with any of the merchants 2616.

In at least one example, interactions between the customers 2620 and the merchants 2616 that involve the exchange of funds (from the customers 2620) for items (from the merchants 2616) can be referred to as "transactions," examples of which are further described in relation to FIG. 16. In at least one example, the POS application 2618 can determine transaction data associated with the POS transactions, which forms a basis to generate the baseline financial data 1606 and updated financial data 1608. Transaction data can include payment information, which can be obtained from a reader device 2622 associated with the merchant device 2608(A), user authentication data, purchase amount information, point-of-purchase information (e.g., item(s) purchased, date of purchase, time of purchase, etc.), etc. The POS application 2618 can send transaction data to the server(s) 2602 such that the server(s) 2602 can track transactions of the customers 2620, merchants 2616, and/or any of the users 2614 over time. Furthermore, the POS application 2618 can present a UI to enable the merchant 2616(A) to interact with the POS application 2618 and/or the service provider via the POS application 2618.

In at least one example, the merchant device 2608(A) can be a special-purpose computing device configured as a POS terminal (via the execution of the POS application 2618). In at least one example, the POS terminal may be connected to a reader device 2622, which is capable of accepting a variety of payment instruments, such as credit cards, debit cards, gift cards, short-range communication based payment instruments, and the like, as described below. In at least one example, the reader device 2622 can plug in to a port in the merchant device 2608(A), such as a microphone port, a headphone port, an audio-jack, a data port, or other suitable port. In additional or alternative examples, the reader device 2622 can be coupled to the merchant device 2608(A) via another wired or wireless connection, such as via a Bluetooth®, BLE, and so on. Additional details are described below with reference to FIG. 28. In some examples, the reader device 2622 can read information from alternative payment instruments including, but not limited to, wristbands and the like.

In some examples, the reader device 2622 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 2622, and communicate with the server(s) 2602, which can provide, among other services, a payment processing service. The server(s) 2602 associated with the service provider can communicate with server(s) 2610, as described below. In this manner, the POS terminal and reader device 2622 may collectively process transaction(s) between the merchants 2616 and customers 2620. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 2622 of the POS system 2624 are shown as separate devices, in additional or alternative examples, the POS terminal and the reader device 2622 can be part of a single device. In some examples, the reader device 2622 can have a display integrated therein for presenting information to the customers 2620. In additional or alternative examples, the POS terminal can have a display integrated therein for presenting information to the customers 2620. POS systems, such as the POS system 2624, may be mobile, such that POS terminals and reader devices may process transactions in disparate locations across the world. POS systems can be used for processing card-present transactions and card-not-present (CNP) transactions, as described below.

A card-present transaction is a transaction where both a customer 2620 and his or her payment instrument are physically present at the time of the transaction. Card-present transactions may be processed by swipes, dips, taps, or any other interaction between a physical payment instrument (e.g., a card), or otherwise present payment instrument, and a reader device 2622 whereby the reader device 2622 is able to obtain payment data from the payment instrument. A swipe is a card-present transaction where a customer 2620 slides a card, or other payment instrument, having a magnetic strip through a reader device 2622 that captures payment data contained in the magnetic strip. A dip is a card-present transaction where a customer 2620 inserts a payment instrument having an embedded microchip (i.e., chip) into a reader device 2622 first. The dipped payment instrument remains in the payment reader until the reader device 2622 prompts the customer 2620 to remove the card, or other payment instrument. While the payment instrument is in the reader device 2622, the microchip can create a one-time code which is sent from the POS system 2624 to the server(s) 2610 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 2620 may tap or hover his or her payment instrument (e.g., card, electronic device such as a smart phone running a payment application, etc.) over a reader device 2622 to complete a transaction via short-range communication (e.g., NFC, RFID, Bluetooth®, BLE, etc.). Short-range communication enables the payment instrument to exchange information with the reader device 2622. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 2624, the server(s) 2602, and/or the server(s) 2610 may exchange payment information and transaction data to determine whether transactions are authorized. For example, the POS system 2624 may provide encrypted payment data, user authentication data, purchase amount information, point-of-purchase information, etc. (collectively, transaction data) to server(s) 2602 over the network(s) 2604. The server(s) 2602 may send the transaction data to the server(s) 2610. As described above, in at least one example, the server(s) 2610 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 2610 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 2610 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 2610 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 2610 associated therewith), and a payment authorization message is communicated from the issuer to the POS device via a path opposite of that described above, or via an alternate path.

As described above, the server(s) 2610, which can be associated with payment service provider(s), may determine whether the transaction is authorized based on the transaction data, as well as information relating to parties to the transaction (e.g., the customer 2620 and/or the merchant 2616(A)). The server(s) 2610 may send an authorization notification over the network(s) 2604 to the server(s) 2602, which may send the authorization notification to the POS system 2624 over the network(s) 2604 to indicate whether the transaction is authorized. The server(s) 2602 may also transmit additional information such as transaction identifiers to the POS system 2624. In one example, the server(s) 2602 may include a merchant application and/or other functional components for communicating with the POS system 2624 and/or the server(s) 2610 to authorize or decline transactions.

Based on the authentication notification that is received by the POS system 2624 from server(s) 2602, the merchant 2616(A) may indicate to the customer 2620 whether the transaction has been approved. In some examples, approval may be indicated at the POS system 2624, for example, at a display of the POS system 2624. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on as examples of digital services 110 of FIG. 1. In some examples, the users 2614 can access all of the services of the service provider. In other examples, the users 2614 can have gradated access to the services, which can be based on risk tolerance, IDV outputs, subscriptions, and so on. In at least one example, access to such services can be availed to the merchants 2616 via the POS application 2618. In additional or alternative examples, each service can be associated with its own access point (e.g., application, web browser, etc.).

The service provider can offer payment processing services for processing payments on behalf of the merchants 2616, as described above. For example, the service provider can provision payment processing software, payment processing hardware and/or payment processing services to merchants 2616, as described above, to enable the merchants 2616 to receive payments from the customers 2620 when conducting POS transactions with the customers 2620. For instance, the service provider can enable the merchants 2616 to receive cash payments, payment card payments, and/or electronic payments from customers 2620 for POS transactions and the service provider can process transactions on behalf of the merchants 2616.

As the service provider processes transactions on behalf of the merchants 2616, the service provider can maintain accounts or balances for the merchants 2616 in one or more ledgers. For example, the service provider can analyze transaction data received for a transaction to determine an amount of funds owed to a merchant 2616(A) for the transaction. In at least one example, such an amount can be a total purchase price less fees charged by the service provider for providing the payment processing services. Based on determining the amount of funds owed to the merchant 2616(A), the service provider can deposit funds into an account of the merchant 2616(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 2616(A) to a bank account of the merchant 2616(A) that is held at a bank or other financial institution (e.g., associated with the server(s) 2610). Scheduled deposits can occur at a prearranged time after a POS transaction is funded, which can be a business day after the POS transaction occurred, or sooner or later. In some examples, the merchant 2616(A) can access funds prior to a scheduled deposit. For instance, the merchant 2616(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 2616(A) can have a payment instrument that is linked to the stored balance that enables the merchant to access the funds without first transferring the funds from the account managed by the service provider to the bank account of the merchant 2616(A).

In at least one example, the service provider may provide inventory management services. That is, the service provider may provide inventory tracking and reporting. Inventory management services may enable the merchant 2616(A) to access and manage a database storing data associated with a quantity of each item that the merchant 2616(A) has available (i.e., an inventory). Furthermore, in at least one example, the service provider can provide catalog management services to enable the merchant 2616(A) to maintain a catalog, which can be a database storing data associated with items that the merchant 2616(A) has available for acquisition (i.e., catalog management services). In at least one example, the catalog may include a plurality of data items and a data item of the plurality of data items may represent an item that the merchant 2616(A) has available for acquisition. The service provider can offer recommendations related to pricing of the items, placement of items on the catalog, and multi-party fulfillment of the inventory.

In at least one example, the service provider can provide business banking services, which allow the merchant 2616(A) to track deposits (from payment processing and/or other sources of funds) into an account of the merchant 2616(A), payroll payments from the account (e.g., payments to employees of the merchant 2616(A)), payments to other merchants (e.g., business-to-business) directly from the account or from a linked debit card, withdrawals made via scheduled deposit and/or instant deposit, etc. Furthermore, the business banking services can enable the merchant 2616(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 2616 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 2616. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 2612 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 2614 who are unfamiliar with HTML, XML, JavaScript®, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 2616. In at least one example, the service provider can recommend and/or generate content items to supplement omni-channel presences of the merchants 2616. That is, if a merchant of the merchants 2616 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 2614 to set schedules for scheduling appointments and/or users 2614 to schedule appointments.

In some examples, the service provider can provide restaurant management services to enable users 2614 to make and/or manage reservations, to monitor front-of-house and/or back-of-house operations, and so on. In such examples, the merchant device(s) 2608 and/or server(s) 2602 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 2614 who can travel between locations to perform services for a requesting user 2614 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 2606.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 2614, voice inputs into a virtual assistant or the like, to determine intents of user(s) 2614. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 2614 may be new to the service provider such that the user 2614 that has not registered (e.g., subscribed to receive access to one or more services offered by the service provider) with the service provider. The service provider can offer onboarding services for registering a potential user 2614 with the service provider. In some examples, onboarding can involve presenting various questions, prompts, and the like to a potential user 2614 to obtain information that can be used to generate a profile for the potential user 2614. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 2614 providing all necessary information, the potential user 2614 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 2610). That is, the service provider can offer IDV services to verify the identity of users 2614 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 2614 accurately identifies the customer (or potential customer), i.e., "Is the customer who they say they are?"

The service provider is capable of providing additional or alternative services and the services described above are offered as a sampling of services. In at least one example, the service provider can exchange data with the server(s) 2610 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 2602) and/or the server(s) 2610 via the network(s) 2604. In some examples, the merchant device(s) 2608 are not capable of connecting with the service provider (e.g., the server(s) 2602) and/or the server(s) 2610, due to a network connectivity issue, for example. In additional or alternative examples, the server(s) 2602 are not capable of communicating with the server(s) 2610 due to network connectivity issue, for example. In such examples, devices may operate in "offline" mode where at least some payment data is stored (e.g., on the merchant device(s) 2608) and/or the server(s) 2602 until connectivity is restored and the payment data can be transmitted to the server(s) 2602 and/or the server(s) 2610 for processing.

In at least one example, the service provider can be associated with a hub, such as an order hub, an inventory hub, a fulfillment hub and so on, which can enable integration with one or more additional service providers (e.g., associated with the additional server(s) 2610). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 2606 that are in communication with server(s) 2602 of the service provider. That is, techniques described herein are directed to a specific implementation—or, a practical application—of utilizing a distributed system of user devices 2606 that are in communication with server(s) 2602 of the service provider to perform a variety of services, as described above. The unconventional configuration of the distributed system described herein enables the server(s) 2602 that are remotely-located from end-users (e.g., users 2614) to intelligently offer services based on aggregated data associated with the end-users, such as the users 2614 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein as shown in FIGS. 1, 5, and 10-12. Some of the techniques described herein are directed to user interface features presented via GUIs to improve interaction between users 2614 and user devices 2606. Furthermore, such features are changed dynamically based on the profiles of the users involved interacting with the GUIs. As such, techniques described herein are directed to improvements to computing systems.

Figure 27:
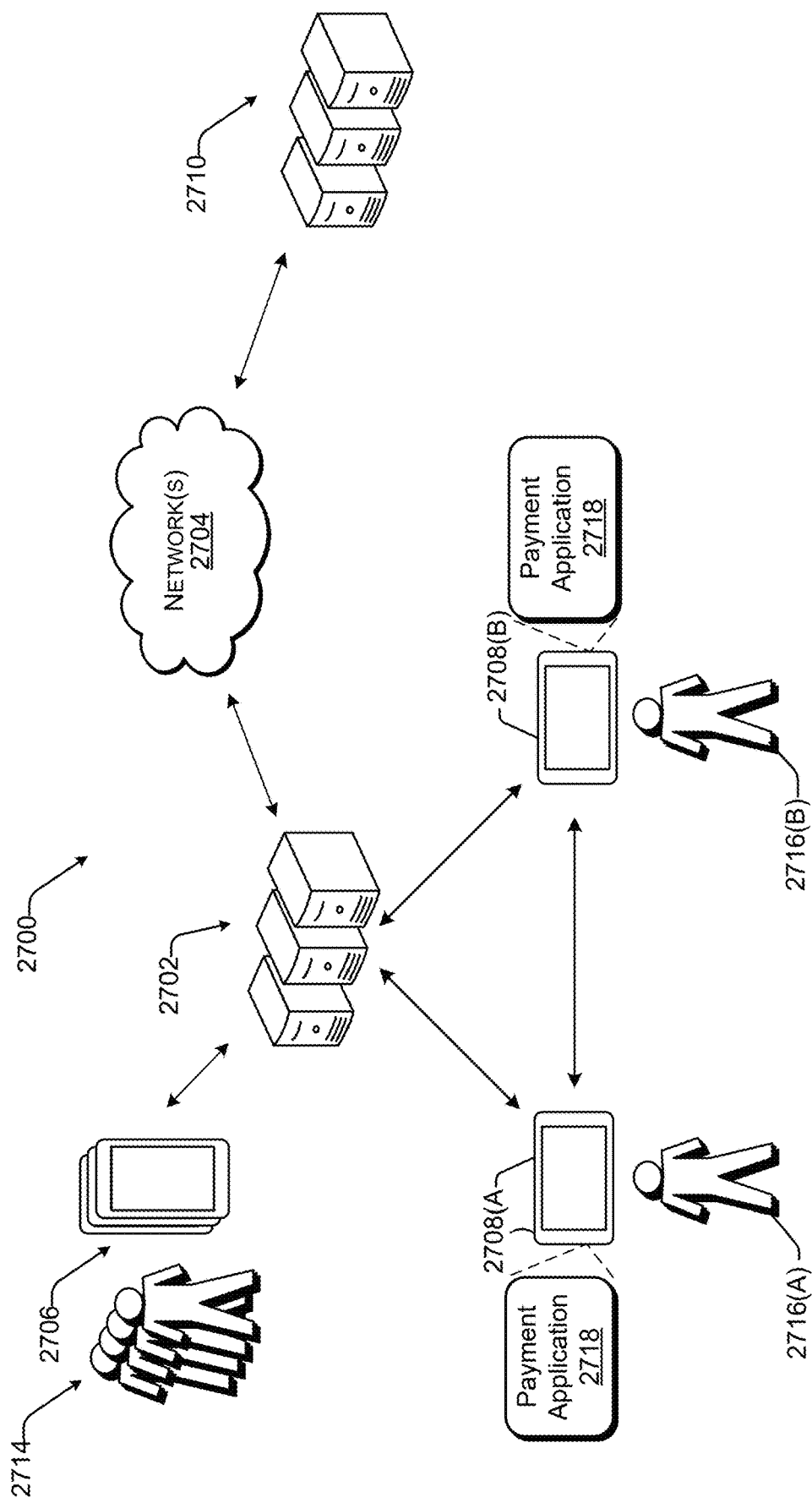
FIG. 27 is an example environment with which techniques described herein can be implemented, according to an embodiment described herein.

FIG. 27 illustrates an example environment 2700. The environment 2700 includes server(s) 2702 that can communicate over a network 2704 with user devices 2706 (which, in some examples can be user devices (individually, 2708(A), 2708(B)) and/or server(s) 2710 associated with third-party service provider(s). The server(s) 2702 can be associated with a service provider that can provide one or more services for the benefit of users 2714, as described below. Actions attributed to the service provider can be performed by the server(s) 2702. In some examples, the service provider 2612 referenced in FIG. 26 can be the same or different than the service provider referenced in FIG. 27 or the service provider system 102 referenced in FIG. 1.

The environment 2700 can include a plurality of user devices 2706 (e.g., client device 104), as described above. Each one of the plurality of user devices 2706 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 2714. The users 2714 can be referred to as customers, buyers, merchants, sellers, borrowers, employees, employers, payors, payees, couriers and so on. The users 2714 can interact with the user devices 2706 via user interfaces presented via the user devices 2706. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 2706 can have an instance or versioned instance of an application, which can be downloaded from an application store, for example, which can present the user interface(s) described herein. In at least one example, a user 2714 can interact with the user interface via touch input, spoken input, or any other type of input.

In at least one example, the service provider can provide a peer-to-peer payment service that enables peer-to-peer payments between two or more users 2714. Two users, user 2716(A) and user 2716(B) are illustrated in FIG. 27 as "peers" in a peer-to-peer payment. In at least one example, the service provider can communicate with instances of a payment application 2718 (or other access point) installed on devices 2706 configured for operation by users 2714. In an example, an instance of the payment application 2718 executing on a first device 2708(A) operated by a payor (e.g., user 2716(A)) can send a request to the service provider to transfer an asset (e.g., fiat currency, non-fiat currency, digital assets, cryptocurrency, securities, gift cards, and/or related assets) from the payor to a payee (e.g., user 2716(B)) via a peer-to-peer payment. In some examples, assets associated with an account of the payor are transferred to an account of the payee. In some examples, assets can be held at least temporarily in an account of the service provider prior to transferring the assets to the account of the payee.

Figure 28:
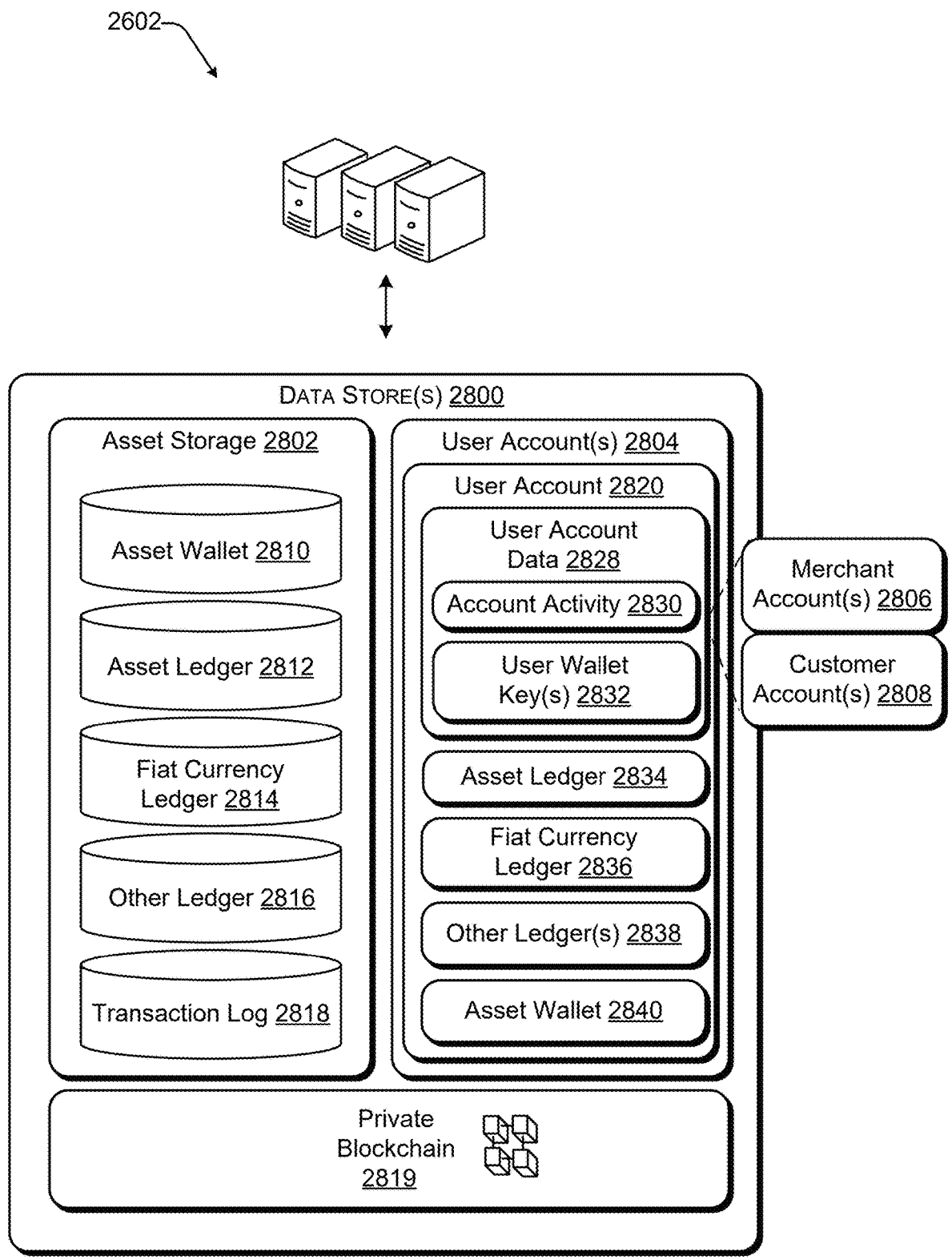
FIG. 28 is an environment associated with a ledger system with which techniques described herein can be implemented, according to an embodiment described herein.

In some examples, the service provider can utilize a ledger system to track transfers of assets between users 2714. FIG. 28, below, provides additional details associated with such a ledger system. The ledger system can enable users 2714 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 2718 (e.g., payment application 1502) executing on user device(s) of payee(s). As an example, the service provider can transfer assets from an account of user 2716(A) to an account of the user 2716(B) and can send a notification to the user device 2708(B) of the user 2716(B) for presentation via a user interface. The notification can indicate that a transfer is in process, a transfer is complete, or the like. In some examples, the service provider can send additional or alternative information to the instances of the payment application 2718 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 2702 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 2718 executing on the user devices 2706. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 27 or a third-party service provider associated with the server(s) 2710. In examples where the content provider is a third-party service provider, the server(s) 2710 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 27. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 2706 (e.g., mobile device or conventional personal computer (PC)) based on instructions transmitted to and from the server(s) 2702 (which, in such an example can be called a "messaging server"). In some instances, the messaging application can include a payment application with messaging capability that enables users of the payment application to communicate with one another. In such instances, the payment application can be executed on a user device 2706 based on instructions transmitted to and from the server(s) 2702 (e.g., the payment service discussed in this description or another payment service that supports payment transactions). In some examples, the messaging application can be provided by a third-party service provider associated with the server(s) 2710. In examples where the messaging application is a third-party service provider, the server(s) 2710 can be accessible via one or more APIs or other integrations.

As described above, the service provider can facilitate peer-to-peer transactions, which can enable users 2714 to transfer fiat currency, non-fiat currency, cryptocurrency, securities, or other assets, or portions thereof, to other users 2714. In at least one example, individual users can be associated with user accounts. Additional details associated with user accounts and the transfer of assets between users 2714 are described below with reference to FIG. 28.

Furthermore, the service provider of FIG. 27 can enable users 2714 to perform banking transactions via instances of the payment application 2718. For example, users can configure direct deposits or other deposits for adding assets to their various ledgers/balances. Further, users 2714 can configure bill pay, recurring payments, and/or the like using assets associated with their accounts. In addition to sending and/or receiving assets via peer-to-peer transactions, users 2714 buy and/or sell assets via asset networks such as cryptocurrency networks, securities networks, and/or the like.

FIG. 28 illustrates example data store(s) 2800 that can be associated with the server(s) 2702. In at least one example, the data store(s) 2800 can store assets in an asset storage 2802, as well as data in user account(s) 2804. In some examples, user account(s) 2804 can include merchant account(s) 2806, and/or customer account(s) 2808. In at least one example, the asset storage 2802 can be used to store assets managed by the service provider of FIG. 27. In at least one example, the asset storage 2802 can be used to record whether individual of the assets are registered to users. For example, the asset storage 2802 can include an asset wallet 2810 for storing records of assets owned by the service provider of FIG. 27, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 2710 can be associated therewith. In some examples, the asset wallet 2810 can communicate with the asset network via one or more components associated with the server(s) 2702.

The asset wallet 2810 can be associated with one or more addresses and can vary addresses used to acquire assets (e.g., from the asset network(s)) so that its holdings are represented under a variety of addresses on the asset network. In examples where the service provider of FIG. 27 has its own holdings of cryptocurrency (e.g., in the asset wallet 2810), a user can acquire cryptocurrency directly from the service provider of FIG. 27. In some examples, the service provider of FIG. 27 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 2802 may contain ledgers that store records of assignments of assets to users 2714. Specifically, the asset storage 2802 may include asset ledger 2812, fiat currency ledger 2814, and other ledger(s) 2816, which can be used to record transfers of assets between users 2714 of the service provider and/or one or more third-parties (e.g., merchant network(s), payment card network(s), ACH network(s), equities network(s), the asset network, securities networks, etc.). In doing so, the asset storage 2802 can maintain a running balance of assets managed by the service provider of FIG. 27. The ledger(s) of the asset storage 2802 can further indicate some of the running balance for each of the ledger(s) stored in the asset storage 2802 is assigned or registered to one or more user account(s) 2804.

In at least one example, the asset storage 2802 can include transaction logs 2818, which can include records of past transactions involving the service provider of FIG. 27. In at least one example, transaction data, as described herein, can be stored in association with the transaction logs 2818.

In some examples, the data store(s) 2800 can store a private blockchain 2819. A private blockchain 2819 can function to record sender addresses, recipient addresses, public keys, values of cryptocurrency transferred, and/or can be used to verify ownership of cryptocurrency tokens to be transferred. In some examples, the service provider of FIG. 27 can record transactions taking place within the service provider of FIG. 27 involving cryptocurrency until the number of transactions has exceeded a determined limit (e.g., number of transactions, storage space allocation, etc.). Based at least in part on determining that the limit has been reached, the service provider of FIG. 27 can publish the transactions in the private blockchain 2819 to a public blockchain (e.g., associated with the asset network), where miners can verify the transactions and record the transactions to blocks on the public blockchain. In at least one example, the service provider of FIG. 27 can participate as miner(s) at least for its transactions to be posted to the public blockchain.

In at least one example, the data store(s) 2800 can store and/or manage accounts, such as user account(s) 2804, merchant account(s) 2806, and/or customer account(s) 2808. In at least one example, the user account(s) 2804 may store records of user accounts associated with the users 2714. In at least one example, the user account(s) 2804 can include a user account 2820, which can be associated with a user (of the users 2714). Other user accounts of the user account(s) 2804 can be similarly structured to the user account 2820, according to some examples. In other examples, other user accounts may include more or less data and/or account information than that provided by the user account 2820. In at least one example, the user account 2820 can include user account data 2828, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 2828 can include account activity 2830 and user wallet key(s) 2832. The account activity 2830 may include a transaction log for recording transactions associated with the user account 2820. In some examples, the user wallet key(s) 2832 can include a public-private key-pair and a respective address associated with the asset network or other asset networks. In some examples, the user wallet key(s) 2832 may include one or more key pairs, which can be unique to the asset network or other asset networks.

In addition to the user account data 2828, the user account 2820 can include ledger(s) for account(s) managed by the service provider of FIG. 27, for the user. For example, the user account 2820 may include an asset ledger 2834, a fiat currency ledger 2836, and/or one or more other ledgers 2838. The ledger(s) can indicate that a corresponding user utilizes the service provider of FIG. 27 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 27.

In some examples, the asset ledger 2834 can store a balance for each of one or more cryptocurrencies (e.g., Bitcoin, Ethereum, Litecoin, etc.) registered to the user account 2820. In at least one example, the asset ledger 2834 can further record transactions of cryptocurrency assets associated with the user account 2820. For example, the user account 2820 can receive cryptocurrency from the asset network using the user wallet key(s) 2832. In some examples, the user wallet key(s) 2832 may be generated for the user upon request. User wallet key(s) 2832 can be requested by the user in order to send, exchange, or otherwise control the balance of cryptocurrency held by the service provider of FIG. 27 (e.g., in the asset wallet 2810) and registered to the user. In some examples, the user wallet key(s) 2832 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 27 and the value is credited as a balance in asset ledger 2834), by purchasing currency in the form associated with the account using currency in a different form (e.g., buying a value of cryptocurrency from the service provider of FIG. 27 using a value of fiat currency reflected in fiat currency ledger 2836, and crediting the value of cryptocurrency in asset ledger 2834), or by conducting a transaction with another user (customer or merchant) of the service provider of FIG. 27 wherein the account receives incoming currency (which can be in the form associated with the account or a different form, in which the incoming currency may be converted to the form associated with the account). In some examples, the user account data 2828 can include preferences for maintaining balances of individual of the ledgers. For example, the service provider of FIG. 27 can automatically debit the fiat currency ledger 2836 to increase the asset ledger 2834, or another account associated with the user whenever the cryptocurrency balance (e.g., of the asset ledger 2834) falls below a stated level (e.g., a threshold). Conversely, in some embodiments, the service provider of FIG. 27 can automatically credit the fiat currency ledger 2836 to decrease the asset ledger 2834 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party unrelated to the service provider of FIG. 27 (i.e., an external account). In at least one example, the user can transfer all or a portion of a balance of the cryptocurrency stored in the third-party cryptocurrency wallet to the service provider of FIG. 27. Such a transaction can require the user to transfer an amount of the cryptocurrency in a message signed by user's private key to an address provided by the service provider of FIG. 27. In at least one example, the transaction can be sent to miners to bundle the transaction into a block of transactions and to verify the authenticity of the transactions in the block. Once a miner has verified the block, the block is written to a public, distributed blockchain where the service provider of FIG. 27 can then verify that the transaction has been confirmed and can credit the user's asset ledger 2814 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 27. As described above, in some examples, the service provider of FIG. 27 can acquire cryptocurrency from a third-party source. In such examples, the asset wallet 2810 can be associated with different addresses and can vary addresses used to acquire cryptocurrency so that its holdings are represented under a variety of addresses on a blockchain. When the service provider of FIG. 27 has their own holdings of cryptocurrency, users can acquire cryptocurrency directly from the service provider of FIG. 27. In some examples, the service provider of FIG. 27 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 27 has its own cryptocurrency assets, cryptocurrency transferred in a transaction (e.g., data with address provided for receipt of transaction and a balance of cryptocurrency transferred in the transaction) can be stored in the asset wallet 2810. In at least one example, the service provider of FIG. 27 can credit the asset ledger 2814 of the user. Additionally, while the service provider of FIG. 27 recognizes that the user retains the value of the transferred cryptocurrency through crediting the asset ledger 2814, any person that inspects the blockchain will see the cryptocurrency as having been transferred to the service provider of FIG. 27. In some examples, the asset wallet 2810 can be associated with many different addresses. In such examples, any person that inspects the blockchain may not easily associate all cryptocurrency stored in asset wallet 2810 as belonging to the same entity. It is this presence of a private ledger that is used for real-time transactions and maintained by the service provider of FIG. 27, combined with updates to the public ledger at other times, that allows for extremely fast transactions using cryptocurrency to be achieved. In some examples, the "private ledger" can refer to the asset ledger 2812, which in some examples, can utilize the private blockchain 2819, as described herein. The "public ledger" can correspond to a public blockchain associated with the asset network.

In at least one example, a user's asset ledger 2814, fiat currency ledger 2816, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 2814. In some examples, a user can receive fiat currency or another currency in the form of payment for a transaction with another user. In at least one example, at least a portion of such funds can be converted into cryptocurrency by the service provider of FIG. 27 and used to fund the asset ledger 2814 of the user.

As addressed above, in some examples, users can also have other accounts maintained by the service provider of FIG. 27. For example, a user can also have an account in U.S. dollars, which can be tracked, for example, via the fiat currency ledger 2816. Such an account can be funded by transferring money from a bank account at a third-party bank to an account maintained by the service provider of FIG. 27 as is conventionally known. In some examples, a user can receive fiat currency in the form of payment for a transaction with another user. In such examples, at least a portion of such funds can be used to fund the fiat currency ledger 2816.

In some examples, a user can have one or more internal payment cards registered with the service provider of FIG. 27. Internal payment cards can be linked to one or more of the accounts associated with the user account 2820. In some embodiments, options with respect to internal payment cards can be adjusted and managed using an application (e.g., the payment application 2718).

In at least one example, as described above, each ledger can correspond to an account of the user that is managed by the service provider of FIG. 27. In at least one example, individual of the accounts can be associated with a wallet or a stored balance for use in payment transactions, peer-to-peer transactions, payroll payments, etc.

In at least one example, the user account 2820 can be associated with an asset wallet 2840. The asset wallet 2840 of the user can be associated with account information that can be stored in the user account data 2828 and, in some examples, can be associated with the user wallet key(s) 2832. In at least one example, the asset wallet 2840 can store data indicating an address provided for receipt of a cryptocurrency transaction. In at least one example, the balance of the asset wallet 2840 can be based at least in part on a balance of the asset ledger 2814. In at least one example, funds availed via the asset wallet 2840 can be stored in the asset wallet 2840 or the asset wallet 2810. Funds availed via the asset wallet 2810 can be tracked via the asset ledger 2814. The asset wallet 2840, however, can be associated with additional cryptocurrency funds.

In at least one example, when the service provider of FIG. 27 includes a private blockchain 2819 for recording and validating cryptocurrency transactions, the asset wallet 2840 can be used instead of, or in addition to, the asset ledger 2814. For example, at least one example, a merchant can provide the address of the asset wallet 2840 for receiving payments. In an example where a customer is paying in cryptocurrency and the customer has their own cryptocurrency wallet account associated with the service provider of FIG. 27, the customer can send a message signed by its private key including its wallet address (i.e., of the customer) and identifying the cryptocurrency and value to be transferred to the merchant's asset wallet 2840. The service provider of FIG. 27 can complete the transaction by reducing the cryptocurrency balance in the customer's cryptocurrency wallet and increasing the cryptocurrency balance in the merchant's asset wallet 2840. In addition to recording the transaction in the respective cryptocurrency wallets, the transaction can be recorded in the private blockchain 2819 and the transaction can be confirmed. A user can perform a similar transaction with cryptocurrency in a peer-to-peer transaction as described above. In at least one example, the cryptocurrency wallet account can be funded by a balance transfer from a third-party cryptocurrency wallet, as described above. Such a transaction can involve transfer by a user of an amount of cryptocurrency in a message signed by the user's private key to an address of the cryptocurrency wallet account. The transferred amount of cryptocurrency can then be within the cryptocurrency wallet account for use in later transactions.

While the asset ledger 2814 and/or asset wallet 2840 are each described above with reference to cryptocurrency, the asset ledger 2814 and/or asset wallet 2840 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 27 is an aspect of the technology disclosed that enables technical advantages of increased processing speed and improved security.

Figure 29:
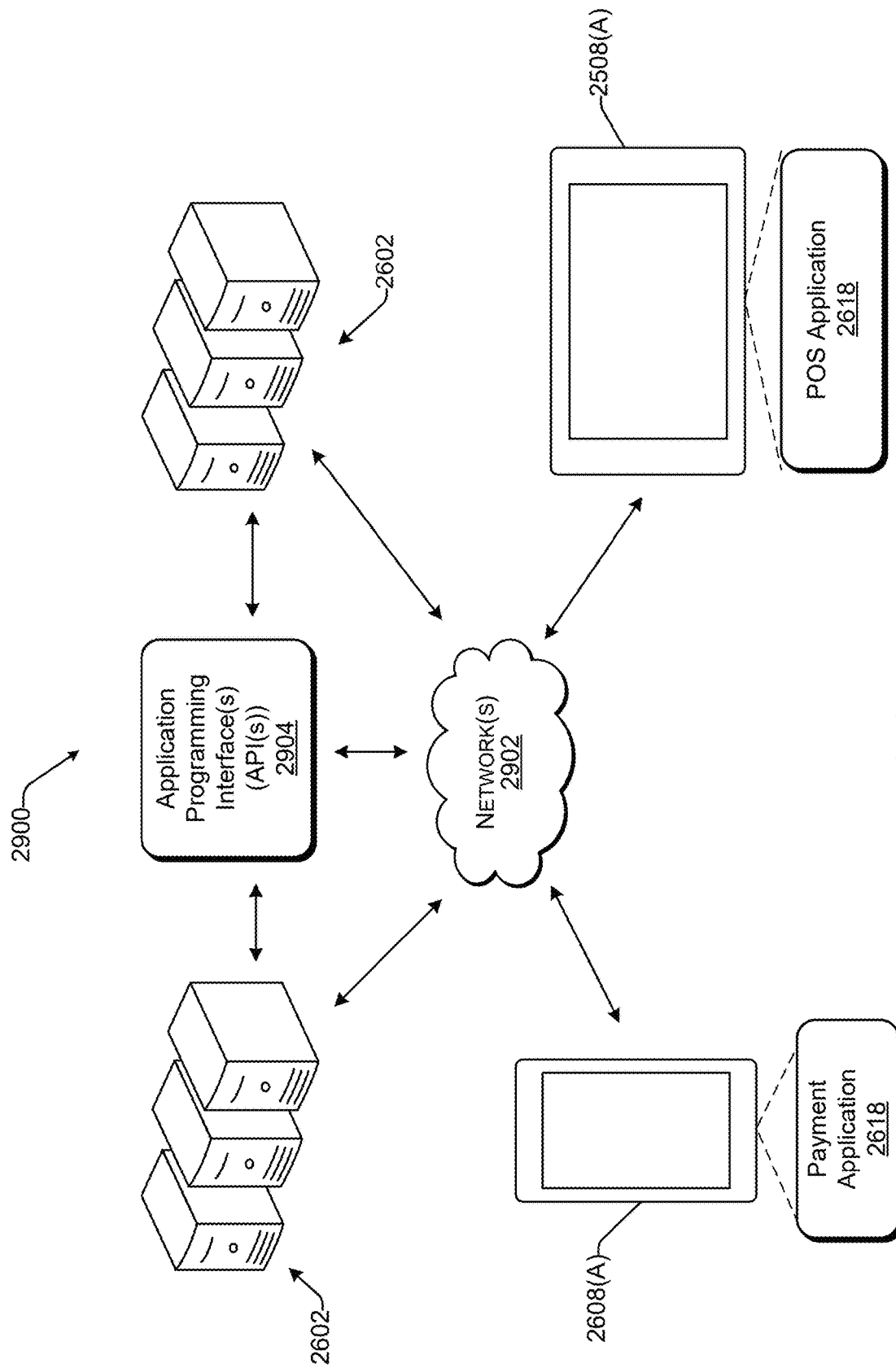
FIG. 29 is an example environment in which the environments of FIGS. 26 and 27 can be integrated to enable payments at the point-of-sale using assets associated with user accounts in the peer-to-peer environment of FIG. 28 with which techniques described herein can be implemented, according to an embodiment described herein.

FIG. 29 illustrates an example environment 2900 wherein the environment 2600 and the environment 2700 can be integrated to enable payments at the point-of-sale using assets associated with user accounts in the peer-to-peer environment of FIG. 27. As illustrated, each of the components can communicate with one another via one or more networks 2902. In some examples, one or more APIs 2904 or other functional components can be used to facilitate such communication.

In at least one example, the example environment 2900 can enable contactless payments, via integration of peer-to-peer payment, or other payment making, platform(s) and payment processing platform(s), are described herein. For the purpose of FIG. 28, the environment 2600 can refer to a payment processing platform and the environment 2700 can refer to a peer-to-peer payment, or payment making, platform. In an example, such an integration can enable a customer to participate in a transaction via their own computing device instead of interacting with a merchant device of a merchant, such as the merchant device 2608(A). In such an example, the POS application 2618, associated with a payment processing platform and executable by the merchant device 2608(A) of the merchant, can present a Quick Response (QR) code, or other code that can be used to identify a transaction (e.g., a transaction code), in association with a transaction between the customer and the merchant. The QR code, or other transaction code, can be provided to the POS application 2618 via an API associated with the peer-to-peer payment platform. In an example, the customer can utilize their own computing device, such as the user device 2708(A), to capture the QR code, or the other transaction code, and to provide an indication of the captured QR code, or other transaction code, to server(s) 2602 and/or server(s) 2702.

Based at least in part on the integration of the peer-to-peer payment platform and the payment processing platform (e.g., via the API), the server(s) 2602 and/or 2702 associated with each can exchange communications with each other— and with a payment application 2718 associated with the peer-to-peer payment platform and/or the POS application 2618—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 2708(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 2708(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance.

Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 2618 and the payment application 2718, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 2708(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 2618, associated with a payment processing platform, on the merchant device 2608(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 2608(A) can present a QR code, or other transaction code, that can be associated with a peer-to-peer payment platform. The customer can use a camera associated with the user device 2708(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 2618, associated with a payment processing platform, on the merchant device 2608(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 2618 can cause a text message with a resource locator (e.g., uniform resource locator (URL)) that can be associated with a peer-to-peer payment platform to be sent to the user device 2708(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 2708(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 2618 of a merchant device 2608(A) at a brick-and-mortar store of a merchant to a payment application 2718 of a user device 2708(A) of a customer to enable the customer to participate in a transaction via their own computing device. For instance, in a "scan to pay" example as described above, based at least in part on capturing the QR code, or other transaction code, via the user device 2708(A), the payment processing platform can provide transaction data to the peer-to-peer payment platform for presentation via the payment application 2718 on the user device 2708(A). In some examples, the customer can watch items being added to their cart (e.g., via a user interface presented via the payment application). As an item is added to a virtual cart by the merchant—via the POS application 2618 on the merchant device 2608(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 2718 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 2708(A) during or after payment of the transaction.

In some examples, based at least in part on capturing the QR code, or other transaction code, the payment processing platform can provide transaction data to the peer-to-peer payment platform for presentation via the payment application 2718 on the computing device of the customer, such as the user device 2708(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 2718 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 2618, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 2718 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction. Examples of uses include the financial horoscopes and personas as described in relation to FIGS. 20-25.

Figure 30:
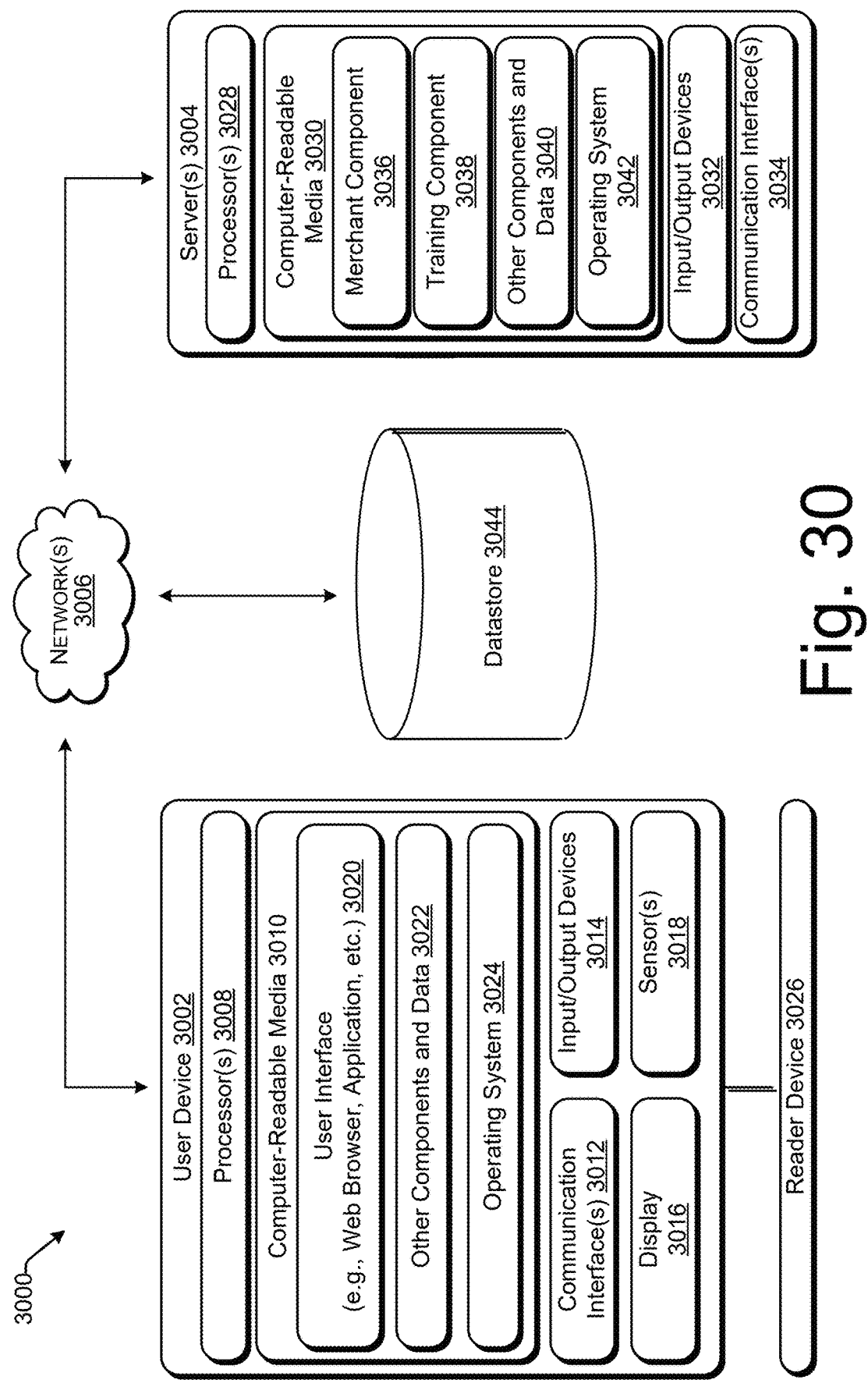
FIG. 30 is a block diagram showing a system for performing techniques described herein with which techniques described herein can be implemented, according to an embodiment described herein.

FIG. 30 depicts an illustrative block diagram illustrating a system 3000 for performing techniques described herein. The system 3000 includes a user device 3002, that communicates with server computing device(s) (e.g., server(s) 3004) via network(s) 3006 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 3002 is illustrated (e.g., as client device 104), in additional or alternate examples, the system 3000 can have multiple user devices.

In at least one example, the user device 3002 can be any suitable type of computing device, e.g., portable, semi-portable, semi-stationary, or stationary. Some examples of the user device 3002 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 3002 can be any computing device capable of sending communications and performing the functions according to the techniques described herein. The user device 3002 can include devices, e.g., payment card readers, or components capable of accepting payments, as described below.

In the illustrated example, the user device 3002 includes one or more processors 3008, one or more computer-readable media 3010, one or more communication interface(s) 3012, one or more input/output (I/O) devices 3014, a display 3016, and sensor(s) 3018.

In at least one example, each processor 3008 can itself comprise one or more processors or processing cores. For example, the processor(s) 3008 can be implemented as one or more microprocessors, microcomputers, microcontrollers, digital signal processors, central processing units, state machines, logic circuitries, and/or any devices that manipulate signals based on operational instructions. In some examples, the processor(s) 3008 can be one or more hardware processors and/or logic circuits of any suitable type specifically programmed or configured to execute the algorithms and processes described herein. The processor(s) 3008 can be configured to fetch and execute computer-readable processor-executable instructions stored in the computer-readable media 3010.

Depending on the configuration of the user device 3002, the computer-readable media 3010 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 3010 can include, but is not limited to, RAM, ROM, EEPROM, flash memory, solid-state storage, magnetic disk storage, optical storage, and/or other computer-readable media technology. Further, in some examples, the user device 3002 can access external storage, such as RAID storage systems, storage arrays, network attached storage, storage area networks, cloud storage, or any other medium that can be used to store information and that can be accessed by the processor(s) 3008 directly or through another computing device or network. Accordingly, the computer-readable media 3010 can be computer storage media able to store instructions, components or components that can be executed by the processor(s) 3008. Further, when mentioned, non-transitory computer-readable media exclude media such as energy, carrier signals, electromagnetic waves, and signals per se.

The computer-readable media 3010 can be used to store and maintain any number of functional components that are executable by the processor(s) 3008. In some implementations, these functional components comprise instructions or programs that are executable by the processor(s) 3008 and that, when executed, implement operational logic for performing the actions and services attributed above to the user device 3002. Functional components stored in the computer-readable media 3010 can include a user interface 3020 to enable users to interact with the user device 3002, and thus the server(s) 3004 and/or other networked devices. In at least one example, the user interface 3020 can be presented via a web browser, or the like. In other examples, the user interface 3020 can be presented via an application, such as a mobile application or desktop application, which can be provided by a service provider associated with the server(s) 3004, or which can be an otherwise dedicated application. In some examples, the user interface 3020 can any of the user interfaces shown in relation to FIGS. 1-25. In at least one example, a user can interact with the user interface via touch input, spoken input, gesture, or any other type of input. The word "input" is also used to describe "contextual" input that may not be directly provided by the user via the user interface 3020. For example, user's interactions with the user interface 3020 are analyzed using, e.g., natural language processing techniques, to determine context or intent of the user, which may be treated in a manner similar to "direct" user input.

Depending on the type of the user device 3002, the computer-readable media 3010 can also optionally include other functional components and data, such as other components and data 3022, which can include programs, drivers, etc., and the data used or generated by the functional components. In addition, the computer-readable media 3010 can also store data, data structures and the like, that are used by the functional components. Further, the user device 3002 can include many other logical, programmatic and physical components, of which those described are merely examples that are related to the discussion herein.

In at least one example, the computer-readable media 3010 can include additional functional components, such as an operating system 3024 for controlling and managing various functions of the user device 3002 and for enabling basic user interactions.

The communication interface(s) 3012 can include one or more interfaces and hardware components for enabling communication with various other devices, such as over the network(s) 3006 or directly. For example, communication interface(s) 3012 can enable communication through one or more network(s) 3006, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 3006 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service (e.g., digital service 110) over a network 106, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 3002 can further include one or more input/output (I/O) devices 3014. The I/O devices 3014 can include speakers, a microphone, a camera, and various user controls (e.g., buttons, a joystick, a keyboard, a keypad, etc.), a haptic output device, and so forth. The I/O devices 3014 can also include attachments that leverage the accessories (audio-jack, USB-C, Bluetooth, etc.) to connect with the user device 3002.

In at least one example, user device 3002 can include a display 3016. Depending on the type of computing device(s) used as the user device 3002, the display 3016 can employ any suitable display technology. For example, the display 3016 can be a liquid crystal display, a plasma display, a light emitting diode display, an OLED (organic light-emitting diode) display, an electronic paper display, or any other suitable type of display able to present digital content thereon. In at least one example, the display 3016 can be an augmented reality display, a virtual reality display, or any other display able to present and/or project digital content. In some examples, the display 3016 can have a touch sensor associated with the display 3016 to provide a touchscreen display configured to receive touch inputs for enabling interaction with a graphic interface presented on the display 3016. Accordingly, implementations herein are not limited to any particular display technology. Alternatively, in some examples, the user device 3002 may not include the display 3016, and information can be presented by other means, such as aurally, haptically, etc.

In addition, the user device 3002 can include sensor(s) 3018. The sensor(s) 3018 can include a GPS device able to indicate location information. Further, the sensor(s) 3018 can include, but are not limited to, an accelerometer, gyroscope, compass, proximity sensor, camera, microphone, and/or a switch.

In some example, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users enter a brick-and-mortar store of a merchant. Location can be used in additional or alternative ways as well.

Additionally, the user device 3002 can include various other components that are not shown, examples of which include removable storage, a power source, such as a battery and power control unit, a barcode scanner, a printer, a cash drawer, and so forth.

In addition, in some examples, the user device 3002 can include, be connectable to, or otherwise be coupled to a reader device 3026, for reading payment instruments and/or identifiers associated with payment objects. In some examples, as described above, the reader device 3026 can plug in to a port in the user device 3002, such as a microphone port, a headphone port, an audio-jack, a data port, or other suitable port. In additional or alternative examples, the reader device 3026 can be coupled to the user device 3002 via another wired or wireless connection, such as via a Bluetooth®, BLE, and so on. The reader device 3026 can include a read head for reading a magnetic strip of a payment card, and further can include encryption technology for encrypting the information read from the magnetic strip. Additionally or alternatively, the reader device 3026 can be an EMV payment reader, which in some examples, can be embedded in the user device 3002. Moreover, numerous other types of readers can be employed with the user device 3002 herein, depending on the type and configuration of the user device 3002.

The reader device 3026 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 3026 may include hardware implementation, such as slots, magnetic tracks, and rails with one or more sensors or electrical contacts to facilitate detection and acceptance of a payment instrument. That is, the reader device 3026 may include hardware implementations to enable the reader device 3026 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 3026 may also include a biometric sensor to receive and process biometric characteristics and process them as payment instruments, given that such biometric characteristics are registered with the payment service and connected to a financial account with a bank server.

The reader device 3026 may include processing unit(s), computer-readable media, a reader chip, a transaction chip, a timer, a clock, a network interface, a power supply, and so on. The processing unit(s) of the reader device 3026 may execute one or more components and/or processes to cause the reader device 3026 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 3026, the computer-readable media may include volatile memory (such as RAM), non-volatile memory (such as ROM, flash memory, miniature hard drive, memory card, or the like), or some combination thereof. In at least one example, the computer-readable media of the reader device 3026 may include at least one component for performing various functions as described herein.

The reader chip may perform functionalities to control the operations and processing of the reader device 3026. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 3006, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 3026. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 3002, which can be a POS terminal, and the reader device 3026 are shown as separate devices, in additional or alternative examples, the user device 3002 and the reader device 3026 can be part of a single device, which may be a battery-operated device. In such an example, components of both the user device 3002 and the reader device 3026 may be associated with the single device. In some examples, the reader device 3026 can have a display integrated therewith, which can be in addition to (or as an alternative of) the display 3016 associated with the user device 3002.

The server(s) 3004 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 3004 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 3004 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 3004 can include one or more processors 3028, one or more computer-readable media 3030, one or more I/O devices 3032, and one or more communication interfaces 3034. Each processor 3028 can be a single processing unit or a number of processing units, and can include single or multiple computing units or multiple processing cores. The processor(s) 3028 can be implemented as one or more microprocessors, microcomputers, microcontrollers, digital signal processors, central processing units, state machines, logic circuitries, and/or any devices that manipulate signals based on operational instructions. For example, the processor(s) 3028 can be one or more hardware processors and/or logic circuits of any suitable type specifically programmed or configured to execute the algorithms and processes described herein. The processor(s) 3028 can be configured to fetch and execute computer-readable instructions stored in the computer-readable media 3030, which can program the processor(s) 3028 to perform the functions described herein.

The computer-readable media 3030 can include volatile and nonvolatile memory and/or removable and non-removable media implemented in any type of technology for storage of information, such as computer-readable instructions, data structures, program components, or other data. Such computer-readable media 3030 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 3004, the computer-readable media 3030 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 3030 can be used to store any number of functional components that are executable by the processor(s) 3028. In many implementations, these functional components comprise instructions or programs that are executable by the processors 3028 and that, when executed, specifically configure the one or more processors 3028 to perform the actions attributed above to the service provider and/or payment processing service. Functional components stored in the computer-readable media 3030 can optionally include data 3040.

The merchant component 3036 can be configured to receive transaction data from POS systems. The merchant component 3036 can transmit requests (e.g., authorization, capture, settlement, etc.) to payment service server computing device(s) to facilitate POS transactions between merchants and customers. The merchant component 3036 can communicate the successes or failures of the POS transactions to the POS systems.

The training component 3038 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 3002 and/or the server(s) 3004 for use at a time after the data models have been trained (e.g., at runtime).

The one or more other components and data 3040 can include modules as described in relation to FIGS. 1-25, the functionality of which is described, at least partially, above. Further, the one or more other components and data 3040 can include programs, drivers, etc., and the data used or generated by the functional components. Further, the server(s) 3004 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that the modules generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 3030 can additionally include an operating system 3042 for controlling and managing various functions of the server(s) 3004.

The communication interface(s) 3034 can include one or more interfaces and hardware components for enabling communication with various other devices, such as over the network(s) 3006 or directly. For example, communication interface(s) 3034 can enable communication through one or more network(s) 3006, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 3006 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 3004 can further be equipped with various I/O devices 3032. Such I/O devices 3032 can include a display, various user interface controls (e.g., buttons, joystick, keyboard, mouse, touch screen, biometric or sensory input devices, etc.), audio speakers, connection ports and so forth.

In at least one example, the system 3000 can include a datastore 3044 that can be configured to store data that is accessible, manageable, and updatable. In some examples, the datastore 3044 can be integrated with the user device 3002 and/or the server(s) 3004. In other examples, as shown in FIG. 30, the datastore 3044 can be located remotely from the server(s) 3004 and can be accessible to the server(s) 3004. The datastore 3044 can comprise multiple databases and/or servers connected locally and/or remotely via the network(s) 3006.

In at least one example, the datastore 3044 can store user profiles, which can include merchant profiles, customer profiles, and so on as usable to implement the personas 126.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 3044 can store inventory database(s) and/or catalog database(s). As described above, an inventory can store data associated with a quantity of each item that a merchant has available to the merchant. Furthermore, a catalog can store data associated with items that a merchant has available for acquisition. The datastore 3044 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   outputting, by a first machine-learning model, a first persona, wherein the first machine-learning model is trained with anonymized data from users that correspond to characteristics that are to be modeled by the first persona;
   displaying a user interface having a plurality of representations of a plurality of personas, each persona of the plurality of personas modeling one or more user characteristics;
   receiving an input via the user interface as selecting the first persona;
   outputting digital content via the user interface, the digital content selected from a plurality of digital content based on the first persona;
   receiving an input selecting an option via the user interface to add the first persona to a second persona;
   concatenating the first machine-learning model and a second machine-learning model trained with anonymized data from users that correspond to characteristics that are to be modeled by the second persona by providing the first persona as input to the second machine-learning model, wherein after the concatenating, the first machine-learning model and the second machine-learning model are configured as a single end-to-end model having multiple interconnected layers that implement the first persona and the second persona;
   generating, by the single end-to-end machine-learning model, a combined persona based on the first persona and the second persona;
   locating digital content from the plurality of digital content based on the combined persona; and
   outputting the located digital content in the user interface.

2. The method as described in claim 1, wherein the outputting the located digital content in the user interface includes at least one representation of the one or more user characteristics modeled by the combined persona.

3. The method as described in claim 1, wherein the first persona is associated with a first geographic location, the second persona is associated with a second geographic location, and the digital content output is output with recommendations that are associated with weights that are adjusted over time to increase the recommendations associated with the second persona over time.

4. The method as described in claim 1, wherein the plurality of personas corresponds to a single user and at least one persona of the plurality of personas has at least one characteristic that is different than another characteristic included as part of another persona of the plurality of personas.

5. A method comprising:
   outputting digital content via a user interface, the digital content selected from a plurality of digital content based on a first persona implemented using a first machine-learning model, the first persona modeling digital content consumption corresponding to a first set of user characteristics;
   receiving an input via the user interface to combine the first persona with a second persona, the second persona implemented using a second machine-learning model, the second persona modeling digital content consumption corresponding to a second set of user characteristics and the second machine-learning model being trained on a different feature set than the first machine-learning model;
   combining the first persona and the second persona into a single feature set;
   providing the single feature set as input to a third machine-learning model;
   generating, using feature-level fusion, a combined persona based on the single feature set; and
   controlling digital content output from the plurality of digital content in the user interface based on the combined persona.

6. The method as described in claim 5, wherein the user characteristics include demographic information, behavior information, or describe an environment, in which, a respective user is disposed.

7. The method as described in claim 5, wherein the first persona is associated with a first geographic location, the second persona is associated with a second geographic location, and the digital content output is output with recommendations that are associated with weights that are adjusted over time to increase the recommendations associated with the second persona over time.

8. The method as described in claim 5, wherein the first persona is associated with a first person and the second persona is a visiting user persona.

9. The method as described in claim 5, wherein the first machine-learning model includes one or more of a neural network, a convolutional neural network, a long short-term memory neural network, or a decision tree.

10. The method as described in claim 5, wherein the first machine-learning model and the second machine-learning model are trained on separate sets of anonymized data and retrained to incorporate preferences of a particular user over time.

11. The method as described in claim 5, wherein the controlling the digital content output includes configuring a background of the user interface based on the combined persona.

12. The method as described in claim 5, wherein the controlling includes generating a plurality of digital content representations.

13. The method as described in claim 5, further comprising obtaining data describing a current condition associated with one or more characteristics of the combined persona and wherein the controlling of the digital content output in the user interface includes a representation of the current condition.

14. The method as described in claim 13, wherein the current condition is a weather condition at a geographic location included as the one or more user characteristics.

15. The method as described in claim 5, wherein the combined persona is integrated via a calendar application programming interface (API) and the controlling the digital content output is based at least in part on an event specified in a calendar accessible via the calendar API.

16. The method as described in claim 15, wherein the calendar indicates an upcoming event, the second persona is based at least in part on the upcoming event, and the controlling the digital content output is based on the combined persona formed based on the first persona and the second persona.

17. The method as described in claim 15, wherein the calendar indicates upcoming travel and the second persona is based at least in part on a geographic location associated with the upcoming travel.

18. A computing device comprising:
a processing device; and
a computer-readable storage medium storing instructions that, responsive to execution by the processing device, causes the processing device to perform operations including:
outputting, by a first machine-learning model, a first persona;
outputting, by a second machine-learning model, a second persona, wherein the second machine-learning model is trained on a different feature set than the first machine-learning model;
receiving an input via a user interface to combine the first persona with the second persona;
generating, using decision-level fusion, a combined persona responsive to the input, the combined persona based on the first machine-learning model and the second machine-learning model, wherein the decision-level fusion employs one or more of voting, weighted averaging, or stacking to generate the combined persona; and
controlling digital content output from a plurality of digital content in the user interface based on the combined persona.

19. The computing device as described in claim 18, wherein the first persona is associated with a first geographic location, the second persona is associated with a second geographic location, and the decision-level fusion employs weighted averaging based on weights that are adjusted over time to increase respective weights associated with the second persona over time plurality of personas is generated based on a machine-learning model, a collection of rules, or a statistical model.

20. The computing device as described in claim 19, wherein the weights are adjusted over time based on an upcoming travel event to the second geographic location.

* * * * *